United States Patent

Negoro

[19]

[11] Patent Number: 6,138,268
[45] Date of Patent: Oct. 24, 2000

[54] SOFTWARE PRODUCTION METHOD, PROCESSING APPARATUS AND RECORDING MEDIUM

[75] Inventor: Fumio Negoro, Kamakura, Japan

[73] Assignees: Information System Development Institute; The Institute of Computer Based Software Methodology and Technology, both of Tokyo, Japan

[21] Appl. No.: 09/065,101

[22] PCT Filed: Oct. 30, 1996

[86] PCT No.: PCT/JP96/03183

§ 371 Date: Apr. 29, 1998

§ 102(e) Date: Apr. 29, 1998

[87] PCT Pub. No.: WO97/16784

PCT Pub. Date: May 9, 1997

[30] Foreign Application Priority Data

Oct. 30, 1995 [JP] Japan ................... P7-281794

[51] Int. Cl.[7] .................................................. G06F 9/45
[52] U.S. Cl. .................................. 717/1; 345/919
[58] Field of Search .................... 395/701, 702, 395/703; 345/967; 706/45–47, 919, 922; 717/1–3; 707/200; 705/1, 7

[56] References Cited

U.S. PATENT DOCUMENTS

| | | | |
|---|---|---|---|
| 4,965,741 | 10/1990 | Winchell et al. | 706/11 |
| 5,038,296 | 8/1991 | Sano | 706/45 |
| 5,119,475 | 6/1992 | Smith et al. | 345/353 |

(List continued on next page.)

FOREIGN PATENT DOCUMENTS

| | | |
|---|---|---|
| 4-142622 | 5/1992 | Japan . |
| 5-88863 | 4/1993 | Japan . |

OTHER PUBLICATIONS

Sutcliffe et al., "Domain modeling for reuse", IEEE, 1994, pp. 169–177.
Jones et al., "Interactive prototyping methodology for a domain–dependent user interface", NAECON 1991,IEEE, 1991, pp. 813–816.
Rowley et al., "The cognitive jogthrough: A fast–paced user interface evaluation procedure", ACM, 1992, pp. 389–395.
Wharton et al., "Applying cognitive walkthroughs to more complex user interfaces: experiences, issues and recommendations", ACM, 1992, pp. 381–392.
Fischer et al., "Cognitive tools for locating and comprehending software objects for reuse", IEEE, 1991, pp. 318–328.

*Primary Examiner*—Kakali Chaki
*Attorney, Agent, or Firm*—Oblon, Spivak, McClelland, Maier & Neustadt, P.C.

[57] ABSTRACT

First, a defining member identifier constituting a screen required for software to be produced is determined. The words contained in the defining member identifier are then taken out, and a processing path diagram in which all pallets required for the software are arranged on the basis of the defining member identifier and along a flow of a process is prepared. A required file is then determined on the basis of the extracted words and prepared processing path diagram. A first base logic for editing screens or files for all of the extracted words, a second base logic for determining a processing path and a third base logic for updating a file are then prepared. Three kinds of pallets in which the first to third base logics are bound on a screen basis and pallet functions for executing these base logics autonomously and significantly in the pallets are then prepared. Then, a screen based on the pallet function concerning the first base logic is transmitted, and, after the screen has been received, the pallet function concerning the second base logic is executed. On the basis of the results of the execution of this function, the above-mentioned three kinds of pallet functions are incorporated in a pallet chain function of a structure determining one processing path out of a plurality of processing paths at least one of which comprises the execution of a pallet function concerning the third basic logic.

5 Claims, 43 Drawing Sheets

U.S. PATENT DOCUMENTS

| | | | |
|---|---|---|---|
| 5,200,888 | 4/1993 | Hashimoto | 364/400 |
| 5,216,592 | 6/1993 | Mann et al. | 705/8 |
| 5,233,513 | 8/1993 | Doyle | 705/7 |
| 5,430,873 | 7/1995 | Abe et al. | 395/702 |
| 5,450,545 | 9/1995 | Martin et al. | 395/701 |
| 5,485,601 | 1/1996 | Ching | 395/500 |
| 5,490,232 | 2/1996 | Asano et al. | 706/45 |
| 5,530,869 | 6/1996 | Salle | 395/701 |
| 5,564,053 | 10/1996 | Yuki et al. | 395/701 |
| 5,568,642 | 10/1996 | Negoro et al. | 395/701 |
| 5,640,499 | 6/1997 | Nagai | 345/437 |
| 5,706,405 | 1/1998 | Short et al. | 706/45 |
| 5,794,040 | 8/1998 | Ono et al. | 395/701 |

FIG. 2

```
         1         2         3         4         5         6         7         8
123456789012345678901234567890123456789012345678901234567890123456789012345678901234567890
 KH211E       SALES INPUT (DIRECT SALES)              DD/DD/DD  TT:TT:TT
        BBBBBB   000000000000000000000                         0000000
        BB       000000000000000000                              999999
        BBBBBBBB 00000000000000000000000000000000                999999
        BBBBBBBB 000000000000000000000000000000           B 0000000
        BBBBBB   000000000000000000000000000  SLIP ORDER No.  BBBBBBBBBBBBBB
        BBBBBBBBBBBBBBBBBBBBBBBBBB BBBBBBBBBBBBBB              BBBBBBBBBBBBBB
        BBBBBBBBBBBBBBBB

LINE

66  BBBBBBBBBB   9999.99   999,999.999-  99,999,999  666,666,666-
      BBBBBBBBBBBBBBBBBBBB                 00000000000000000000
  66  BBBBBBBBB    9999.99   999,999.999-  99,999,999  666,666,666-
      BBBBBBBBBBBBBBBBBBBB                 00000000000000000000
  66  BBBBBBBBB    9999.99   999,999.999-  99,999,999  666,666,666-
      BBBBBBBBBBBBBBBBBBBB                 00000000000000000000
  66  BBBBBBBBB    9999.99   999,999.999-  99,999,999  666,666,666-
      BBBBBBBBBBBBBBBBBBBB                 00000000000000000000
  66  BBBBBBBBB    9999.99   999,999.999-  99,999,999  666,666,666-
      BBBBBBBBBBBBBBBBBBBB                 00000000000000000000
                  6,666,666-              6,666,666,666-
                  6,666,666-              6,666,666,666-         0
 CONTINUATION REGISTER END REFERENCE
 00000000000000000000000000000000000000000000000000000000000000000000000000
```

FIG. 3

```
         1         2         3         4         5         6         7         8
1234567890123456789012345678901234567890123456789012345678901234567890123456789 0
KH600Q    REFERENCE OF CUSTOMER CODE              DD/DD/DD  TT:TT:TT 66 00000000 00000000 00000000 00000000 00000000 00000000 00000000 00000000
66 00000000 00000000 00000000 00000000 00000000 00000000 00000000 00000000
66 00000000 00000000 00000000 00000000 00000000 00000000 00000000 00000000
66 00000000 00000000 00000000 00000000 00000000 00000000 00000000 00000000
66 00000000 00000000 00000000 00000000 00000000 00000000 00000000 00000000
66 00000000 00000000 00000000 00000000 00000000 00000000 00000000 00000000
66 00000000 00000000 00000000 00000000 00000000 00000000 00000000 00000000
66 00000000 00000000 00000000 00000000 00000000 00000000 00000000 00000000
66 00000000 00000000 00000000 00000000 00000000 00000000 00000000 00000000
66 00000000 00000000 00000000 00000000 00000000 00000000 00000000 00000000
66 00000000 00000000 00000000 00000000 00000000 00000000 00000000 00000000
66 00000000 00000000 00000000 00000000 00000000 00000000 00000000 00000000
66 00000000 00000000 00000000 00000000 00000000 00000000 00000000 00000000
66 00000000 00000000 00000000 00000000 00000000 00000000 00000000 00000000
66 00000000 00000000 00000000 00000000 00000000 00000000 00000000 00000000
66 00000000 00000000 00000000 00000000 00000000 00000000 00000000 00000000

99             BBBBBBBBBBBB              BBBBBB           0
             CONTINUATION RETURN                                              F8
000000000000000000000000000000000000000000000000000000000000000000000000000000
```

FIG. 4

```
         1         2         3         4         5         6         7         8
12345678901234567890123456789012345678901234567890123456789012345678901234567890
KH410E       ARRIVAL CONFIRMATION INPUT                     DD/DD/DD  TT:TT:TT

BBBBBB  0000000000000000000000

BB    000000000000000000

B    (1:HARD, 2:SOFT)

B    (1:AGENCY PRODUCT, 2:MORMAL)

CONTINUATION REGISTER END REFERENCE
000000000000000000000000000000000000000000000000000000000000000000000000
```

FIG. 5

```
         1         2         3         4         5         6         7         8
1234567890123456789012345678901234567890123456789012345678901234567890123456789012345678
KH616Q              REFERENCE OF WAREHOUSE CODE           DD/DD/DD  TT:TT:TT 66  00                    0000000000000000000000000000000000
   66  00                    0000000000000000000000000000000000
   66  00                    0000000000000000000000000000000000
   66  00                    0000000000000000000000000000000000
   66  00                    0000000000000000000000000000000000
   66  00                    0000000000000000000000000000000000
   66  00                    0000000000000000000000000000000000
   66  00                    0000000000000000000000000000000000
   66  00                    0000000000000000000000000000000000
   66  00                    0000000000000000000000000000000000
   66  00                    0000000000000000000000000000000000
   66  00                    0000000000000000000000000000000000
   66  00                    0000000000000000000000000000000000
   66  00                    0000000000000000000000000000000000
   66  00                    0000000000000000000000000000000000
   66  00                    0000000000000000000000000000000000
             99                                                              0
   CONTINUATION RETURN
0000000000000000000000000000000000000000000000000000000000000000000000000000000000000000
```

FIG. 6

```
         1         2         3         4         5         6         7         8
1234567890123456789012345678901234567890123456789012345678901234567890123456789 0
KH510E          DELIVERY REQUEST LIST                         DD/DD/DD  TT:TT:TT

DELIVERY REQUEST DATE OUTPUT FROM 999999 TO 999999

EXECUTION – CONTINUATION F2 – REGISTER F3 – END
0000000000000000000000000000000000000000000000000000000000000000000000000000000
```

FIG. 7A

| LINE\DIGIT | 1-10 | 11-20 | 21-30 | 31-40 |
|---|---|---|---|---|
| | 1 2 3 4 5 6 7 8 9 0 | 1 2 3 4 5 6 7 8 9 0 | 1 2 3 4 5 6 7 8 9 0 | 1 2 3 4 5 6 7 8 9 0 1 2 3 4 |
| 1 | K H 5 0 1 0 | | | |
| 1 | | | | |
| 1 | | | | |
| 1 | DEPARTMENT | | | |
| 1 | | | | |
| 1 | A DELIVERY PLACE | X X X X X X X X X X | N | |
| 1 | BILLING DESTINATION | X X X X X X X X X X | X X X X N N N N N N | N N N N N N N N N N N N N N |
| 2 | DELIVERY REQUEST DATE | DELIVERY NO. | DUE PRODUCT CODE | PRODUCT NAME |
| 2 | Y Y Y Y / M M / D D | X X X X X X X X X X | 9 9 X X X X X X X X | X X X X X X X X X X X X X X |
| 2 | Y Y Y Y / M M / D D | X X X X X X X X X X | 9 9 X X X X X X X X | X X X X X X X X X X X X X X |
| 2 | Y Y Y Y / M M / D D | X X X X X X X X X X | 9 9 X X X X X X X X | X X X X X X X X X X X X X X |
| 3 | | | | |
| 3 | A DELIVERY PLACE | X X X X X X X X X X | N | |
| 3 | BILLING DESTINATION | X X X X X X X X X X | X X X X N N N N N N | N N N N N N N N N N N N N N |
| 3 | DELIVERY REQUEST DATE | DELIVERY NO. | DUE PRODUCT CODE | PRODUCT NAME |
| 3 | Y Y Y Y / M M / D D | X X X X X X X X X X | 9 9 X X X X X X X X | X X X X X X X X X X X X X X |
| 3 | Y Y Y Y / M M / D D | X X X X X X X X X X | 9 9 X X X X X X X X | X X X X X X X X X X X X X X |
| 3 | Y Y Y Y / M M / D D | X X X X X X X X X X | 9 9 X X X X X X X X | X X X X X X X X X X X X X X |
| 4 | | | LINE | |
| 4 | | | | |
| 4 | | | | |
| 4 | | | | |
| 4 | | | | |

| DIGIT\LINE | 1 | | | | | | | | | | 2 | | | | | | | | | | 3 | | | | | | | | | | 4 | | | | | |
|---|---|---|---|---|---|---|---|---|---|---|---|---|---|---|---|---|---|---|---|---|---|---|---|---|---|---|---|---|---|---|---|---|---|---|---|---|
| | 1 | 2 | 3 | 4 | 5 | 6 | 7 | 8 | 9 | 10 | 1 | 2 | 3 | 4 | 5 | 6 | 7 | 8 | 9 | 20 | 1 | 2 | 3 | 4 | 5 | | | | | | | | | | | |

(table content with 90-100, 101-110, 111-120, 121-130, 131 digit columns containing REQUEST LIST, POST-1, NAME IS CHARGE, STORE INCHARGE, ORDER NO., LINE, PRODUCT markings and X/N/M/D/9 data entries)

FIG. 8A

| LINE | DIGIT | 3 | 4 | 5 | 6 | 7 | 8 | 9 | 0 | 1 | 2 | 3 | 4 | 5 | 6 | 7 | 8 | 9 | 0 | 1 | 2 | 3 | 4 | 5 | 6 | 7 | 8 | 9 | 0 | 1 | 2 | 3 | 4 | 5 | 6 | 7 | 8 | 9 | 0 |
|---|---|---|---|---|---|---|---|---|---|---|---|---|---|---|---|---|---|---|---|---|---|---|---|---|---|---|---|---|---|---|---|---|---|---|---|---|---|---|---|
| | | 133–140 | | | | | | | | 141–150 | | | | | | | | | | 151–160 | | | | | | | | | | 161–170 | | | | | | | | | |
| 1 | 1 | | | | | DATE | | | | | | Y | Y | / | M | M | / | D | D | | P | A | G | E | | | Z | Z | Z | | | Z | Z | Z | | | | | |
| | 2 | | | | | | | | | | | | | | | | | | | | | | | | | | | | | | | | | | | | | | |
| | 3 | | | | | | | | | | | | | | | | | | | | | | | | | | | | | | | | | | | | | | |
| | 4 | | | | | | | | | | | | | | | | | | | | | | | | | | | | | | | | | | | | | | |
| | 5 | | | | | | | | | | | | | | | | | | | | | | | | | | | | | | | | | | | | | | |
| | 6 | | | | | | | | | | | | | | | | | | | | | | | | | | | | | | | | | | | | | | |
| | 7 | | | | | | | | | | | | | | | | | | | | | | | | | | | | | | | | | | | | | | |
| | 8 | | | | | | | | | | | | | | | | | | | | | | | | | | | | | | | | | | | | | | |
| 2 | 9 | | CUSTOMER ORDER NO | | | | | | | | | | | | | | | | | | I | N | S | T | | | | | | CITY | | | | | | DELIVERY | | | |
| | 10 | X | X | X | X | X | X | X | X | X | X | X | X | X | X | X | X | X | X | X | | | | | N | | | N | | | N | | | | | | | | | |
| | 11 | X | X | X | X | X | X | X | X | X | X | X | X | X | X | X | X | X | X | X | | | | | N | | | N | | | N | | | | | | X | | | |
| | 12 | X | X | X | X | X | X | X | X | X | X | X | X | X | X | X | X | X | X | X | | | | | N | | | N | | | N | | | | | | X | | | |
| | 13 | | | | | | | | | | | | | | | | | | | | | | | | | | | | | | | | | | | | X | | | |
| | 14 | | | | | | | | | | | | | | | | | | | | | | | | | | | | | | | | | | | | | | | |
| | 15 | | | | | | | | | | | | | | | | | | | | | | | | | | | | | | | | | | | | | | | |
| | 16 | | | | | | | | | | | | | | | | | | | | | | | | | | | | | | | | | | | | | | | |
| 3 | 17 | | CUSTOMER ORDER NO | | | | | | | | | | | | | | | | | | I | N | S | T | | | | | | CITY | | | | | | | | | |
| | 18 | X | X | X | X | X | X | X | X | X | X | X | X | X | X | X | X | X | X | X | | | | | N | | | N | | | N | | | | | | | | | |
| | 19 | X | X | X | X | X | X | X | X | X | X | X | X | X | X | X | X | X | X | X | | | | | N | | | N | | | N | | | | | | | | | |
| | 20 | X | X | X | X | X | X | X | X | X | X | X | X | X | X | X | X | X | X | X | | | | | N | | | N | | | N | | | | | | | | | |
| | 21 | | | | | | | | | | | | | | | | | | | | | | | | | | | | | | | | | | | | | | | |

L (SALES, 4)

FIG. 25A

| HOMOGENEITY MAP | | | | |
|---|---|---|---|---|
| TENSE CONTROL FUNCTION | COMPONENT | | | |
| $\phi_0$ | PALLET | W02 | | |
| | BASE DEFINITIVE | SCREEN | | |
| | MEANING ELEMENT | SCREEN WORD | | |
| | RANGE OF TENSE CONTROL FUNCTION $\phi_0$ | $T_0 = \phi_0(\{\phi_{p,k}\{L_i,2, T_1,f\}\} + \{\phi_{p,k}\{L_i,3, T_1,g\}\} + \{\phi_{p,k}\{L_i,4, T_1,q\}\})$ | | |
| $\phi_1$ | PALLET | W02 | W03 | W04 |
| | BASE DEFINITIVE | FILE | NONE | FILE/DOCUMENT |
| | MEANING ELEMENT | FILE WORD | ALL WORDS | FILE/DOCUMENT WORD |
| | RANGE OF TENSE CONTROL FUNCTION $\phi_1$ | $T_{1,f} = \phi_1(\phi_p, f\{L_j, 3\} + \phi_{p,f}\{L_j, 4\})$ | | |

FIG.25B

| SEMANTIC AREA | | |
|---|---|---|
| W03 | W04 | |
| NONE | SCREEN | |
| ALL WORDS | SCREEN WORD | |

| W02 | W03 | W04 | |
|---|---|---|---|
| FILE | NONE | FILE/DOCUMENT | |
| FILE WORD | ALL WORDS | FILE/DOCUMENT WORD | |
| $T_{1,f}$ $=\emptyset_1(\emptyset_p, f\{L_j, 2\})$ $+\emptyset_{p,f}\{L_j, 3\} +\emptyset_{p,f}\{L_j, 4\}$ | | | |

| W02 | W03 | W04 | |
|---|---|---|---|
| FILE | NONE | FILE/DOCUMENT | |
| FILE WORD | ALL WORDS | FILE/DOCUMENT WORD | |
| $T_{1,f}$ $=\emptyset_1(\emptyset_p, f\{L_i, 2\})$ $+\emptyset_{p,f}\{L_j, 3\} +\emptyset_{p,f}\{L_j, 4\}$ | | | |

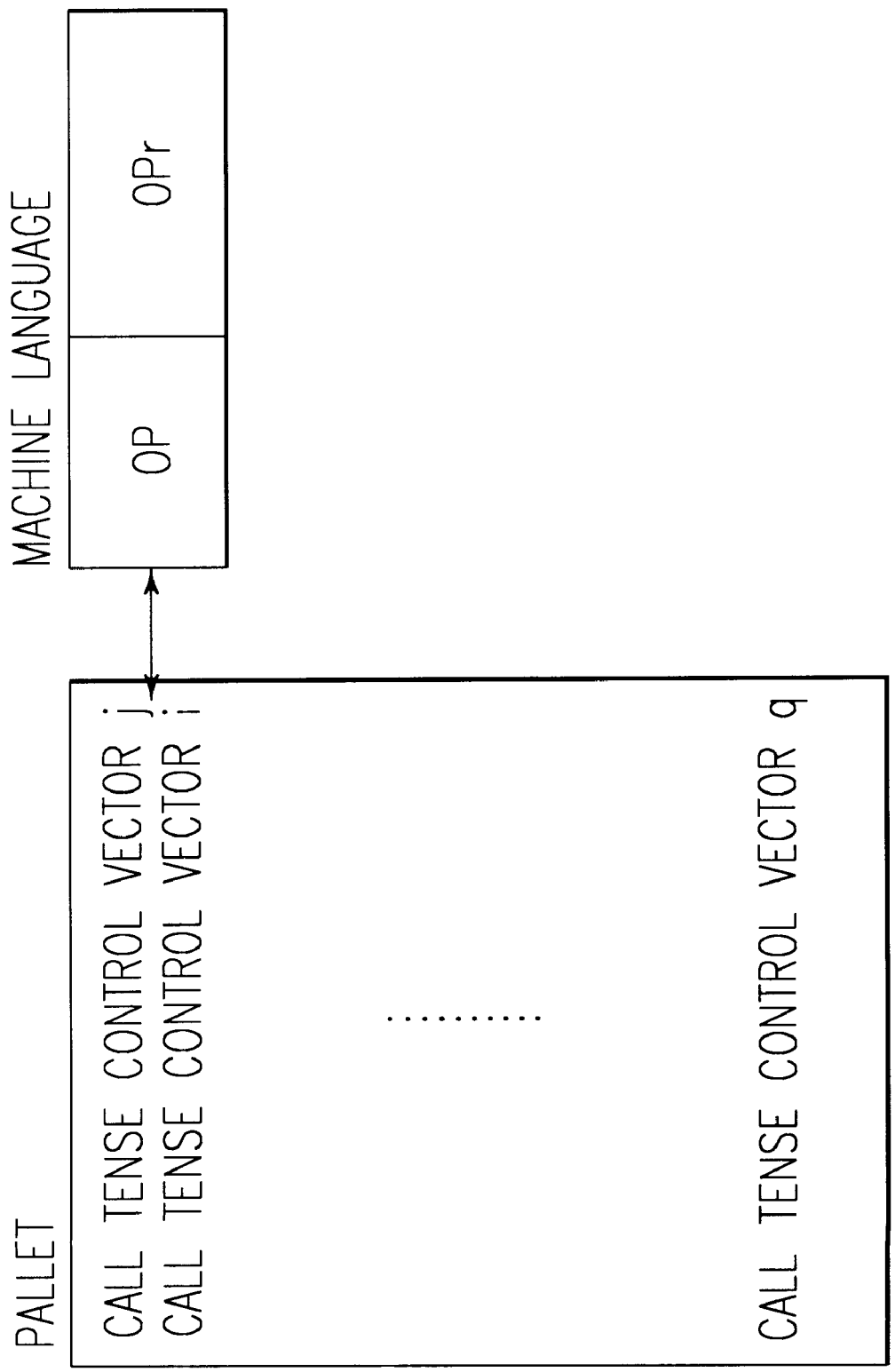

15 L(SALES, 3)

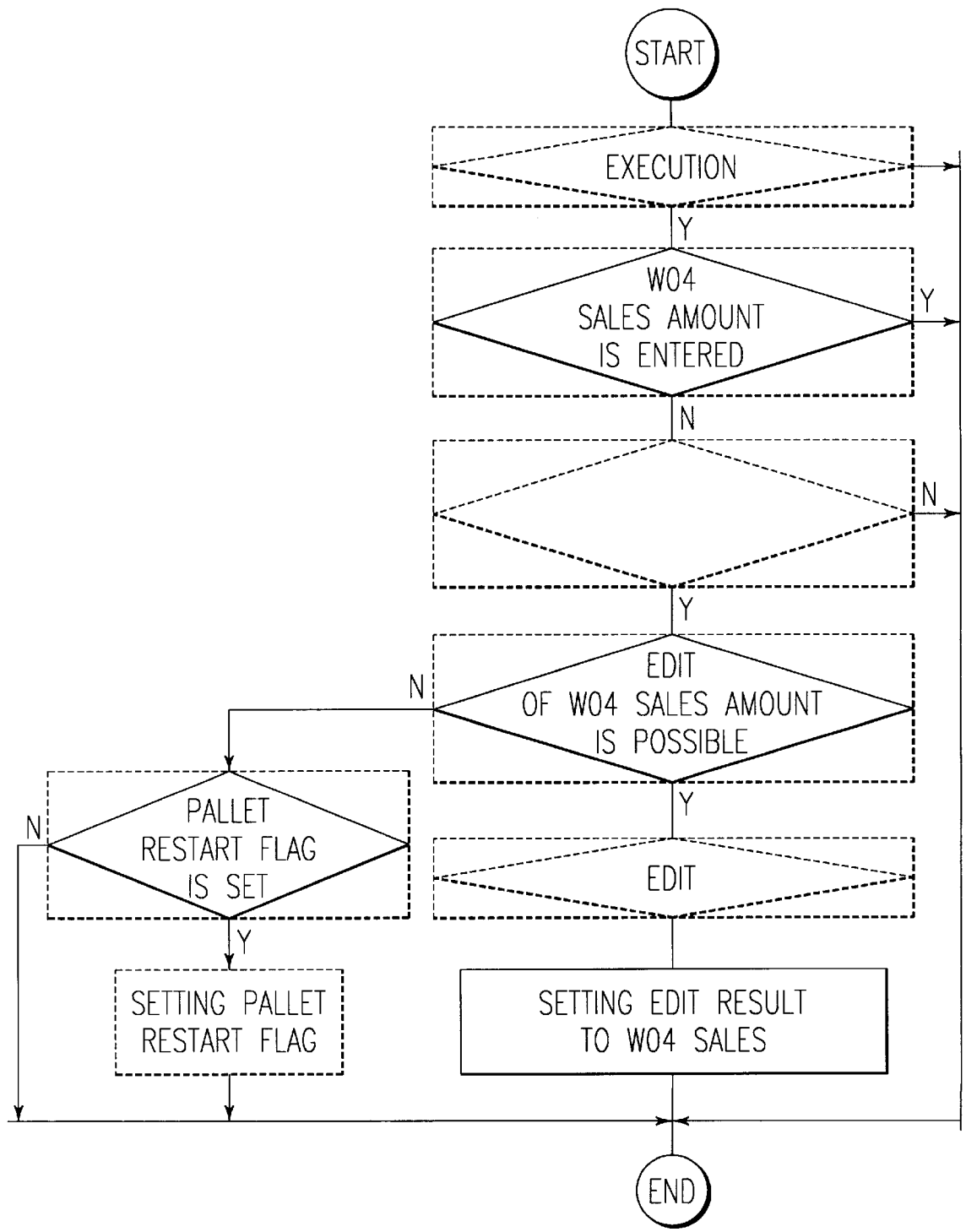

SOFTWARE PRODUCTION METHOD, PROCESSING APPARATUS AND RECORDING MEDIUM

TECHNOLOGY FIELD

This invention is related to a production method, a processing apparatus and a recording medium applicable to all software for business, games, and all other fields.

BACKGROUND ART

How well the OS and package may be made, they cannot fulfill user's needs by themselves alone. Software always requires the part which users have to develop on their own account. The key is that the software production technology must be adopted to the part. Consequently, the production technology must enable to realize effects such as short-term development, removal from maintenance problems, methods of connecting the upper-stream and program specifications, guarantee of program's functional quality, etc.

The prior art method is a functional division method, by which requirement functions are extracted to be made into software. However, in most of such cases, it is not understood that a supplemental logic will derive from the functional division method. Besides, it goes without saying that this thinking method has a fundamental defect, which causes all problems of software to be solved. To fundamentally improve those problems, it is necessary to introduce an new idea or a theory of a conceptual division method that allows to confine the requirement event, by replacing the traditional thinking method.

SUMMARY OF THE INVENTION

It is an object of the present invention to provide a software production method and system that improves programmer efficiency.

It is another object of the present invention to provide a uniform method of structuring software.

These and other objects of the present invention are achieved according to a method and system for generating software based on a user interface created according to a software requirement.

Glossary of Terminology

Unit-team—not only what composes the current understanding ("real state") of an idea (either by a person or by a computer), but also what composes inner being ("true state") of an idea Mean-space—a general term indicating three time-independent spaces which governs a state between real state and true state. In this context, "real state" is a time-dependent space in which data code associated with a word is perceived as a meaning of the word; "true state" is a time-independent space in which data code associated with a word is not yet perceived as a meaning of the word. Lyee theory deals with what governs a stage between real state and true state.

Tense control function—the function that causes the transition between pallet functions. In a software embodiment, the tense control function is implemented, for example, as a program.

Pallet—a series of tense control vectors collected that represent how a system moves between states. In a software implementation, an exemplary embodiment of a pallet, being represented as a series of function calls as shown in FIG. 27, is implemented, for example, as a sub-program. It is a pallet function that functions as collecting tense control vectors. Pallet function collects tense control vectors in a fashion as depicted in FIG. 27. A pallet Duplicate vector and Homogeneity vector operate to bring about an outcome, i.e. to generate data code for self word.

Tense control vector—a general term indicating a Duplicate vector and a Homogeneity vector. In a software embodiment, the tense control vector is implemented, for example, as a sub-routine called by a sub-program.

Duplicate vector—a sub-class of tense control vectors that duplicates (i.e., topologically propagates) data from one state to another neighboring state when data exists for a word. In a software embodiment, a Duplicate vector is implemented, for example, as a unit program consisting a sub-routine.

Homogeneity vector—a sub-class of tense control vectors that allows new data code to be associated with a word which is a minimum unit having a meaning and not a meaning itself. In a software embodiment, Homogeneity vector is implemented, for example, as a unit program consisting a sub-routine. By the function of Homogeneity vector allocated to a word a data code gets associated with the self word, before the word-associated data is displayed, for example, on a screen, and a human cognizes the displayed data as a meaning for the word.

The inventor contrived such a theory of a conceptual division method, and named it LYEE (GOVERNMENTAL METHODOLOGY for SOFTWARE PROVIDENCE). This theory provides the standard of a new thinking method towards the future.

The inefficiency of software production maintenance puts forward software production means to the production of mechanical function packaging that ignores the specific character of software. The software package itself is a non-correct solution type, while still requiring nonproductive development and maintenance, eventually worsening user's environment, including reliability, usage ability, and adaptability (RAS) functions. Needed for the present time is the preparation of the production base.

In this field, a solution to production technology problems has not been tried, i.e., without having the method of managing the quality of process functions by the unit of the program, it has been said that the good software can be decided only with its upper-stream concern. Hence comes its abnormality. The software production method does not inherently belong to the characteristic allowing the separation of the upper and lower stream concerns, but we must start from the point of grasping it theoretically. The LYEE theory exactly satisfies it.

That is, the purpose of the invention is as follows:

(1) To improve the production ability of software developers and maintenance personnel.

(2) To theoretically connect the upper-stream and lower-stream information.

(3) To provide a program structure applicable to the development for the broad software field, including not only limited to business software but also to OS, middle software, games software, etc.

(4) To minimize the upper-stream information and create a source program.

An excerpt of the following thesis of the inventor is herein introduced.

Title: JUSTIFICATION FOR BEING SOFTWARE
Subtitle: True State Structure of Software
Subtitle: A Theory of inducing a three-dimensional thinking method from a two-dimensional thinking method The existence involves the true state and the real state. They are ruled by the unit-team of the elementary.

The true state is the origin of existence, and its unit-team will become a unit-team representing the origin of acceptance formed by the association of ideas. The real state is an event represented by the duplication of the unit-team of the origin of acceptance.

The thinking method of the living body is nothing but the real state for its existence. Two unit-teams and duplicated unit-teams, which are led to the real state, are generally called the real state unit-team, and the action to materialize the unit-team is called theorization.

The existence recognized by the living body, for example, is merely related to the real state such as that water is $H_2O$, but not that the true state of water can be recognized. What were recognized by Newton and Einstein were the real state, and even if they are combined, it doesn't provide the ground for elucidating the real state of the natural rule.

The elementary exists with its particular time, and its value is not the same. Elementary having different time speeds cannot occupy the same mean-space. Therefore, mean-spaces occupied by them will become different.

The time speed of the elementary representing the true state must be materialized in advance of the time speed of the real state (so to speak the way of existence). Therefore, the unit-team representing the real state develops in the area called the cognitive mean-space, and the unit-team representing the real state develops in the area called cognitive mean-space but with the different time speed.

The memory is a subset of a cognitive mean-space created by the living body. The elementary of the cognitive mean-space exists therein. By using this memory, the living body creates an additional unit-team and attempts the assimilation to the existing real state unit-team. The assimilation is an action to attempt success or failure of the corresponding relation between two unit-teams. If the assimilating action is established, the real state unit-team is accepted as a memory.

The living body itself is a real state existing in the cognitive mean-space having its particular time speed. Therefore, the unit-team created by the living body will become a unit-team representing the real state. Then, the elementary of the unit-team will limitingly become an elementary existing as a memory. In other words, the living body cannot, in principle, link elementary with different time speed.

Consequently, the elementary that can be memorized by the living body will be limited to the elementary that can be created by the living body, thus the elementary representing the true state shall never be accepted. Therefore, the recognition of the living body, as long as it is the real state created by the living body, shall never be registered as a recognition phenomenon of the true state that was not memorized.

The elementary created by the living body will become effective with the physical laws of the living body in accordance with its density development, resulting in the ruling of the elementary. In other words, the living body takes the ground of choosing the ruling by the real state rather than the true state.

If the living body is awakened to the thinking method allowing the recognition of the true state, the effect of its development shall be incomparable to the effect of the real state.

This thesis discusses the thinking method to theoretically pursue the true state. The purpose leads to the conclusion that the true state structure will become the ultimate software structure to overcome software problems.

Chapter 1

1.1 Logic Equation

The elementary is an independent structure based on its structural elements such as meanings, significance and time speed. The meaning is a volition to represent the existence. This volition will be decided in the order of its emergence. The emergence order and this volition forms the only pair, therefore, with no others having the same quality elementary. The unit-team order of the logic equation discussed later represents this emergence order. And, this volition represents the expansion of the mean-space.

The significance co-lives with the meaning, which is a volition to expand the existence of the meaning. The meaning, based on this significance, links to the meaning of other elementary. The unit-team discussed later is what is induced by the action of this volition.

The expansion action of the significance is universal. This significance is expressed as a logical function in this theory.

The time speed is accompanied with an elementary, and by the particular time speed of the elementary, its existing mean-space is decided. The mean-space area where the elementary exists is called the population. The consciousness mean-space and cognitive mean-space are the population.

The meaning changes its being in accordance with the mean-space area where it exists. That is, it exists as an uniform expansion of the mean-space in the consciousness mean-space having its size. In the cognitive mean-space, it exists as a diversified and multiple expansion of the mean-space. The time speed will be discussed later.

The unit-team is a row of the descending order of the expansion of the mean-space of the elementary of the subsets of the population which were decided. This row is called the descending order row. This subset is comprised of more than one elementary belonging to the population.

The significance of the elementary is unitized by being unit-teamed. Through this process, the relationship of the sum total and duplication of the expansion of the mean-space of the subset elementary can be established. If an elementary approximating to the sum total exists in the population, it is called an elementary with the equivalence to a unit-team. The sum total, equivalence and duplication are discussed later.

The unit-team is to materialize the emerging order of the elementary equivalent to the unit-team. And, the logic equation is what regularize the relationship. By using this logic equation, the further state relating to the unit-team will be induced. When the elementary equivalent to the unit-team is only one, the unit-team and unit-team's elementary are the one and only. When plural pieces exist, it represents to be diverse meanings. If none exists, it all becomes indefinite.

The elementary existing in the consciousness mean-space is independent of its particular time speed. Therefore, this elementary will never exist in duplication. This elementary is called a meaning element. Naturally, its unit-team will never be duplicated. Consequently, its unit-team will only materialize in the consciousness mean-space. As a result, the consciousness mean-space can be ruled as the only one mean-space.

On the other hand, the elementary existing in the cognitive mean-space cannot exist independently from its particular time speed. Therefore, this elementary exists in duplication. This is called a state element. Naturally, its unit-team will be duplicated. Consequently, its unit-team will only materialize in the cognitive mean-space. As a result, the cognitive mean-space is not the only one mean-space unlike the consciousness mean-space because of its duplication ability, and its partial mean-space will become polysemous and its whole will be indefinite. The duplication means that the expansion of the mean-space of the elementary is expanded in multiplicity.

The unit-team induces a further unit-team. In this relation, the elementary equivalent to a new unit-team is called an end elementary, and the elementary equivalent to the unit-team which plays an intermediary for inducing a new unit-team is called an intermediate elementary.

The unit-team materializing in the consciousness mean-space is called a consciousness unit-team, and the unit-team materializing in the cognitive mean-space is called a transposition unit-team. The consciousness unit-team represents the true state of the existence, i.e., the origin of existence, and the transposition unit-team represents the real state of the existence, i.e., the origin of acceptance. For example, the representation of various real states of water is due to the duplication of the transposition unit-team expressing water. The duplicated transposition unit-team is called a state unit-team.

To materialize the transposition unit-team, it is necessary to associate ideas of the consciousness unit-team and the transposition unit-team. However, the mean-space of the existence of these two unit-teams is not the same, so the time speed is different, thus a direct association of ideas cannot be performed. For this reason, the consciousness mean-space will require a consciousness unit-team and a relative unit-team for association. The relative unit-team is what will make the consciousness mean-space, which is not duplicable, to duplicate. That is to say that the consciousness unit-team makes appearance of the relative unit-team which materializes the lowest-position duplication only within a certain time duration. This time is called a transposition time. The transposition time is the time which is decided by the ratio between the time speed of the elementary existing in the target consciousness mean-space and the time speed of the elementary in the cognitive mean-space to be associated. The consciousness unit-team is associated to the transposition unit-team via the relative unit-team.

The unique-like elementary will exist eternally, but the polysemous elementary will decay. However, if not indefinite, it will possess the possibility of assimilating with the meaning element. The elementary assimilating with the meaning element is called a recurrence elementary. The recurrence elementary can exist eternally the same as the meaning element. The elementary to be indefinite will always only decay.

As already discussed, the unit-team is decided by the action of the elementary's significance. It means to decide, from the population, such as the subset of the population, the descending order row of the elementary belonging to the subset, and the elementary equivalent to the descending order row. The action of the significance is made to be a logic function. The following shows its algorithm.

[1] To extract elementary from the population, which respectively approximate to the elementary belonging to the intermediary elementary. The approximate elementary means that the size of the expansion of the mean-space represented by the elementary's significance is approximate each other. The approximation has the size of the expansion of the mean-space on the plus and minus sides, so both are extracted. When the plus and minus elementary forms into one, the only one elementary will be extracted, however, two approximate elementary must additionally be looked for. Until the two elementary can be extracted, this action will be continued. If not elementary to be extracted, this action terminates at this point. When the elementary to be extracted exists polysemously, either one will be extracted optionally.

[2] To make a set of new unit-team's elementary, by adding all extracted elementary and elementary of the intermediary elementary. When the elementary belonging to the set have different populations, the population with a larger number of elementary and its elementary will remain, while the population with a smaller number of elementary and its elementary will be excluded.

[3] When the same elementary exist, only one will be regularized.

[4] To make a row of the sizes of the expansion of the mean-space, in the descending order, which are represented by the elementary of the new set. It is called a descending order row.

[5] To decide, from the population, the elementary equivalent to the descending order row. The equivalent elementary is calculated by the sum total relationship. It means to be the elementary with which the unit-team approximates to the size of the expansion of the mean-space at the plus side. The sum total relationship means: The expansion of the mean-space of the elementary existing on the odd-number ranking of the elementary order in the descending order row will be absorbed into the expansion of the mean-space of the first elementary of the elementary order, then, to decide the size of the expansion of the mean-space by mathematically adding the expansion of the mean-space of the elementary existing on the even-number ranking to the expansion of the mean-space of the first elementary of the elementary order.

(1) Logic Equation $$E_{k,R}+\Phi_{k-1}(E_{k-1,R}+\{E_m\}_D)$$

The logic equation represents the relationship of the end elementary $E_{k,R}$ induced from the logic function $\Phi_{k-1}$, which operates on the intermediary elementary $E_{k-1,R}$ and the elementary of its population $\{E_m\}_D$.

The subscript K represents the unit-team order of the case when the unit-team is repeated. The unit-team order is regulated as the natural number $1 \leq K$. In this theory, the unit time of the consciousness mean-space is grasped by the definition of the time one unit-team is induced from the other unit-team. Therefore, the unit-team order will become what represents the unit time of the consciousness mean-space. The unit-team order is never duplicated, therefore it is always the only one.

The subscript R represents the duplication order in the case that the unit-team is duplicated. The duplication order is regulated as the natural number $0 \leq R$. In this theory, the unit time of the cognitive mean-space is grasped by the definition of the time one unit-team is induced from the other unit-team. Therefore, the duplication order will become what represents the unit time of the cognitive mean-space. The duplication order is polysemous. That is, in the cognitive mean-space the same real states will appear in the different duplication order. The unit-team order and the duplication order will never change at the same time. When the unit-team order changes, the duplication order will be fixed by R=0, and when the duplication order changes, the unit-team order will be fixed.

The rephrase of the logic function $\Phi_{k-1}$ which operates on the intermediary elementary is the logic function which operates on the unit-team of the unit-team order K−1. The subscript D of the population $\{E_m\}_D$ is represented by W in the case of the consciousness mean-space and C in the case of the cognitive mean-space. The number of the elementary of the subset of the end elementary and the intermediary elementary is a relationship of $N_{k+1} \geq N_k$.

The logic equation can be developed as follows.

$$E_{k,R}=\Phi_{k-1}(E_{k-1,R}+\{E_m\}_D)$$

$$E_{k-1,R}=\Phi_{k-2}(E_{k-2,R}+\{E_m\}_D)$$

(2) The Real State Unit-team

The real state unit-team materializes association of ideas with three kinds of the unit-team, while materializing duplication with the transposition unit-team, which is one of the three kinds. In this theory, to materialize the real state unit-team, that is, to materialize the logical operation cognitively is called a solution. The solution will be discussed later.

01. The Cognitive Unit-team ($K \geq 1$, $R=0$)

The cognitive unit-team is the unit-team representing the true state which takes the meaning materialized in the consciousness mean-space as the unit-team elementary. That is, $$M_{k,0}=\Phi_{k-1}(M_{k-1,0}+\{M_m\}_w)=\Phi_{k-1}\Phi_{k-2}\ldots\Phi_2\Phi_1\Phi_0(M_{0,0}+\{M_m\}_w)$$

The logic function is only one. Therefore, if it is shown by $\Phi$, the logic function column of the above formula row is $\Phi^K$. Consequently, the above formula can be shown as follows.

$$M_{k,0}=\Phi^K(M_{0,0}+\{M_m\}_w)$$

The $M_{0,0}$ is called a boundary condition herein.

When the consciousness unit-team is made to be software, the boundary condition is replaced with a definitive.

If the number of the meaning element is M, the number of formation of the cognitive unit-team $G_M$ is as follows.

$$GM=M^C1+M^C2+\ldots+M-1^CN-1+M^CN$$

The symbol C represents a combination formula. The largest consciousness unit-team is a unit-team comprised of all meaning elements of the consciousness mean-space. When the consciousness unit-team reach to this size, the logical operation in the consciousness mean-space will stop.

02. The Relative Unit-team ($K \geq 1$, $R+1$)

It is a unit-team established in the consciousness mean-space which is induced from the consciousness unit-team in order to associate the consciousness unit-team with the transposition unit-team. That is, $$M_{k,1}=\Phi^K(M_{0,1}+\{M_m\}_w)$$

03. The Transposition Unit-team ($K \geq 1$, $P=1$)

It is a unit-team with the origin of forming in the cognitive mean-space as the unit-team elementary which takes the state element existing in the consciousness mean-space that is associated from the relative unit-team. When the association is established, the population is replaced from the consciousness mean-space to the cognitive mean-space. That is, $$S_{k,1}=\Phi^K(M_{0,1}+\{S_m\}_c)$$

When the association of the transposition unit-team cannot be completed within the transposition time, the living body will choose with to abandon this association or to alternatively create it by using memorized information. However, it is clear that the transposition unit-team created will not obey the rule of the logical operation. With this viewpoint, the creation by the living body is polysemous, hence false. In other words, the human civilization can be interpreted as aiming towards the limit of the false.

04. The logic Equation of the State Unit-team (K=fixed, $R \geq 2$)

It is a unit-team representing the real state which is associated from the duplication of the transposition unit-team.

$$S_{k,R}=\Phi^K(M_{0,1}+\{S_m\}_c)^R$$

Therefore, the end elementary of the state unit-team will represent a variety of its real state in accordance with its duplication level. The duplication order R will operates on the transposition unit-team decided. The structure of the state unit-team is different from unit-teams, and it means that the expansion of the mean-space of the elementary belonging to the transposition unit-team will be multiplex. For example, the various representation of the original elementary of water is due to the difference in the level of the duplication of the transposition unit-team. The elementary of the state logic created by the living body is represented into the phenomena such as consciousness, feeling, language, composition, attitude and conduct.

05. The Recurrence Logic (omitted)

(3) Logical Operation

The logical operation is what associates the consciousness unit-team, the relative unit-team and the transposition unit-team with their duplicated state unit-teams.

The following is the logic equation inducing the relative unit-team from the transposition unit-team.

$$M_{0,1}=\Phi^{-K}(S_{k,1}+\{M_m\}_w) \quad (1)$$

The relationship of the transposition unit-team and the state unit-team is as follows.

$$S_{k,R}=(S_{k,1})^R \quad (2)$$

Therefore, $$S_{k,1}=(S_{k,R})^{-R} \quad (3)$$

Formula (1) is revised by substituting formula (3) for formula (1). That is, $$M_{0,1}=\Phi^{-K}((S_{k,R})^{-R}+\{M_m\}_c) \quad (4)$$

The living body can only perceive the state unit-team. Therefore, the formula (4) is used as the logic equation for obtaining the transposition unit-team from the state unit-team decided by the duplication order R by using formula (3) and then to obtain the consciousness unit-team from the aforementioned transposition unit-team. The reciprocal logic functions represented by formula (1) and formula (2) can always be established and obtained because the logic function is universal. As a result, if the elementary of the consciousness mean-space can be assumed, the consciousness unit-team existing therein can be obtained. The formula (4) is called a reciprocal logic function. The solution is nothing but this operation.

1.2 Time Providence (Refer to FIG. 23.)

The time to decide the consciousness logic is regarded as the unit time of the consciousness logic. The time to duplicate the transposition time is regarded as the unit time of the cognitive mean-space. The unit-team order in the consciousness mean-space is the only one or alike. The cognitive mean-space is partially established and indefinite as a whole. Therefore, the duplication order in the cognitive mean-space will be determined per partial mean-space and become polysemous.

Considering the fact that the unit time will change per individual situation, the specific time of the elementary grasping by the absolute time is represented by the reciprocal number of the unit time and called the time speed.

The state unit-team assimilates and becomes a memory of the living body, and the memory is presented in the form of feeling, language, conduct and documents, etc. However, before it occurs, the consciousness unit-team, which is its origin, must have already been established and existing. That is, it is necessary that the time speed required for the formation of the consciousness unit-team must be greater than the time speed required for the formation of the state unit-team.

The unit time, the time speed, the transposition time and the recurrence time are called the time providence in general. The following are the definition.

(1) Unit Time

Unit time to decide the consciousness unit-team: $t_U(M_{k,0})$
Unit time to decide the state unit-team: $t_U(S_{k,R})$
Unit time relation of two mean-spaces: $t_U(M_{k,0}) << t_U(S_{k,R})$ (2) Time Speed Time speed of the consciousness unit-team:

$$t_v(M_{k,0}) = 1/t_U(M_{k,0})$$

Time speed of the state unit-team:

$$t_v(S_{k,R}) = 1/t_U(S_{k,R})$$

Time speed relation of two mean-spaces:

$$t_v(M_{k,0}) >> t_v(S_{k,R})$$

A large elementary of the time speed exists independently. A small elementary of the time speed cannot exist independently.

(3) Transposition Time

Transposition time in the cognitive mean-space:

$$t_T t_v(M_{k,0})/t_v(S_{k,R})$$

(4) Occurrence Time (omitted)

Chapter 2
Software Solution

The solution to the reciprocal logic equation to induce the consciousness unit-team, that is, $$M_{0,1} = \Phi^{-K}((S_{k,R})^{-R} + \{M_m\}_c)$$

can be established concerning specified cognitive events (state unit-teams). In this chapter, the solution how to operate specified cognitive events on a computer as software will be discussed. This solution theory is called a software solution. The reciprocal theory equation to be revised by the software solution is called a scenario function. The scenario function will be discussed in Chapter 3. The scenario function will end in representing the one and only like structure of the software. Therefore, in this theory the software development work will end in jobs fulfilling this scenario function. In other words, the jobs will become the same quality work as embodying conditions appearing through the process of the software solution. Because it is to grasp the strict proposition of the work which shall decide conditions appearing through the solution process. Normally, the thinking method that can be standardized is generally rephrased as the methodology. With this theory, the thinking method used for concreteness, or its proposition itself, is the one like the knowledge of experience, but is that is grasped through the logical process called the solution. Therefore, an efficiently high ratio of the standardization can be attained, when compared with traditional approaches.

Chapter 3
The Development Methodology

The method to materialize the software solution into a development methodology is discussed herein.

The traditional software is to program, by using system engineer (SE)'s personal ability (experience, knowledge and application), requirement events, i.e., state unit-teams, while functionally regulating them in advance. In this instance, a computer assumes a role of reproducing the state unit-team as information within a short time, which was treated as an already-known fact by SE. This means that traditional programs exist for reproducing the already-known state within a short time on a computer, thus without a ground for producing a new state unit-team. Therefore, the new state unit-team will only have to depend on the logical operation of the living body, which will act on impulse of the information reproduced by a computer. things.

To realize this theory to be a development methodology is aimed to create a program representing the consciousness unit-team on paper (cognitively). Then, by structurally duplicating the program on a computer, it aims to bring forth the state unit-team associated with the consciousness unit-team onto a computer.

So to speak, the requirement event is the state unit-team, which always exists polysemously (CHAOS) Therefore, the self-conclusion by the repetition (collusion) indicates the tendency towards easy assimilation, however, fundamental defects existed in terms that it resulted in becoming non-productive on the premise that the duplication unit-team of the formation origin be created.

Consequently, the formation of the state unit-team of the requirement event is only by means of prior regulation. Hence, it was basically impossible to render this role to a computer. For example, an imagination of attempting to induce it deductively, which is represented by so-called AI, is simply not what can go over a commercial and wishful imagination. This theory presents an induction method which enables the use of a computer for handling this problem as an alternative means.

The structure of the program grasping the consciousness unit-team which is induced by this theory will take a remarkably simplified form, when compared with the structure grasping the state unit-team. As a result, human works for deciding the software producing the consciousness unit-team will also be simplified eventually. As a result, effects with remarkable improvements are brought forth to the work concerned with the development and maintenance of software. Major points of such effects are presented in the following.

(1) 50% of the SE works, traditionally essential, will become unnecessary.

(2) Logical operation by the parties concerned can be reduced broadly. That is, only 10% or so of the traditional human work of grasping the state unit-team could be mechanized. 90% of the work was inevitably rendered to individual personnel's ability. In the case of this theory which grasps the consciousness unit-team, 70% of the work can be mechanized.

(3) The logical part of the source program based on the traditional method can be compressed to 20%.

(4) The upper and lower-stream processes based on the traditional method could only be associated by programmer's self logical operation, so concerns of these processes were difficult to be understood by people except parties concerned. For this reason, the productivity of the maintenance work lowered to the level of one-tenth the productivity of the development work, which was already low. In the case of this theory, the upper and lower-stream relation can be theoretically associated, therefore programmer's personal logical operation will become unnecessary for this part. In other words, the relation isn't what is psychogenically buried any more, and by understanding the theoretical structure of this theory, anyone will become able to command the same logical operation. As a result, the productivity of the maintenance work will be able to be improved by leaps and bounds.

(01) Scenario Function

The reciprocal logic equation with a solution of software using the mean-space model, which is discussed later represents a structure of the consciousness unit-team of the software. The structure of the consciousness unit-team will universally become only one, therefore the software structure of this instance will inevitably become only one. It is called a scenario function.

The following is the scenario function which takes a screen as the base definitive.

$$T_0 = \Phi_0(\{\Phi_{p,k}\{L_{i,2}, T_{l,f}\}\} + \{\Phi_{p,k}\{L_{i,3}, T_{l,g}\}\} + \{\Phi_{p,4}\{L_{i,4}, T_{l,q}\}\})$$

in which

The $\Phi_0$ represents the tense control function which takes the base definitive as a frame.

The $\Phi_{p,k}$ represents the pallet function. The subscript k represents the frame identifier.

The $L_{i,2}$ represents the tense control vector of the semantic area WO2 of word i.

The $L_{i,3}$ represents the tense control vector of the semantic area WO3 of word i.

The $L_{i,4}$ represents the tense control vector of the semantic area WO4 of word i.

Word i of WO2, WO4 represents the word existing in frame k.

Word i of WO3 is all words existing in the system.

The $T_l$ is the scenario function taking the base definitive as a file, and it associates with traditional type programs. The subscripts f, g, q represent the file identifier.

That is, the $T_l$ is also the scenario function taking the base definitive as a file. It is a tense control function $\Phi_1$ in this instance. That is, $$T_{1,f} = \Phi_1(\{\Phi_{p,k}\{L_{j,2}\}\} + \{\Phi_{p,k}\{L_{j,3}\}\} + \{\Phi_{p,4}\{L_{j,4}\}\})$$

in which

The $L_{j,2}$ represents the tense control vector of the semantic area WO2 of word j.

The $L_{j,3}$ represents the tense control vector of the semantic area WO3 of word j.

The $L_{j,4}$ represents the tense control vector of the semantic area WO4 of word i.

Word j of WO2, WO4 is the word existing in file f.

Word j of WO3 is all words existing in the system.

(2) Mean-space Model (See FIGS. 24, 25, 26.)

The software is a relationship representing the relation of the real and true states of the existence.

The software development resides in establishing the real state unit-team. Ideally, it returns to establishing its consciousness unit-team. However, the consciousness unit-team is unknown forever, and in order to establish its consciousness unit-team, it is necessary to establish the inverse association which induces the consciousness unit-team from the state unit-team.

The indispensable condition required therein is to express the structural establishment of the cognitive mean-space and the consciousness mean-space by the only one mean-space. In this theory, this mean-space is called a mean-space model.

The mean-space model must be induced from the solution conditions appearing during the process of the software solution. Therefore, the software will return to the mean-space model, and the software development takes the same meaning as the work deciding this mean-space model. The structure of the mean-space model is discussed in the following.

The regulation of the cognitive mean-space expressed by the solution conditions are classified to reception, logic and relativity. This regulation is replaced with the two dimensional areas of three kinds. It is called a semantic area in general. The semantic area is expressed by WO2, WO3, WO4, and The WO2 represents reception. The WO3 represents logic. The WO4 represents relativity.

On the other hand, the regulation of the consciousness mean-space can be replaced with the three dimensional mean-space concept having a reciprocal association with the semantic area. That is, the mean-space model represents the cognitive mean-space with the unit-team of the semantic area, and it takes the structural body representing the cognitive mean-space in the three dimensional mean-space. Then, the semantic element discussed in this theory cannot be materialized cognitively, so the semantic element shall be replaced with a word. Consequently, the word is placed in the three dimensional mean-space formed by the semantic area. And, the word is transposed (vector analysis) into the semantic area, and its meaning is replaced with the tense control vector (program) in accordance with its own regulation. The tense control vector will be discussed later. In this connection, as for the traditional program, the meaning of the requirement event was made into the specification by using experience and knowledge, and it was made to be a logic. As for the tense control vector, the respective regulations of the semantic area take the form of the specification which replaces the meaning of words with tense control vector, instead of experience and knowledge.

When this tense control vector is unit-teamed per area, it turns out to be the functional elementary equivalent to the cognitive-state requirement event. The association already discussed means the corresponding relationship of the functional elementary can be established, which is materialized by the areal unit-team of the meaning of the word and its tense control vector. The areal unit-team means to assign the order in the semantic area, and theoretically, its form has three kinds.

However, when it is implemented as the development methodology, it takes five forms or kinds due to the law of the computer. The related order is shown in the homogeneity map to be discussed later. This order regulates the condition of the formation of the reciprocal association which induces the true state from the real state's requirement event.

The regulation of the semantic area is already known as the solution condition, and by replacing the word existing in the system with the semantic element, it will satisfy the tense control vector. And, when the areal unit-team of the semantic area is realized by using the three forms, where the tense control vector exists, any elementary can all be regulated by the combination of these three forms. Thus, from the structure of this mean-space model, the reciprocal association can be established for inducing the consciousness unit-team.

(3) Tense control vector (See FIG. 27.)

The word existing in the system shall be replaced with the semantic element existing in the cognitive mean-space. As the semantic element is made into the subset in accordance with its significance, the word is made into a set by the definitive. And, as the set semantic element is unit-teamed in accordance with its significance, the word on the definitive is unit-teamed by the life operation, and establishes the requirement event. For example, the display establishes the unit-team to the living body by using the word on its screen. The table establishes the unit-team to the living body by using the word on its table. The file establishes the unit-team to the living body by using the word on file. In terms of establishing the unit-team to the living body, the definitive can well be the requirement event.

If the software is positioned to be a means to replace the life operation, roles of -he software are explained as follows: It supplements new words in order to establish the unit-team of the word, which cannot be attained only by the word existing in the definitive. With the traditional software, the decision of such new words and their unit-team were handled by SE in advance. However, the software induced by this development methodology will handle this process just by itself. Additionally speaking, the software in essence must be of this sort.

As already discussed, the tense control vector is what has been replaced into the program by the regulation of the semantic area of the set word transposed to the semantic area. That is, the tense control vector is the program regulated by the definitive, the word, and the transposed semantic area.

And, it assumes the role for replacing the transposed word's meaning by the regulation of the transposed semantic are, then setting to it to its word address. The meaning set to the word address is decided by the two methods in order to establish the semantic area's unit-team which will produce functions. One method is to topologically set the meaning of the same word existing in other semantic areas. The other is to set by deductively inducing from the meaning of other words of the same semantic area. This operation can be satisfied by fulfilling either of the methods. And, if both can be established, the former will have the priority. The former is called the duplicate vector, and the latter is called the homogeneity vector.

In the case that all words on the definitive are transposed to the semantic areas and replaced with the tense control vector, this semantic area is called a pallet. The pallet will make a set of the tense control vector by using the pallet function which is discussed later. The tense control vector on the pallet will prepare for execution, for example, being made into a sequential list by the CALL command. This listing requires the sequence of the groups of the duplicate vector and the homogeneity vector, but the in-group sequence isn't required.

Additionally speaking, the pair of the CALL and the tense control vector will become equivalent to the pair of the command part and the OPERAND part of the machine language. This means that the tense control vector is equivalent to the OPERAND function. In this sense, the tense control vector is not a program representing traditional functions, but the logic to control the word address existing in the semantic area. It provides one of the grounds of an argument that the program can be created by the logic. The specification which replaces the meaning of the word by the regulation of the transposed semantic area provides the ground that the specification of the requirement function, as traditionally needed as the semantic area's regulation itself, is unnecessary. The regulation of the semantic area is discussed herein, which is the specification condition of the programming.

(1) Reception (WO2)

In corresponding to the cognitive action performed by the life operation, this regulation is used to decide the process route of the reciprocal association in order to create the consciousness unit-team. Not discussing merits and demerits, but the latest OS doesn't require the duplicate vector of this semantic area. The homogeneity vector decides the process route.

In the case that the cognitive operation and the file are directly concerned, the memory operation discussed on WO3 will be executed in place of WO3. (See FIG. 28.)

(2) LOGIC (WO3)

This regulation is used to make the meaning of the word to be a logic. The formation of the logic and the end of its consciousness unit-team is the same definition. The end consciousness unit-team is memorized inevitably. The memory in this instance means to make the consciousness unit-team into a file. In this connection, the journal output has the same meaning as this memory. The memory operation can be processed by the traditional program, but its functional decision will become an unwilling work from the software viewpoint, thus, this development methodology also deals with this problem.

The duplicate vector fetches information required for forming a logic from the WO2's semantic area. This operation cannot be executed when no information exists in the WO2. When no information exists in its own word address, the homogeneity vector does the induction by using information of other word address, not of its own, existing in the same WO3. When the principle to establish the induction and information of the necessary word address do not exist, the action cannot be accomplished. (See FIG. 29.)

(3) Relativity (WO4)

The unit-team additionally makes another unit-team, representing a new elementary. This semantic area handles the regulation to make additional unit-team of the consciousness unit-team. In the case that the semantic area reflects the screen information, this semantic area does screen editing for output. In the case of the file information, it does file editing for output.

The duplicate vector fetches information needed to edit from the semantic area of WO2, WO3. If no information is available, the action cannot take place. When the information exists in both semantic areas, the information of WO2 takes priority. The homogeneity vector induces information needed for editing from the information of the of the word address in the same WO4, but not of its own address. When the principle to establish the induction and the information of the necessary word address are not available, this action cannot be accomplished. (See FIG. 30.)

(4) Pallet (See FIG. 31.)

The word existing in the consciousness mean-space is made to a set per definitive. Similarly, the tense control vector is made to be a set per definitive. The pallet is this set of the tense control vector. That is, the pallet is the set of the tense control vector distinguished by the definitive and the three kinds of the semantic areas. The pallet builds the structure of the tense control vector by the pallet function. The structure of the pallet function of only one, but it is needed per pallet.

(5) WT Unit

The traditional requirement event is regulated by the definitive. The definitive organized functionally is called a WT unit (WALK-THROUGH-UNIT).

(6) Tense Control Function (See FIGS. 32, 33.)

The tense control function is used to rule the mean-space model, and it is the logic to give the sequence to the semantic area for inducing the consciousness unit-team. There are two kinds of the tense control function represented by $\Phi_0$ and $\Phi_1$. The former treats the base definitive as the screen, and the latter treats the file as the base definitive. Further to add, the latter is established as the partial mean-space of the former.

(7) Homogeneity Map

The definitive which is set by the WT unit can be rewritten into the homogeneity map. The homogeneity map and the tense control function are equivalent, with the only difference in their expression. That is, the tense control function is a program, and will become the specification qualified to be called a design drawing. The homogeneity map is the only one formatted screen which can be decided at the initial stage of starting works.

The homogeneity map can cover 40% of the whole collection of documents traditionally needed such as requirement definition, basic and detail designs, program specifications, text specifications, operation manual, development management materials Additional Rules FIG. 23 is a diagram which explains the time providence. The expansion of the unit time to be established in the same mean-space (the sum total time of the solution) represents the depth of the mean-space.

FIG. 24 is a diagram which explains the mean-space model and its duplex structure.

Supplement

This diagram shows the structure of the mean-space model of the case that even the traditional type of programs appearing on the pallet of the tense control function $\Phi_0$, which treats the base definitive as the screen, can also be treated to be suitable to LYEE. That is, the traditional type of programs (plural) are replaced with $T_1$ by the tense control function $\Phi_0$ (plural) which takes the base definitive as a file, and will form the structure ruled by the pallet of the $\Phi_0$ from which the program appeared.

01. Scenario Function which takes the tense control function $\Phi_0$ as a homogeneity map $$T_0 \Phi_0(\{\Phi_{p,k}\{L_{i,2}, T_{l,f}\}\} + \{\Phi_{p,k}\{L_{i,3}, T_{b,g}\}\} + \{\Phi_{p,k}\{L_{i,4}, T_{b,q}\}\})$$

02. Scenario Function which makes traditional type of programs, which take the tense control function $\Phi_1$ as a homogeneity map, to be suitable to LYEE $$T_{1,f} = \Phi_f(\Phi_{p,f}\{L_{j,2}\} + \Phi_{p,f}\{L_{j,3}\} + \Phi_{p,f}\{L_{j,4}\})$$

03. The k is the screen identifier. The f, g, q are the file identifiers.

04. The homogeneity map $\Phi_0$ is expressed by the five kinds of the process route taking the screen as a base.

05. The homogeneity map $\Phi_1$ is expressed by the three kinds of the process route taking the file as a base.

FIG. 25 is a diagram which explains the relationship of the word and the mean-space model.

Supplement

The word existing in the mean-space model is ruled by the base definitive and transposed to the semantic area. The word transposed to WO2, WO3 are ones existing thereabouts together with the base definitive. The word transposed to WO3 has no relation to the base definitive, and all words existing in the mean-space model are transposed. The base definitive represents a screen when the tense control function is $\Phi_0$ and a file when it is $\Phi_1$. The screen word shown in the table means the word existing in the screen, the file word means the word existing in the file, and the journal word means the word existing in the journal.

FIG. 26 is a diagram which explains the logic structure.

Supplement

This diagram shows the pallet's area concept and its co-existing logic, that is, the relationship of the tense control vector and the traditional type program P. In this connection, the traditional program is made to be suitable to LYEE by the tense control function $\Phi_1$, but it is not shown in this diagram.

01. The FILES, a reference family used by the tense control vector, are not shown.

02. The solid line BOX and the bold dot line BOX indicate the operand area which configures the logic of the tense control vector.

03. The bold dot BOX indicates the data process area (BUFFER) for the traditional program.

04. The traditional program P and its data process area are defined by the number of the definitive (screen, journal, file).

05. The maximum number of the pallet is 3×G (the number of the screen).

06. The number of the solid line BOX is 3×W as defined by the number (W) of the word (a) existing in the system.

07. The number of the tense control vector is the number of the solid line BOX which is depended on the word existing in the mean-space model to be defined.

08. The pallet is generalized by the pallet function ($\Phi_0$), taking the tense control vector and the traditional program as its element.

09. The pallet is ruled by the tense control function ($\Phi_0$).

10. The logic induced by the tense control function ($\Phi_0$) is called the scenario function (T).

11. The boundary condition in the case that a PKG software pre-assembled as an execution environment is used is regulated by the traditional program.

12. The slim dot line BOX indicates the area of the route specifying information used by the tense control function.

13. The bold dot line BOX is called WFL.

FIG. 27 is a diagram which explains the meaning of the tense control vector.

01. The pallet is a set unit of the tense control vector regulated by the pallet function. It is a program by itself.

02. The order of the tense control vector to be placed in the pallet can be in no special order by the nature of its logic structure.

03. The relationship of the CALL and the tense control vector is, by structure, that the CALL matches to the machine language's command part and the tense control vector matches to the operand.

04. The machine language's command operates on the operand, and the operand means the information which indicates the data area address required by the command.

05. Based on this relation, the tense control vector assumes the contents as follows: (1) to decide the address of the data area necessary to the command process; (2) to execute the operation taking the place of the CALL decided from the address information; (3) to set the result in the aimed address.

06. The data area address necessary to the command process becomes clear naturally from the transposed word information existing in the semantic area.

07. The operation in the place of the CALL is naturally decided from the universal rule imposed to the semantic area (the paradigm of the tense control vector) and the significance of the word (operational ability).

08. The traditional program used inside the tense control vector must define its particular data area by itself.

09. Even when the tense control vector is the traditional program, it can use the data area of the semantic area in the same manner as the tense control vector, if it is placed in the pallet with the relation of the tense control vector.

Remarks: The relation to the theoretical words

01. The Scenario function (T) is the same definition as the semantic unit-team.

02. The pallet is what represents the semantic area when the word existing in the semantic area is replaced with the tense control vector.

03. The semantic unit-team represents the origin of existence of the requirement event which is established in the cognitive mean-space, that is, the logic expressing the true state.

04. The structure of the semantic unit-team will become only constantly. In other words, the structure paradigm of the software is also the only one.

05. It is all things in nature, in which the semantic unit-team associates the transposition unit-team after the relative unit-team and the duplication of the transposition consequently exists in the cognitive mean-space.

06. All things in nature mean the real state and the state unit-team.

07. The requirement event means a part of all things in nature.

08. The transposition unit-team means the unit-team representing the origin of existence.

09. The duplication of the transposition unit-team means the frequency giving a data value to the unit-team element of the transposition unit-team.

10. The duplication of the transposition unit-team means the duplication of the scenario function ($T^n$).

FIG. 28 is a diagram which explains the column (WO2) of the tense control vector.

Word: Sales (The item existing on the screen)

FIG. 29 is a diagram which explains the column (WO3) of the tense control vector.

Word: Sales (The item existing on the screen)

FIG. 30 is a diagram which explains the column (WO4) of the tense control vector.

Word: Sales (The item existing on the screen)

FIG. 31 is a diagram which explains the pallet function ($\Phi_p$).

Supplement

The pallet function is a tense control vector, that is, a logic which forms the pallet by making a set of the duplicate vector and the homogeneity vector.

01. The pallet function is driven from the tense control function and returns.

02. The open and close of the indication of the file can be portioned out to the tense control vector depending on the relation to an execution equipment environment.

03. The simplest pallet function is a column of the CALL statement.

04. The pallet re-start flag is the pallet function-specific area.

FIG. 32 is a diagram which explains the tense control function ($\Phi_0$, the base definitive=screen)

Supplement

01. The concept diagram of the unit-team

02. The tense control function and the homogeneity map are of the same quality.

03. The blank box of the flow must be ignored.

FIG. 33 is a diagram which explains the tense control function ($\Phi_0$, the base definitive=file).

Supplement

01. The tense control function and the homogeneity map is of the same quality.

02. The blank box of the flow must be ignored.

BRIEF DESCRIPTION OF DRAWINGS

FIG. 2 shows the screen to input sales.

FIG. 3 shows the screen to refer to customer codes.

FIG. 4 shows the screen to input the confirmed product's arrival.

FIG. 5 shows the screen to refer to warehouse codes.

FIG. 6 shows the screen to execute the output operation of a delivery request list.

FIG. 7 shows the journal of a delivery request list.

FIG. 25 explains the relation of the word and the mean-space model concerned with this invention.

FIG. 27 explains the meaning of the tense control vector concerned with this invention.

BEST MODE FOR CARRYING OUT THE INVENTION

That is, with this invention, the definitive identifier is decided at first, which is the screen necessary to the software to be produced. Next, the homogeneity map is created, in which all pallets necessary to the software based on the definitive identifiers are posted in accordance with the process flow, while sorting out words existing with the definitive identifier. Next, the necessary file is decided on the basis of the sorted-out words and the created homogeneity map. Next, for all the sorted-out words, the first tense control vector to do screen edit or file edit, the second tense control vector to decide the process route, and the third tense control vector to do file update are created. Next, per screen unit, the three kinds of pallets are created by disposing the aforementioned first to third tense control vector, and inside each pallet, the pallet function is created, which will autonomously execute each tense control vector with significance. Then, the screen based on the pallet function concerned with the first tense control vector is transmitted; the screen is received and the pallet function concerned with the second tense control vector is executed; and in accordance with this execution result the aforementioned three pallet functions are assembled into the tense control function having the structure to decide one process route from plural process routes including at least one process route for the execution of the pallet function concerned with the third tense control vector.

In the following, in order to detail this invention the explanation is presented in accordance with the attached diagrams.

Figure 1:
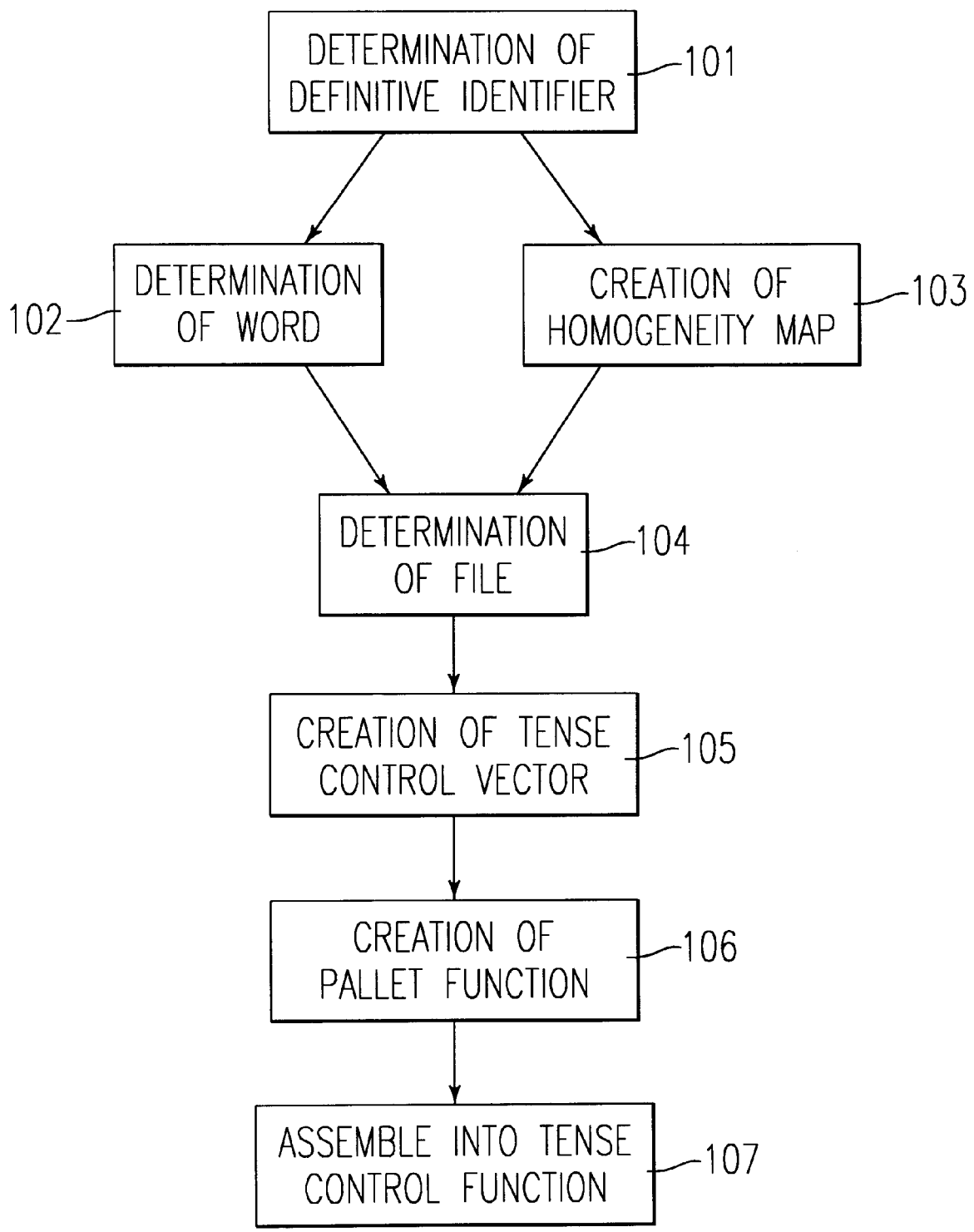
FIG. 1 shows the work process based on this invention.

FIG. 1 is a diagram to indicate work steps by this invention.

That is, with this invention, a desired software can be created by the following steps: to decide the definitive identifier (step 101), to decide the word (step 102), to create the homogeneity map (step 103), to decide the file (step 104), to create the tense control vector (step 105), to create the pallet function (step 106), and to assemble into the tense control function (step 107).

Determination of the Definitive Identifier

For example, in the case of creating software called "sales input" in order to enter sales at some company, the screen for the input of sales (FIG. 2) and the screen for referring to the customer codes (FIG. 3) are decided. Not only the customer code reference screen but also the following screens can also be established in accordance with needs similar to this screen, including the staff code reference screen, the sales classification screen, the billing code screen, the product code screen, etc.

Also, in the case of creating software called "arrival confirmation input" in order to enter the confirmation of arrival of products at some company, the screen for the input of the confirmation of product arrivals (FIG. 4) and the screen for referring to the warehouse code (FIG. 5) are decided.

Figure 7B:
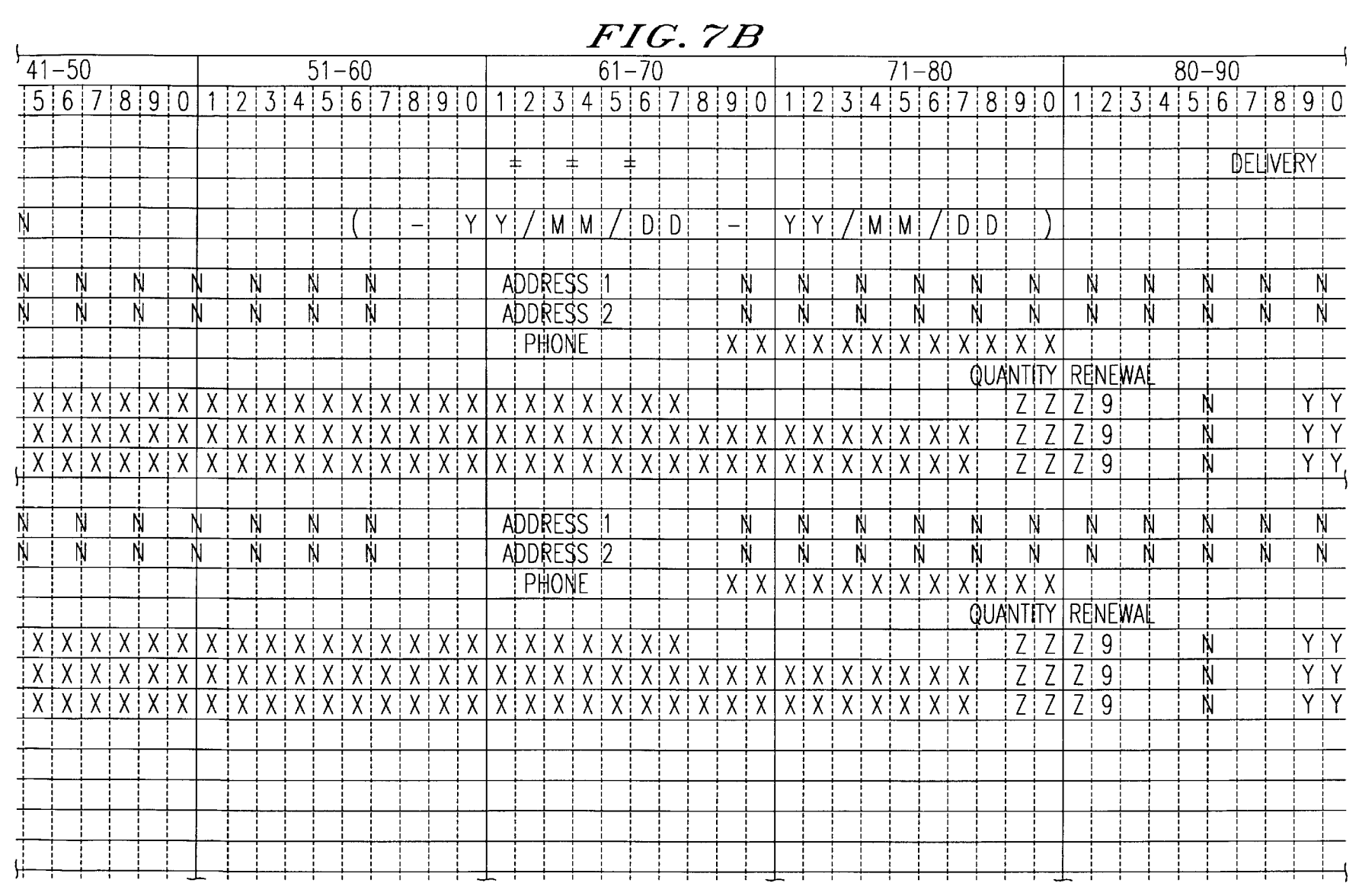
Figure 8B:
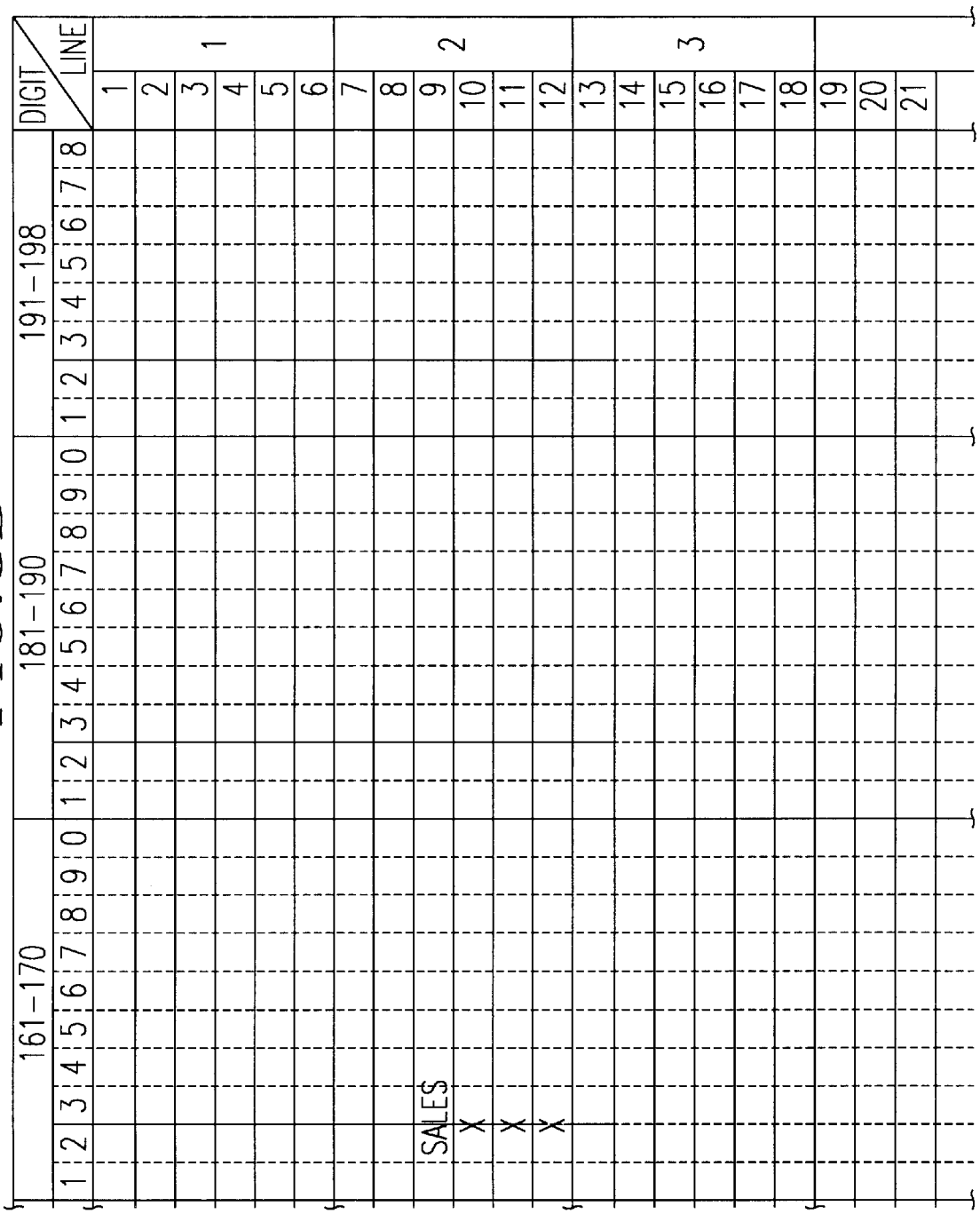
FIG. 8 shows the journal of a delivery request list.

Also, in the case of creating software called a "delivery request list" to output a list of product delivery requests at some company, the screen for executing output of the delivery request list (FIG. 6) and the journals of the list (FIG. 7, FIG. 8) are decided.

Determination of the Word

The determination of the word means to sort out all words from the above screens and the journals, which were decided.

For example, in the screen FIG. 2 for the above "sales input," the following words can be sorted out, including
OPCD
Sales No.
Sales Classification
Sales Date
Customer
Payment Due Date
Billing Destination
Consumption Tax
Name in charge
Slip Order No.
Delivery Place
Phone
Remarks
Product Code
Quantity
Unit Price
Discount
Amount
Product Name
Type of Machines/Media
Product SN
Sales Total
Consumption Tax
Discount Total
Sum Total
Execution
F1
F3
F4
F8
and these are the determined words.

Also, in the above "Refer to Customer Code" screen FIG. 3, the following can be sorted out:
No.
Customer (abbreviation)
Customer Name
Address
Name in charge
Selection No.
Customer Name—katakana
Old Code
Execution
F12
and these are the determined words.

Also, in the above "arrival confirmation input" screen FIG. 4, the following can be sorted out:
OPCD
Warehouse Code
H/S Classification
Agency Classification
Execution
F1
F3
F4
and these are the determined words.

Also, in the above "arrival confirmation input" screen FIG. 5, the following can be sorted out:
No.
Warehouse Code
Warehouse Name
Selection No.
Execution
F12
and these are the determined words.

Also, in the above "delivery request list" screen FIG. 6, the following can be sorted out:

Delivery Request Date, Execution
F2
F3
and these are the determined words.

Also, in the journals of the "delivery request list" FIG. 7 and FIG. 8, the following can be sorted out:
Department
Delivery Place
Billing Destination
Address 1
Address 2
Phone
Post 1
Name in charge
Store in charge
Delivery Request Date
Delivery No.
Product Code
Product Name
Quantity
Renewal
Date of Order Received
Order No.
Line
Name in charge of Order Received
Product SN
Date
Customer Order No.
Inst.
City
Delivery
Sales
and these are the determined words.

Creation of the Homogeneity Map

The homogeneity map is created on the basis of the determined definitive identifier.

The homogeneity map may be created humanly or mechanically.

The homogeneity map is what has been connected, by lines, with the pallet (indicated by a box) which corresponds to each screen each journal. The line means the pallet unit-team function. If the screen and the journal are already decided, the connection between pallets is determined inevitably.

Figure 9:
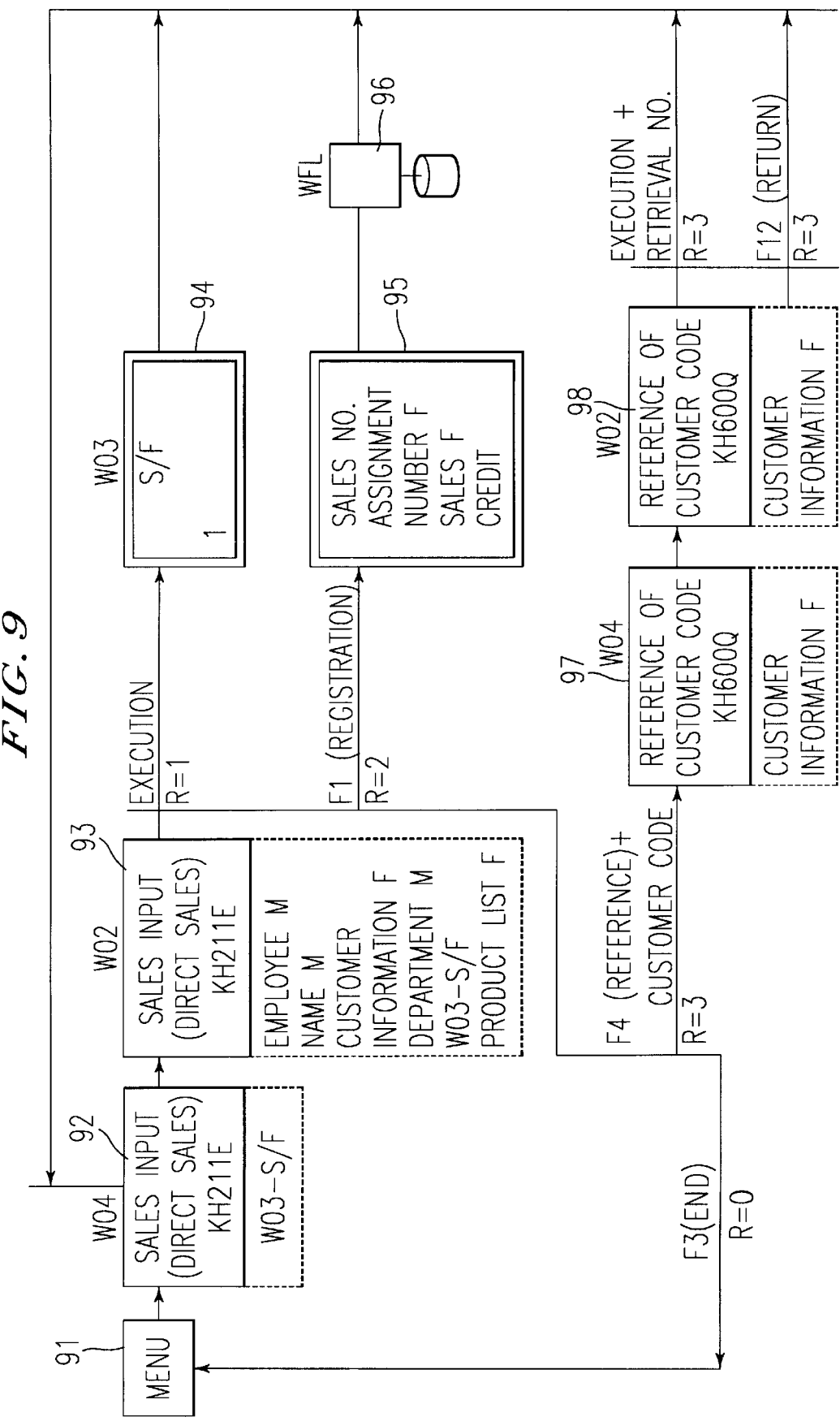
FIG. 9 shows the homogeneity map for the "sales input."

FIG. 9 is the homogeneity map for the above "sales input."

The 91 means the menu screen, and the "sales input" can be selected from the menu screen.

The 92 is the pallet WO4 for the screen to input sales (FIG. 2), and the 93 is its pallet WO2.

The 94 is the pallet WO3 at the time of selecting the "execution" in the screen for the input of sales.

The 95 is the pallet WO3 at the time of selecting the "registration" in the screen for the input of sales, and the WFL (Work File area) 96 means the write to a file.

The 97 is the pallet WO4 for the screen (FIG. 3) at the time of selecting the "reference" of the "customer code" in the screen for the sales input, the 98 is its pallet WO2.

When the "end" in the screen for the sales input is selected, it returns to the menu.

In each pallet, the pallet classification at the upper part outside the box, the name of the screen, the screen identification number at the lower part inside the box, and the determined file name (discussed later) in the dot-line box at the bottom outside the box are described respectively.

At the upper of the line connecting pallets, the name of buttons ("execution," "registration," etc.) selected in the previous screen and at the lower part of the line connecting pallets the absolute classification (R0–R5) of the process.

Figure 10:
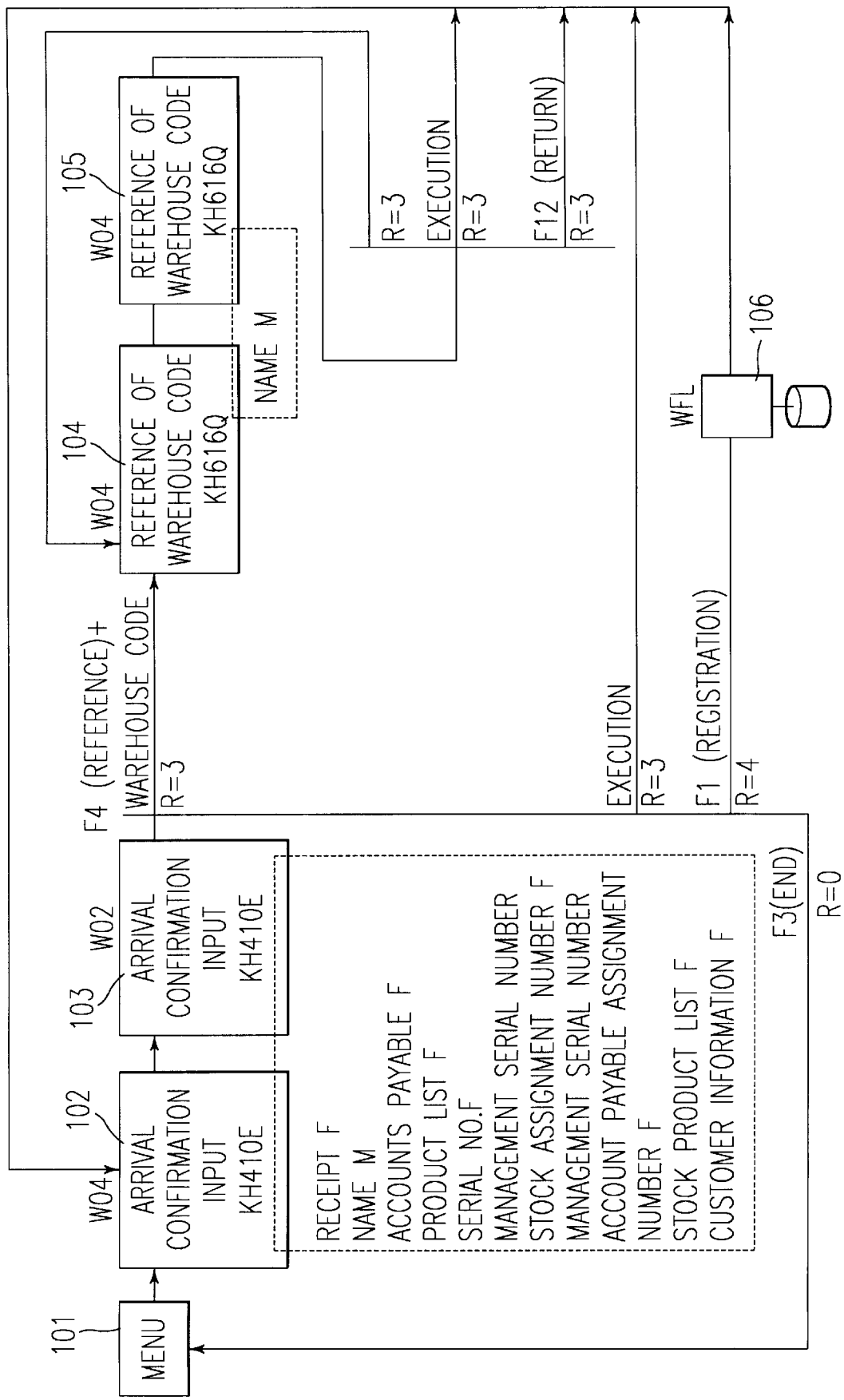
FIG. 10 shows the homogeneity map for the "confirmed product's arrival input."

FIG. 10 is the homogeneity map for the "arrival confirmation input."

The 101 is the menu screen, and the "arrival confirmation input" can be selected from the menu screen.

The 102 is the pallet WO4 for the screen (FIG. 4) to enter the arrival confirmation, and the 103 is its pallet WO2.

The 104 is pallet WO4 for the warehouse code reference screen (FIG. 5) at the time of selecting the "reference" of the "warehouse code" in the screen to enter the arrival confirmation, and the 105 is its pallet WO2.

When the "execution" is selected in the screen to enter the arrival confirmation, it returns to the screen to enter the arrival confirmation.

When the "registration" is selected in the screen to enter the arrival confirmation, the write to a file is executed via the WFL (Work File Area) 106.

When the "end" is selected in the screen to enter the arrival confirmation, it returns to the menu screen.

Figure 11:
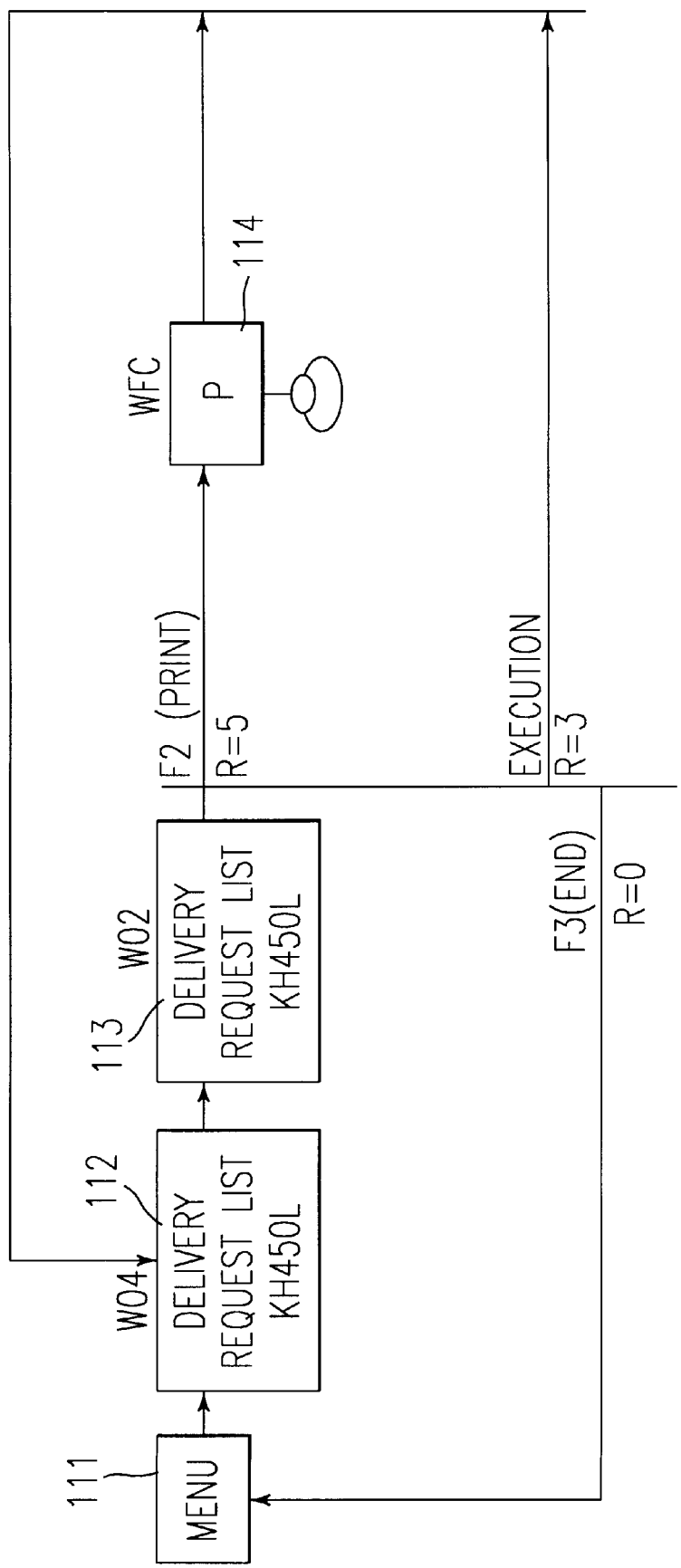
FIG. 11 shows the homogeneity map for the "delivery list."

FIG. 11 is a homogeneity map for the above "delivery request list."

The 111 is the menu screen, and the "delivery request list" can be selected from the menu screen.

The 112 is the pallet WO4 for the screen (FIG. 6) to output the delivery request list, and the 113 is its pallet WO2.

When the "print" is selected in the screen to output the delivery request list, the journal output (print) is executed via the WFL (Work File Area) 114.

When the "execution" is selected in the screen to output the delivery request list, it returns to the screen to output the delivery request list.

When the "end" is selected in the screen to output the delivery request list, it returns to the menu screen.

As explained above, in the homogeneity map, for example, if some screen is determined the after-process in the screen will be inevitably decided, including the process contents in the screen (execution, registration, etc.), then next necessitated process (screen display, journal output, file registration, file readout, operation, etc.). Therefore, in accordance with the above process contents, the line connection with the screen, etc. is provided.

Determination of the File

The necessary file is determined on the basis of the created homogeneity map and the determined words. That is, the necessary file can inevitably be decided from the homogeneity map and the word. The determined file is described in the dot-line box, etc. at the lower part outside the box of the homogeneity map.

For example, it can inevitably be known from its homogeneity map and the word that, to the pallet WO2 Indicated by the code 93 of FIG. 9, the following file is needed, including
Employee M (master file)
Name M
Customer Information F (file)
Department M
WO3-S/F
Product List F.

Creation of the Tense Control Vector

To create the tense control vector (program) for each word. That is, to do the decoding of the tense control vector for each word.

With the tense control vector, there are the following six elements:
W04 duplicate vector
W04 homogeneity vector
WO2 duplicate vector
WO2 homogeneity vector
WO3 duplicate vector
WO3 homogeneity vector
and six kinds of the tense control vector (program) are created per each word. However, the WO2 duplicate vector is not always necessitated.

The explanation of the case of creating the tense control vector focused on the word "sales" is presented here as an example.

Figure 12:
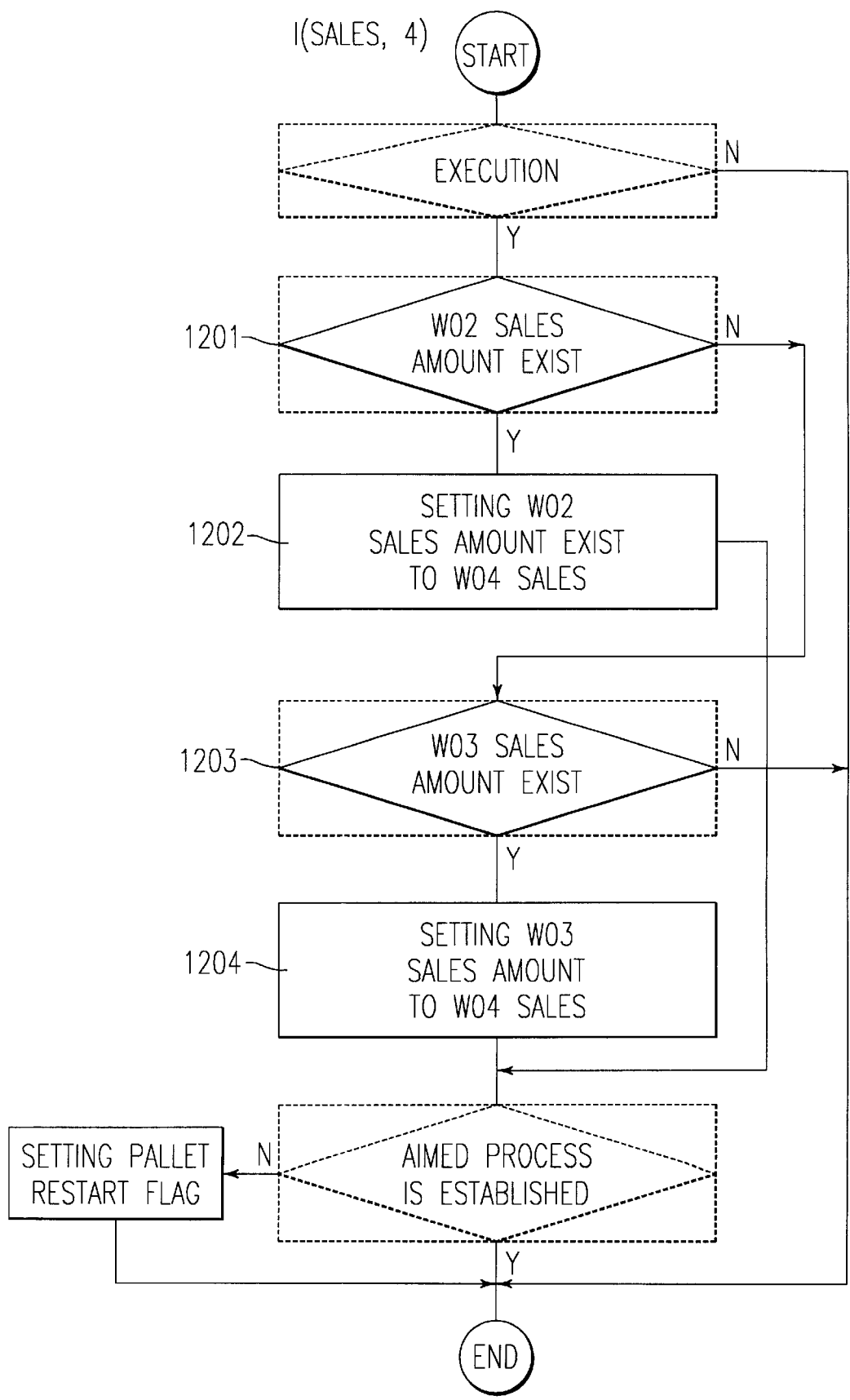
FIG. 12 shows an example of the WO4 duplicate vector.

The WO4 duplicate vector is created as shown by FIG. 12.

First, to make judgment whether a sales amount exists or not in the item (screen) of the corresponding WO2 sales (step 1201). If it exists, the sales amount is set to the item of the WO4 sales (step 1202), then the process is ended.

If it doesn't exist, the judgment is made whether a sales amount exists or not in the item of the WO3 sales (step 1203). If it exists, the sales amount is set to the item of the WO4 sales (step 1204), then the process is ended as is.

Depending upon the need of some words, a step for confirming the presence of the execution shall be established before step 1202. Also, a step for confirming the presence of the establishment of the aimed process shall be established after step 1204, and if the aimed process be not established, a flag is to be set for restarting the pallet.

To be important as that programs are always created with this structure for any words, and it also applies to the following program.

Figure 13:
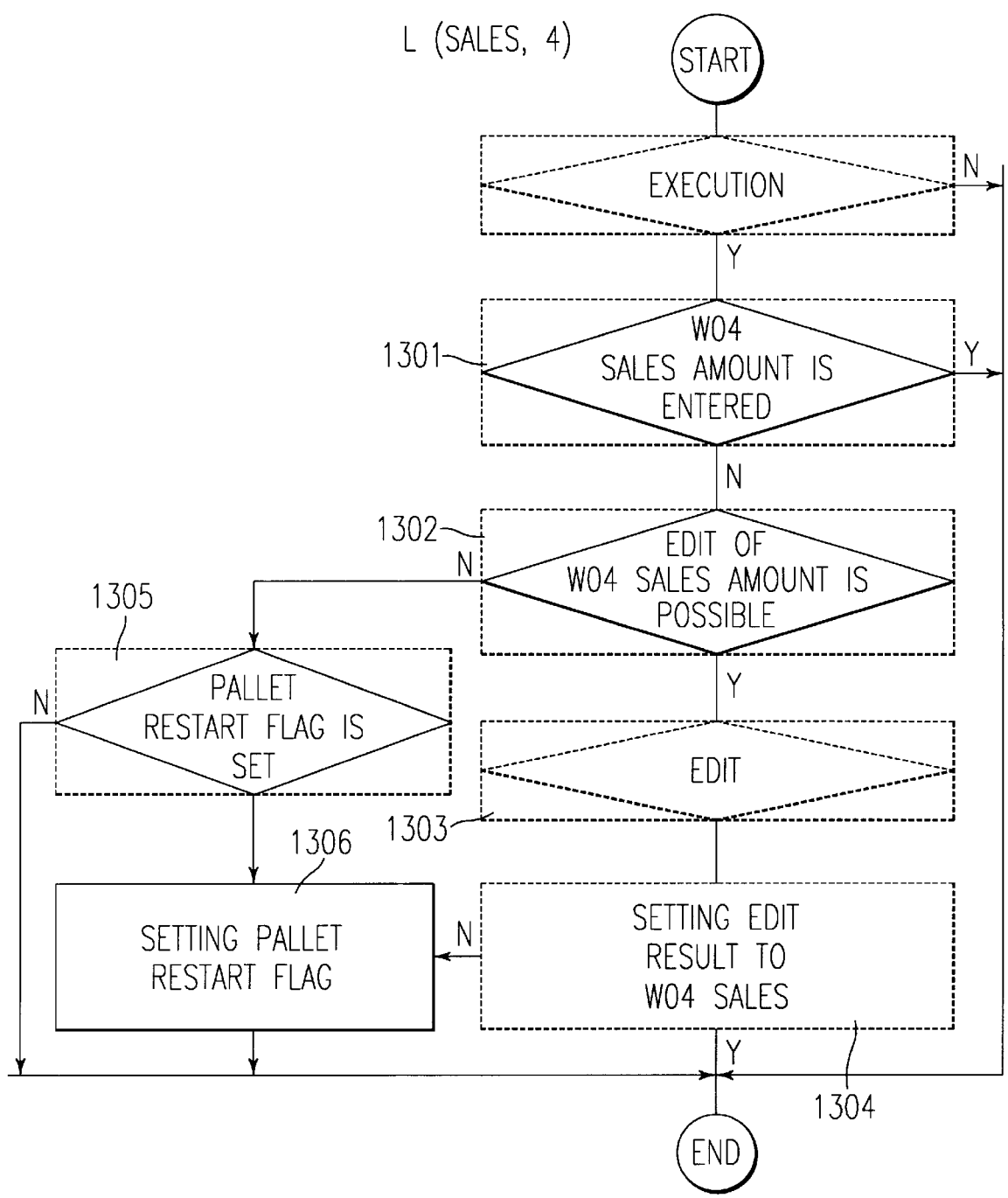
FIG. 13 shows an example of the WO4 homogeneity vector.

The WO4 homogeneity vector is created as shown by FIG. 13.

First, to make judgment whether a sales amount was already entered into the item of the WO4 sales (step 1301). If already entered, the process is ended.

If not already entered, the judgment shall be made whether the edit of the sales amount for the WO4 sales' item is possible or not (step 1302). That is, for example, assuming that the sales amount is the price x the number of pieces, the judgment shall be made whether a value already exists or not in the item of the WO4 price and in the item of the WO4 number of pieces. The edit is executed, if possible (for example, to obtain a sales from the existing price and the number of pieces) step 1303). The edit result (for example, the obtained sales amount) shall be set to the item of the WO4 sales (step 1304).

When the edit cannot be executed, in accordance with the need (step 1305), a flag is set for restarting the pallet (step 1306). That is, the determination of the sales amount is once reserved. Speaking of the above example, the determination will be reserved until the input of the price and the number of pieces. This means that the program concerned with this invention is nothing but what autonomously determines the significance.

Figure 14:
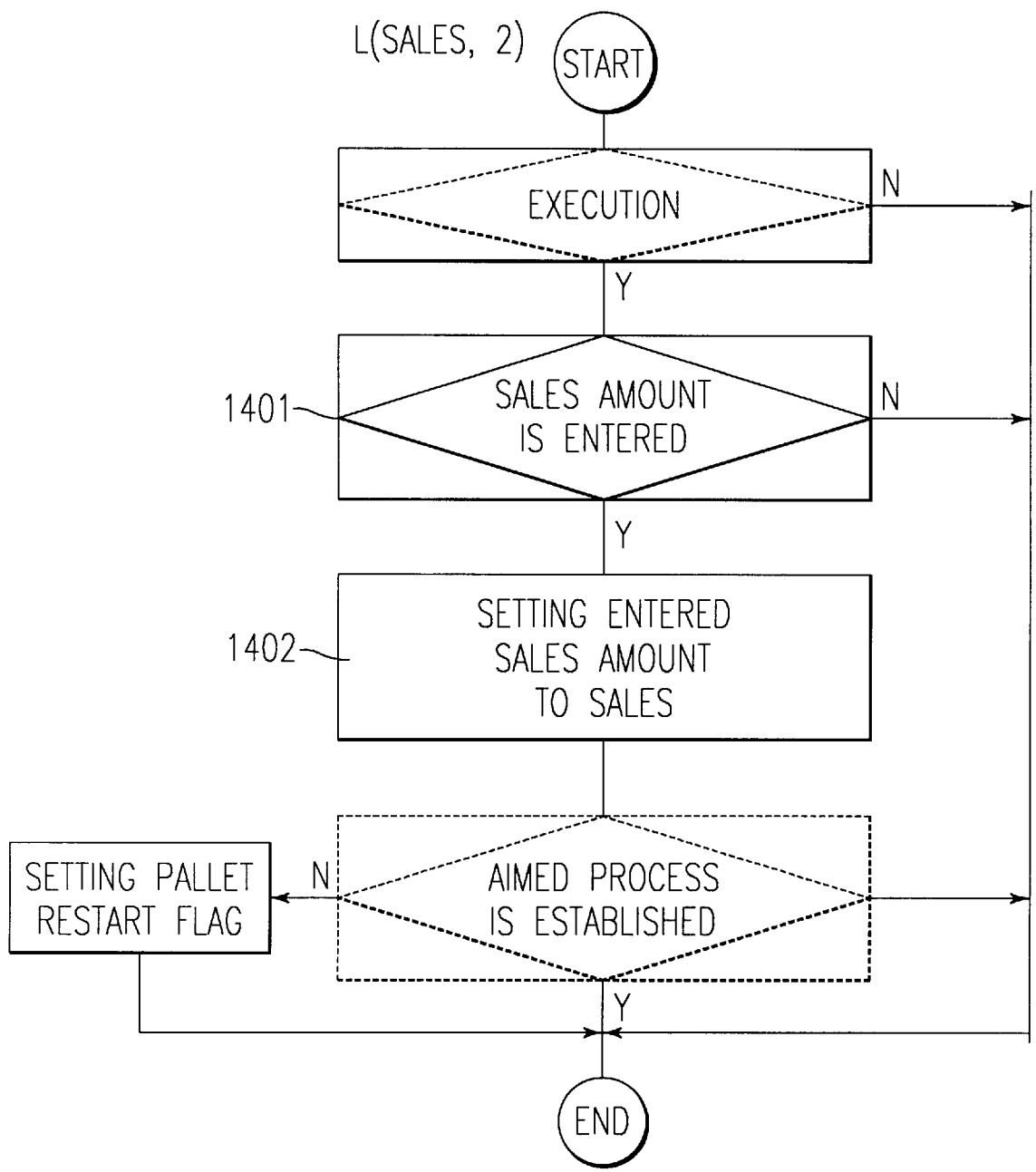
FIG. 14 shows an example of the WO2 homogeneity vector.

The WO2 homogeneity vector is created as shown by FIG. 14.

First, to make judgment whether a sales amount is already entered or not (whether it is already set to the item of the WO4 sales) (step 1401). If not already entered, the process is ended.

If already entered, the input sales amount is set to the item of the WO2 sales (step 1402), then the process is ended.

Depending upon the need of some words, a step for confirming the presence of the execution shall be established before step 1401. Also, a step for confirming the presence of the establishment of the aimed process shall be established after step 1402, and if the aimed process be not established, a flag is to be set for restarting the pallet.

Figure 15:
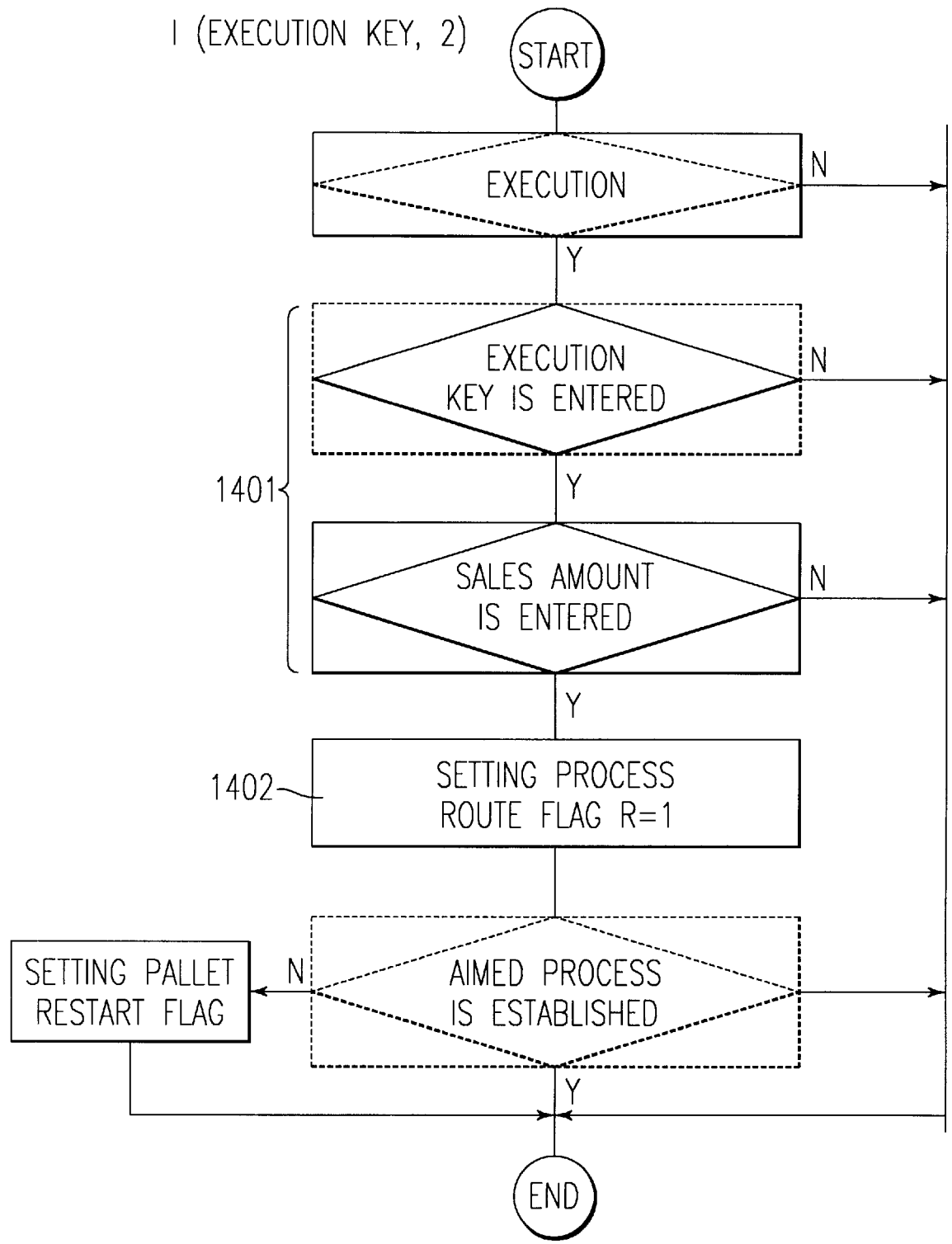
FIG. 15 shows an example of the WO2 homogeneity vector.

Further, for example, in the case of the control word such as an "execution key," the above mentioned step 1402 will become the process for setting the process route flag (See FIG. 15). The process route flag (R=0–5, however, R=0 is exceptional) is determined by the homogeneity map. By this, as for the tense control function the process of distributing the route is made possible, as discussed later.

Figure 16:
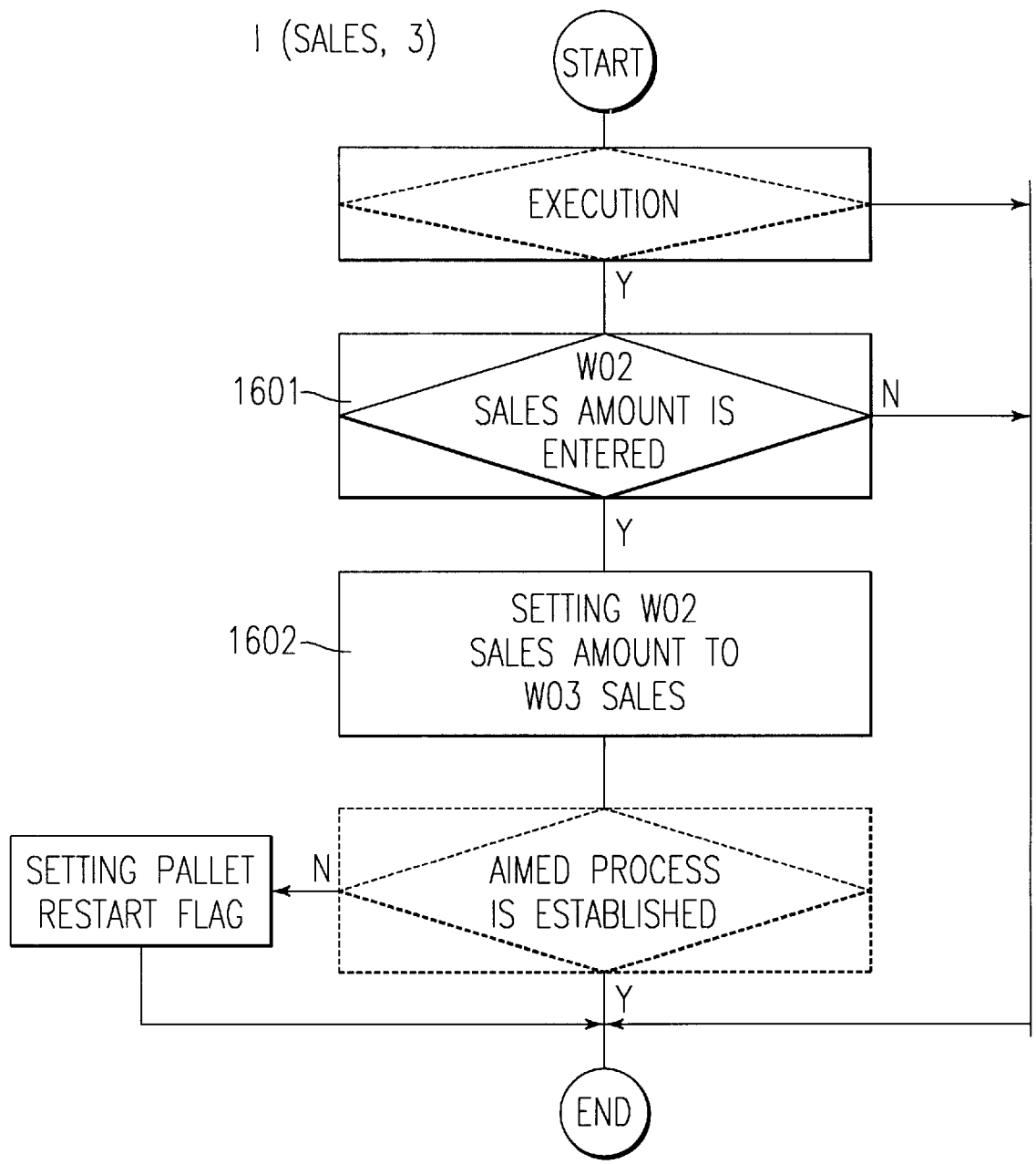
FIG. 16 shows an example of the WO3 duplicate vector.

The WO3 duplicate vector is created as shown by FIG. 16.

First, to make judgment whether a sales amount is already entered or not to the item of the WO2 sales (step 1601). If already entered, the sales amount is set to the item of the WO3 sales (step 1602), then the process is ended.

If not already entered, the process is ended as is.

Depending upon the need of some words, a step for confirming the presence of the execution shall be established before step 1601. Also, a step for confirming the presence of the establishment of the aimed process shall be established after step 1602, and if the aimed process be not established, a flag is to be set for restarting the pallet.

Figure 17:
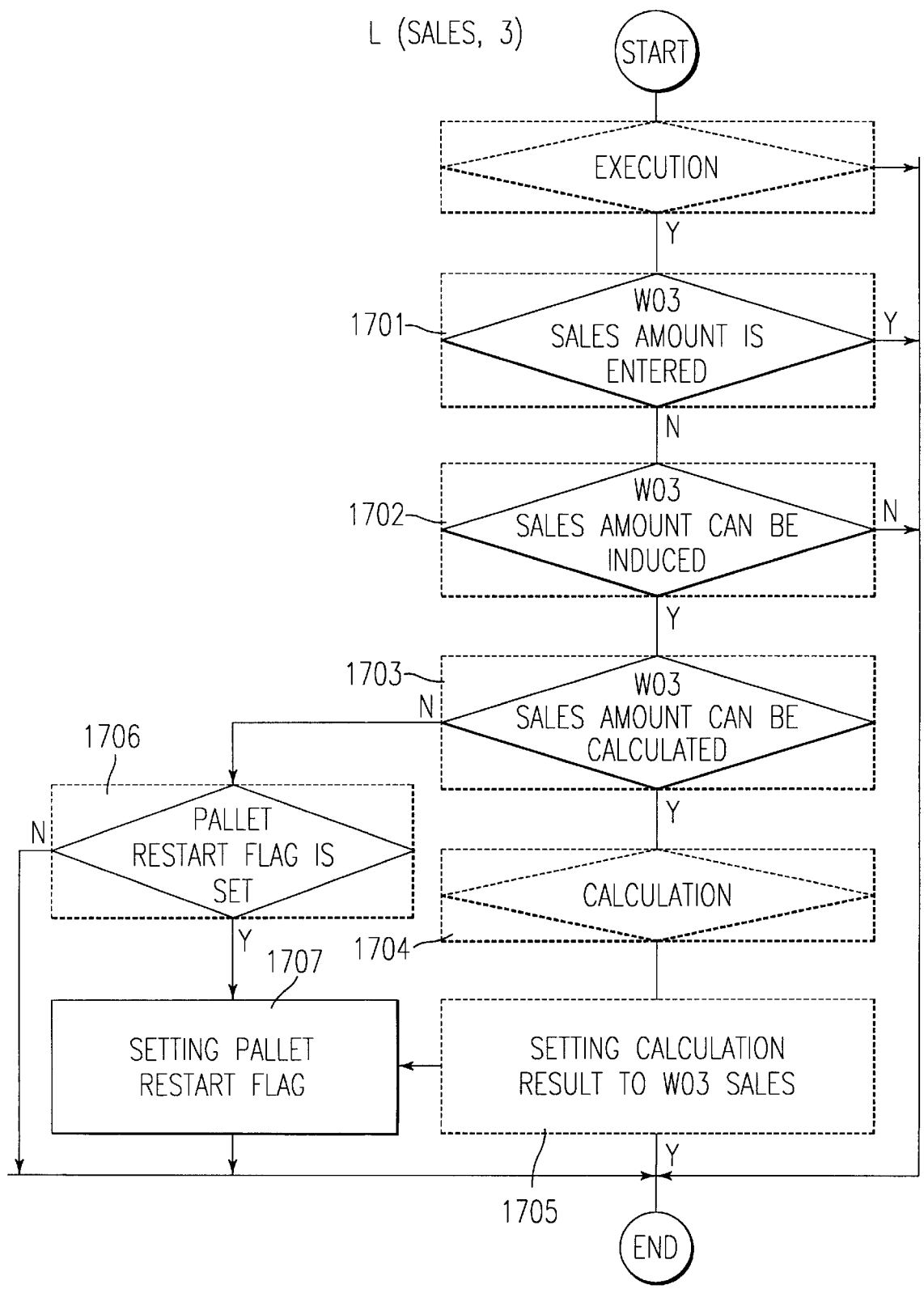
FIG. 17 shows an example of the WO3 homogeneity vector.

The WO3 homogeneity vector is created as shown by FIG. 17.

First, to make judgment whether a sales amount is already entered or not to the item of the WO3 sales (step 1701). If already entered, the process is ended.

If not already entered, to make judgment whether the calculation is possible or not (step 1703). That is, for example, assuming that the sales amount is the price x the number of pieces as above, the judgment shall be made whether a value already exists or not in the item of the WO3 price and in the item of the WO3 number of pieces. Then, if the induction is possible, the calculation is executed (for example, the sales is obtained from the existing price and the number of pieces) (step 1704). The calculated result (for example, the obtained sales amount) shall be set to the item of the WO3 sales (step 1705).

If the calculation cannot be executed, in accordance with the need (step 1706), a flag is to be set for restarting the pallet (step 1707). That is, in this case, as the same as above, the determination of the sales amount is once reserved, and speaking of the above example, the determination will be reserved until the input of the price and the number of pieces. This means that the program concerned with this invention is nothing but what autonomously determines the significance.

Creation of the Pallet Function

Figure 18:
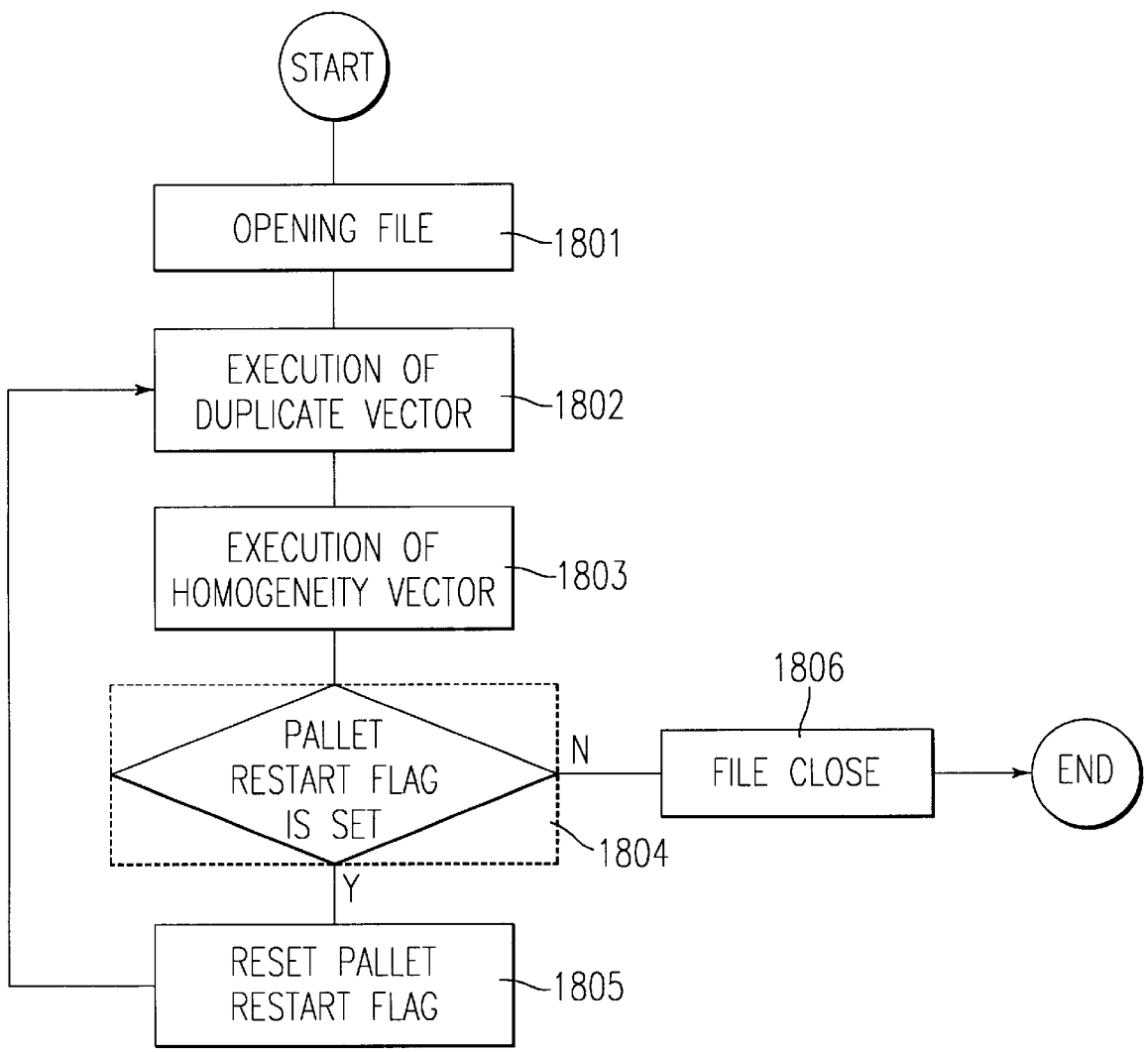
FIG. 18 shows the structural diagram of the pallet function.

To create the pallet function for WO4, WO2, WO3. FIG. 18 shows the structure paradigm of the pallet function, each pallet function (program) can be created with the structure as shown.

First, to open a file (step 1801). That is, for example, as for the pallet function concerned with the WO4, a file shall be opened, from the plural WO4 pallets, by selecting the prescribed one concerned with W4 pallet, and then execute each duplicate vector and homogeneity vector in consecutive order (step 1802, step 1803).

Thereafter, in the case that the pallet start flag is set (step 1804), the flag is to be reset (step 1805), and each duplicate vector and homogeneity vector shall be executed in consecutive order (step 1802, step 1803). That is, the pallet function enables autonomous determination of the program, jointly working with the pallet start flag of each pallet.

On the other hand, when the pallet start flag is not set, the file is closed (step 1806) and the process is ended.

Assemble into the Tense Control Function

The structure of the tense control function is identical in any software. Accordingly, the tense control vector and the pallet function which were created as explained above can be simply assembled into the tense control function prepared in advance.

Figure 19:
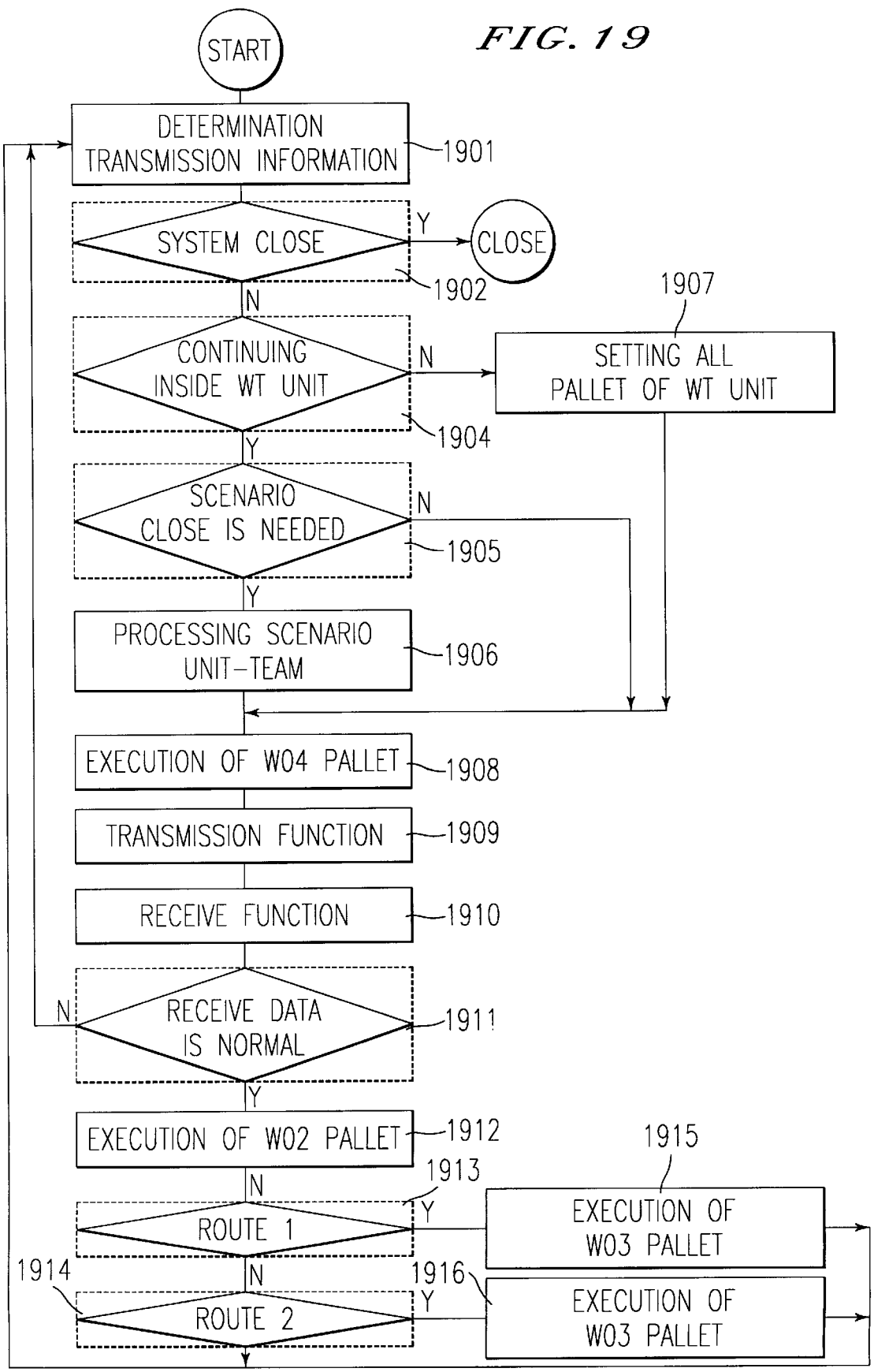
FIG. 19 shows the structural paradigm of the tense control function.

The structure paradigm of the tense control function is shown in FIG. 19.

That is, to determine the transmission information (step 1901). The transmission information means the screen to display. For example, it can be explained as follows, by referring to the homogeneity map shown in FIG. 9. For example, when the "reference" of the "customer code" in the sales input's screen (See FIG. 2.) is selected (meaning that a process route flag of R=3 is established in the pallet WO2 of the "customer code."), the screen of the customer code reference (See FIG. 3.) is determined as the transmission information.

When the transmission information contains the information of closing the system (step 1902), the system is closed (step 1903). The information of closing the system is, it can be explained as follows, by referring to the homogeneity map shown in FIG. 9. For example, it means that The "F3" in the s ales input's screen (See FIG. 2.) was selected (meaning that a process route flag of R=0 is established in the pallet WO2 of the "F3"). The meaning of closing the system is to return to the menu screen in the case of the above example.

Figure 20:
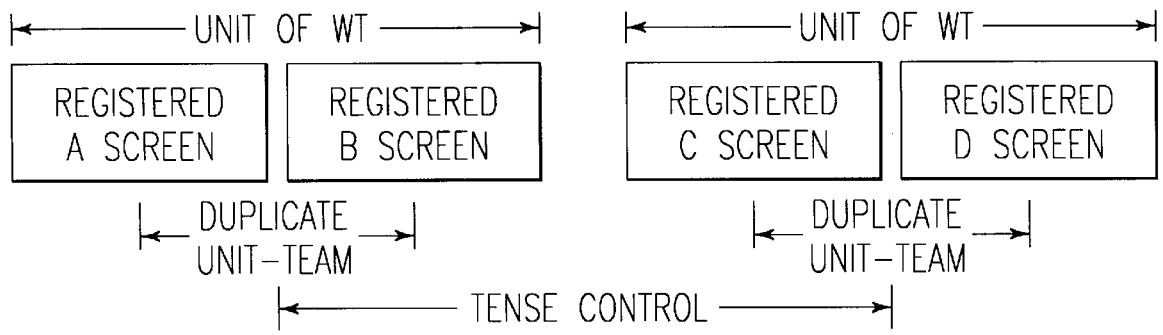
FIG. 20 is a diagram to explain the scenario unit-team.

Next, to make judgment whether to continue or not inside the WT unit (step 1904). This step is concerned with an exceptional process. That is, the WT unit means for example, as shown in FIG. 20, it is established by binding, as one unit, the registration screen used for the data registration and the reference screen used for the data reference when the said data is registered. For example, it can be explained as follows, by referring to the homogeneity map shown in FIG. 9: The WT unit is what is established by binding, as one unit, the sales input's screen (See FIG. 2.) and the customer code reference's screen (See FIG. 3.). However, when the screen of other homogeneity maps, for example, of the arrival confirmation input (See FIG. 10, FIG. 4.) are necessitated, these must be unit-teamed. Thereupon, as shown in FIG. 20, the scenario unit-team, i.e., the unit-team with other WT must be established (step 1905, step 1906). It will become particularly effective, when corresponding to a huge program.

In the case of the continuation inside the WT unit, to set all pallets of the said WT unit (step 1907). For example, by referring to the homogeneity map shown in FIG. 9, all the pallets concerned with this whole process (WO2–WO4) are set onto the working memory, respectively.

Then, to execute the said pallet WO4 at first (step 1908). That is, to execute the pallet WO4 in which all WO4 duplicate vectors and WO4 homogeneity vectors have been set into the pallet function shown in FIG. 18. By this step, the data concerned with the screen to display will be determined.

Then, to execute the transmission function (step 1909). That is, the screen in which data, etc. have been shall be transmitted (to CRT as a display means, for example).

Thereafter, to execute the receive function (step 1910). That is, to receive the screen, in which data, etc. was entered, (from CRT as a display means, for example).

Then, to make judgment whether the receive data is normal or not (step 1911). If abnormal, do over again from the beginning. That is, to make judgment if any illegal data, etc.

Next, to execute the said pallet WO2 (step 1912). That is, to execute pallet WO2 in which all WO2 homogeneity vectors have been set into the pallet function shown by FIG. 18. By this step, the input data, etc. will be determined.

Next, the process route will be determined (step 1913, step 1914). The process route is judged by the process route flag (R=1 to 5) placed on the WO2 homogeneity vector, as explained above.

When the process route flag is R=1, the said pallet WO3 (the pallet WO3 not accompanied by the registration to a file) shall be executed (step 1915). For example, the line 94 of the pallet WO3 shown in FIG. 9 shall be executed. Then, to return to the first step (step 1901). That is, the process route R=1 is a route process which only executes data process (See FIG. 9.).

When the process route flag is R=2, the said pallet WO3 (the pallet WO3 accompanied by the registration to a file) shall be executed (step 1916). For example, to execute the pallet WO3's line 95 and the WFL's line 96, then to return to the first process (step 1901). The process route R=2 is a process route to execute the data process execution and the data registration to a file (See FIG. 9.).

When the process route flag is R=3 to 5, it returns to the first process (step 1901) as it is.

In this connection, the process route R=3 is a route process to return to the pallet WO4 (both homogeneous and heterogeneous) as it is (See FIG. 9.).

The process route R=4 is a process to register the data to a file as it is (See FIG. 10.).

The process route R=5 is a process to take out the data from a file as it is (See FIG. 11.).

Figure 21:
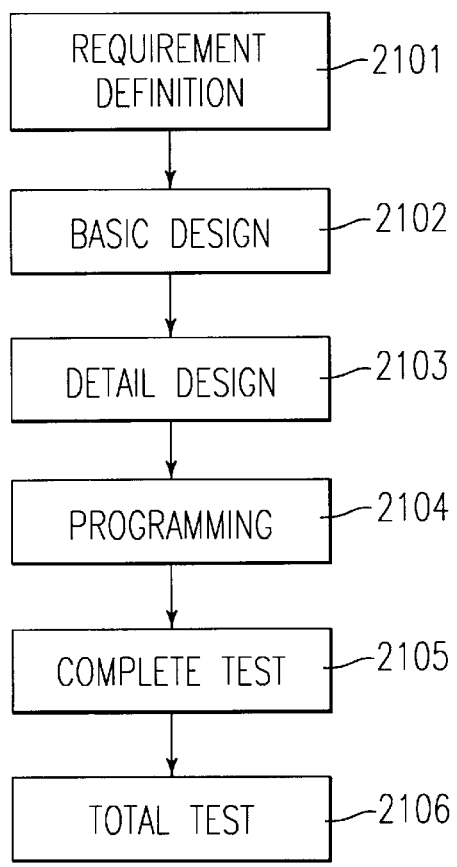
FIG. 21 shows the method of creating the traditional software.

With the above mentioned method, the software concerned with this invention can be created. Here, by showing the traditional method in FIG. 21, the method of this invention shown in FIG. 1 is compared. When the work steps of the traditional method steps 2101 to 2103 and the this invention's method step 101 to 104 are compared, this invention's method becomes approximately one-fifth (⅕) work steps, and when the work steps of the traditional method steps 2104 to 2106 and the this invention's method step 105 to 107 are compared, this invention's method becomes approximately one-tenth (⅒) to one-fifteenth (1/15) work steps.

Figure 22:
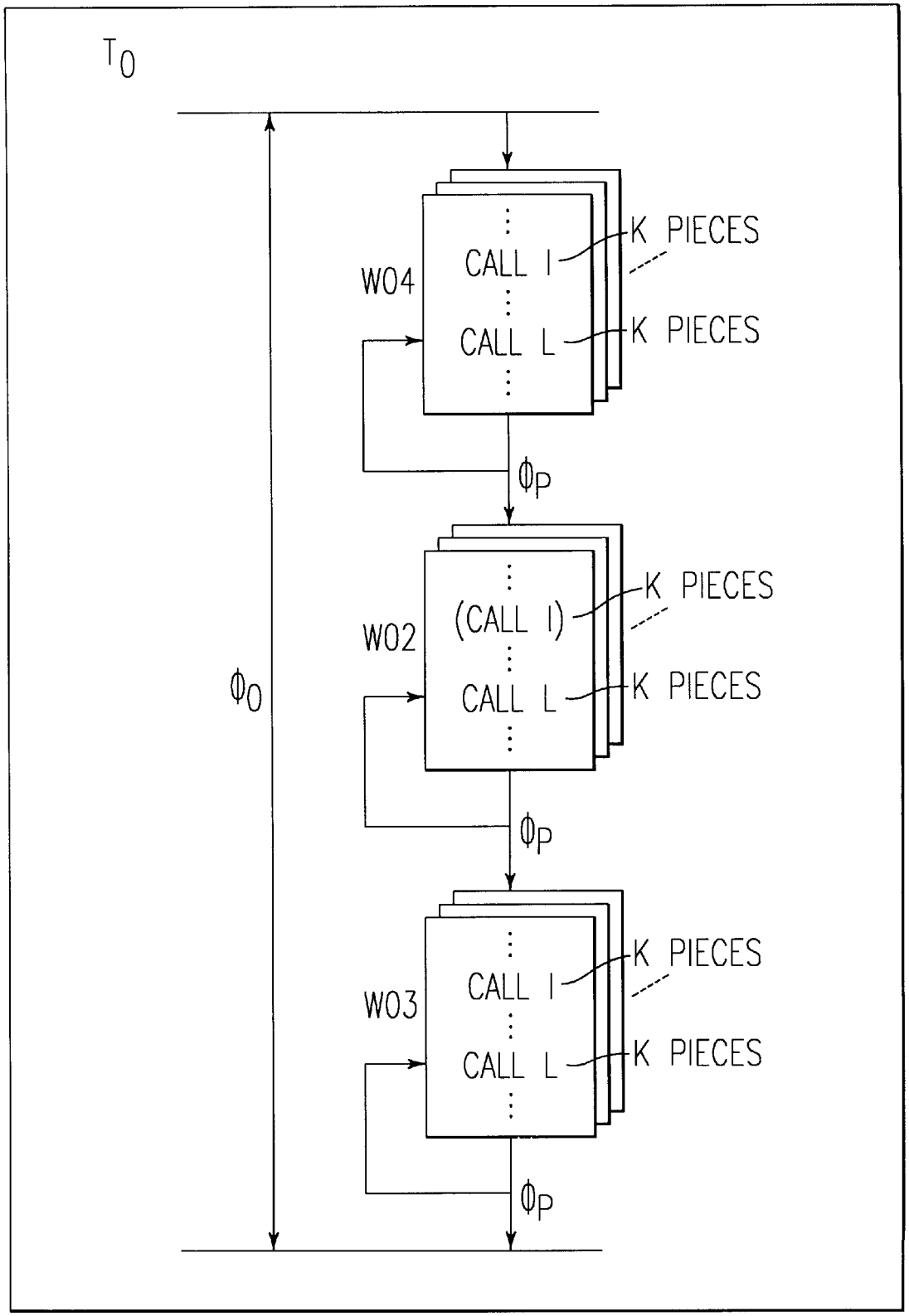
FIG. 22 shows the conceptual structure of the program concerned with this invention.
Figure 23:
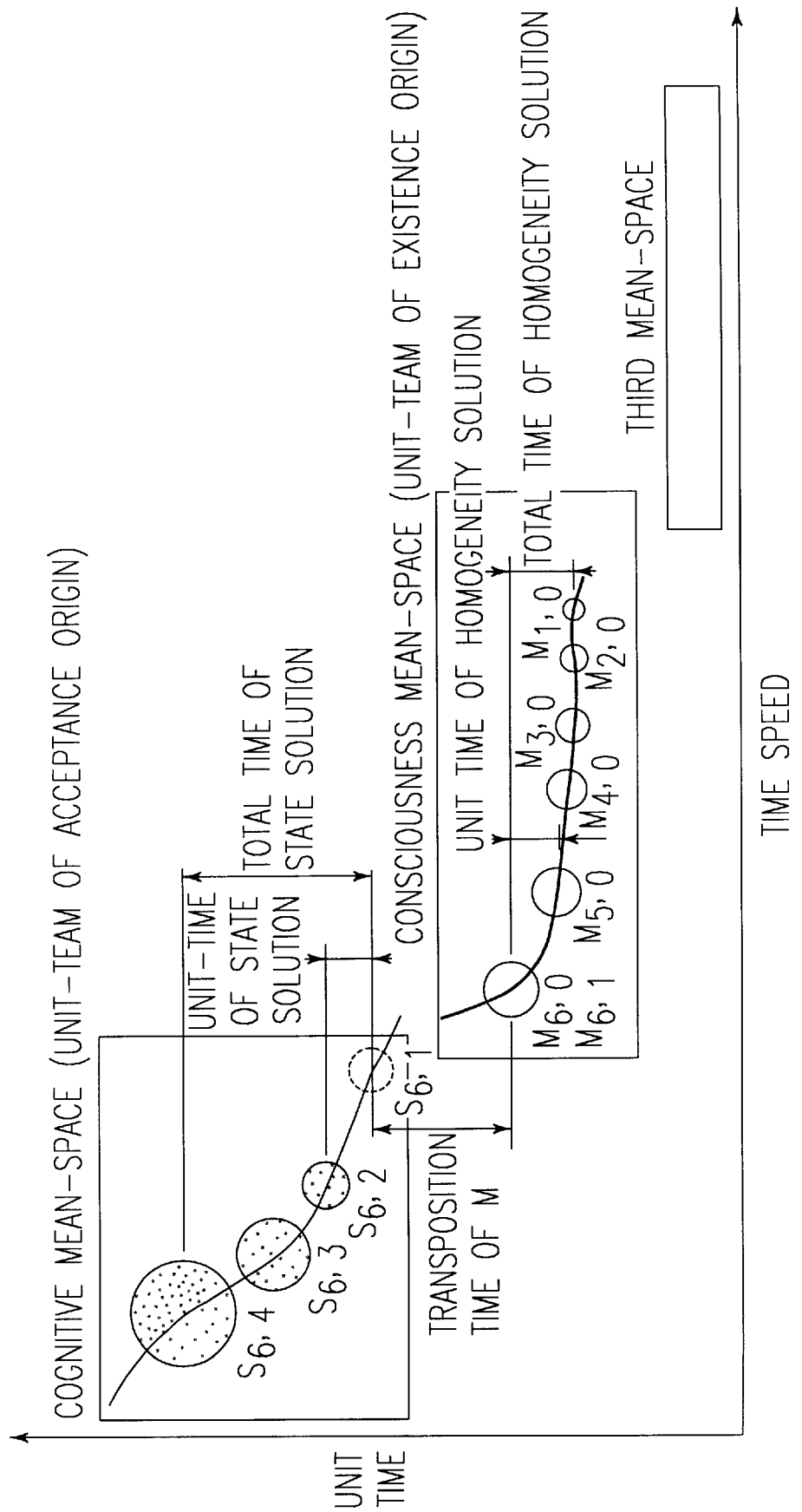
FIG. 23 is a diagram which explains the time providence concerned with this invention.

FIG. 22 shows the conceptual structure of the program concerned with this invention. That is, the plural of the pallet WO2 (each pallet includes k pieces of $l_{i,2}$ and k pieces of $L_{i,2}$.), the pallet WO3 (each pallet includes k pieces of $l_{i,3}$ and k pieces of $L_{i,3}$.), and the pallet WO4 (each pallet includes k pieces of $l_{i,4}$ and k pieces of $L_{i,4}$) are assembled into the pallet function ($\Phi_p$) respectively, and then assembled into the tense control function ($\Phi_0$). That is, it is known that the following formula has been established.

$$T_0 = \Phi_0(\{\Phi_p\{l_{i,2}, L_{i,2}\}\}_k + \{\Phi_p\{l_{i,3}, L_{i,3}\}\}_k + \{\Phi_p\{l_{i,4}, L_{i,4}\}\}_k)$$

Figure 24:
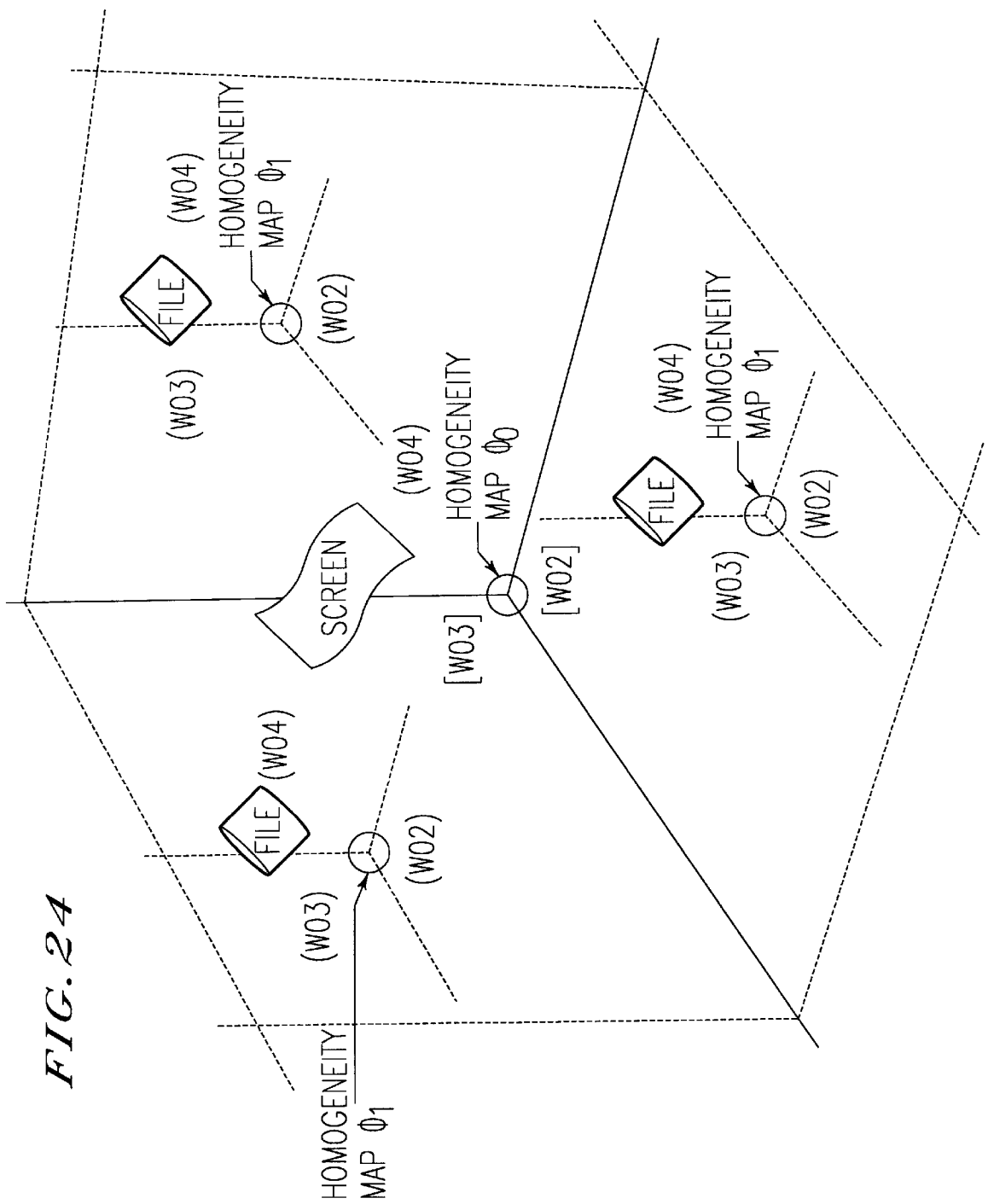
FIG. 24 explains the mean-space model and its duplex structure concerned with this invention.
Figure 26:
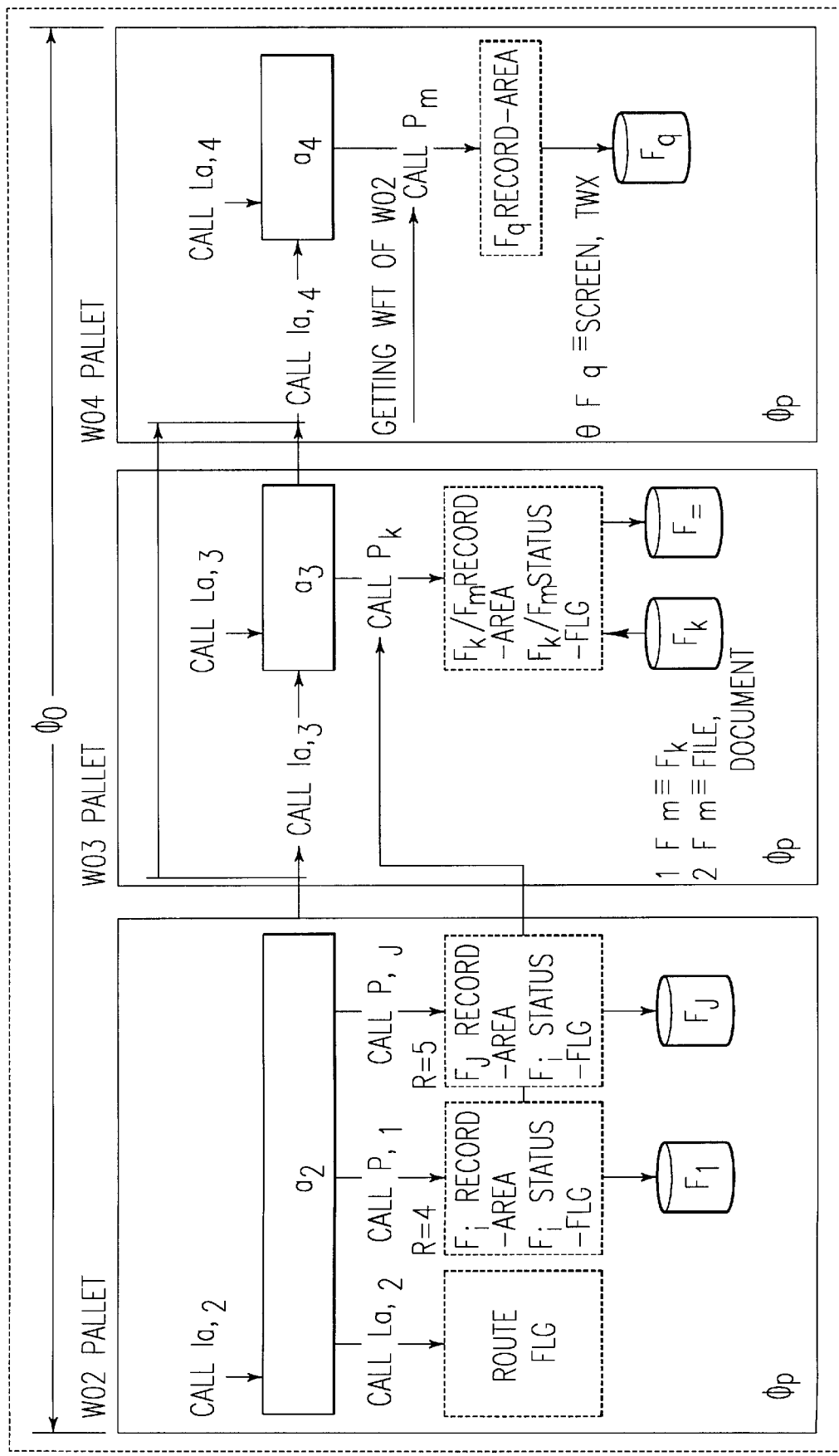
FIG. 26 is a diagram which explains the logic structure concerned with this invention.

FIG. 24 shows the structure of the mean-space model of the case that even the traditional program can be made suitable to the LYEE's ruling, which will appear in the pallet of the tense control function $\Phi_0$ taking the base definitive as a screen. That is, the replacement into $T_1$ takes place by the tense control function $\Phi_0$ (multiple) which takes the base definitive of the traditional program (multiple) as a file, and the structure will be ruled by the pallet $\Phi_0$ in which the program appeared.

Figure 33A:
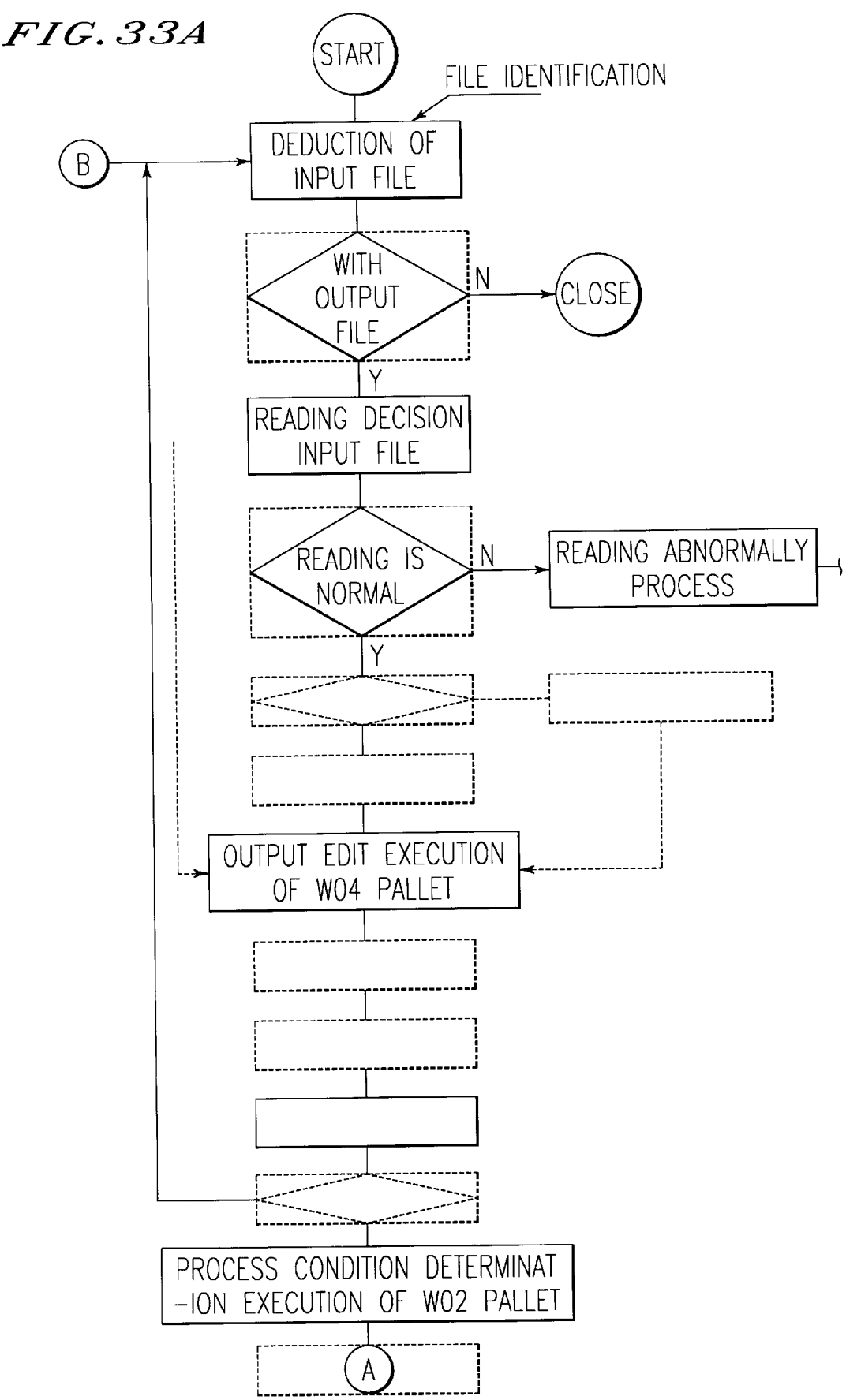
FIG. 33 explains the tense control function ($\Phi_1$) concerned with this invention.
Figure 33B:
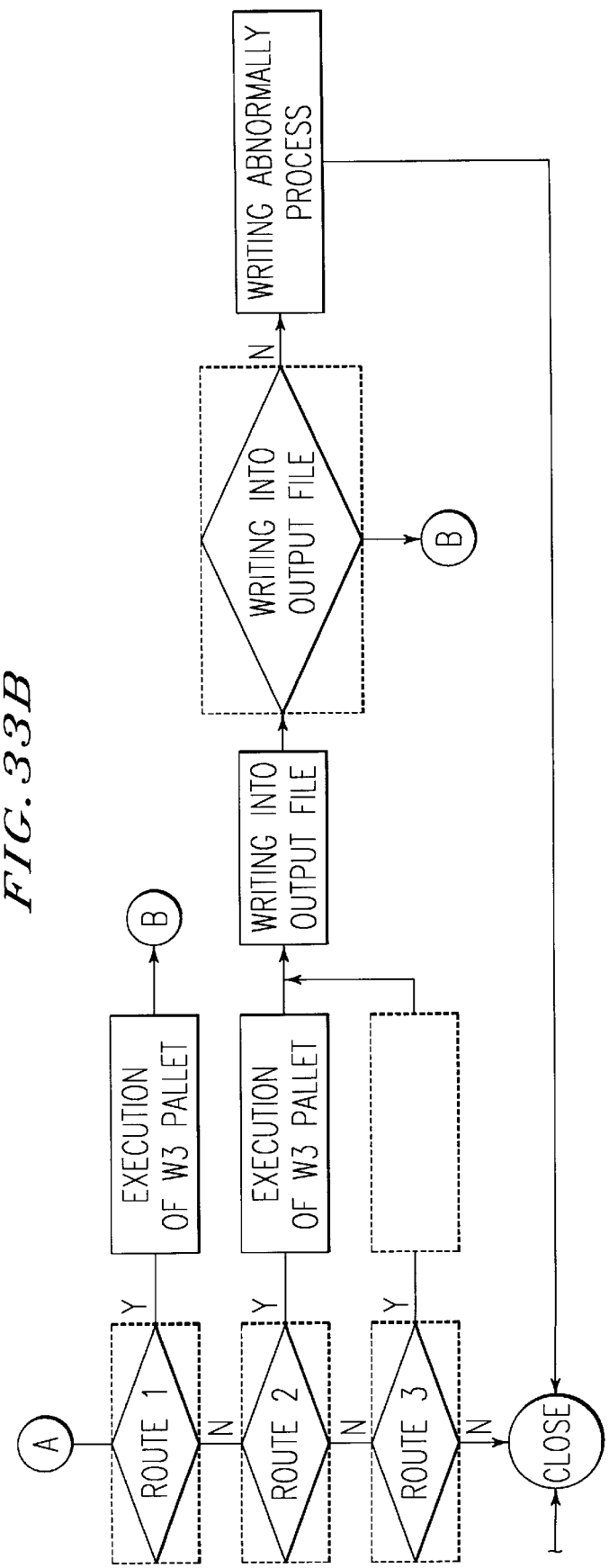
Figure 34:
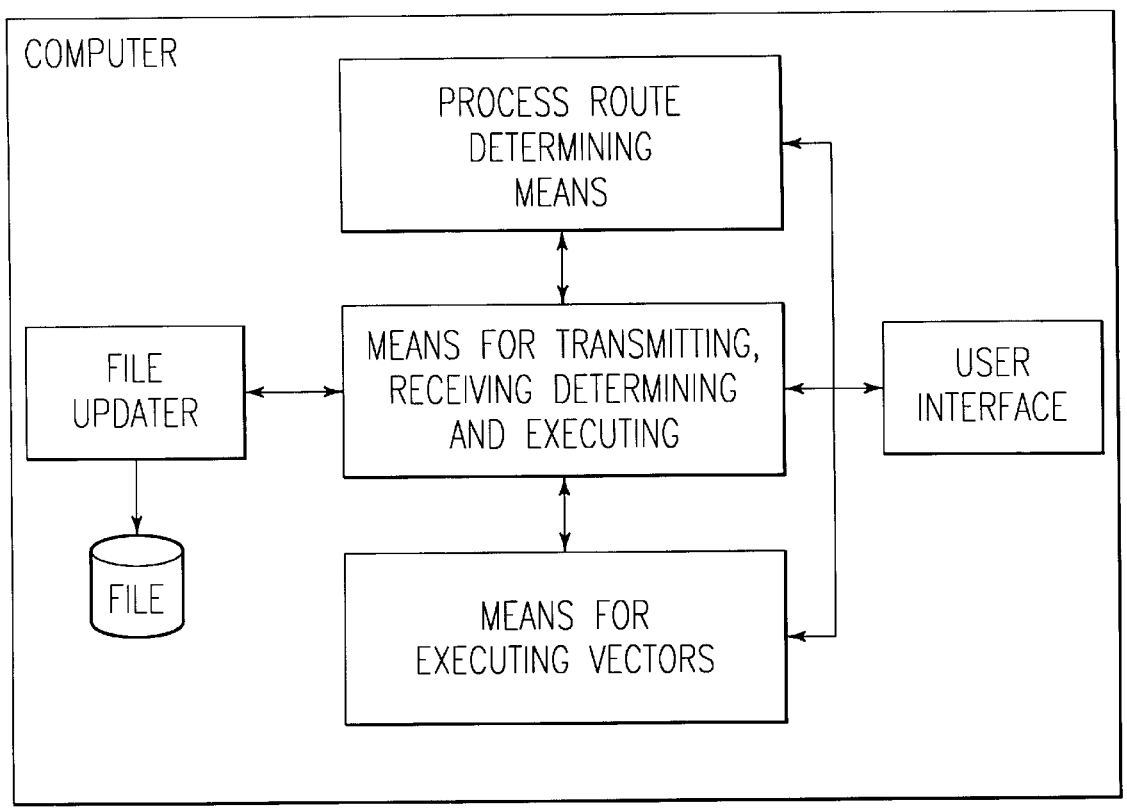
FIG. 34 is a block diagram of a computer for implementing a first portion of the present invention.
Figure 35:
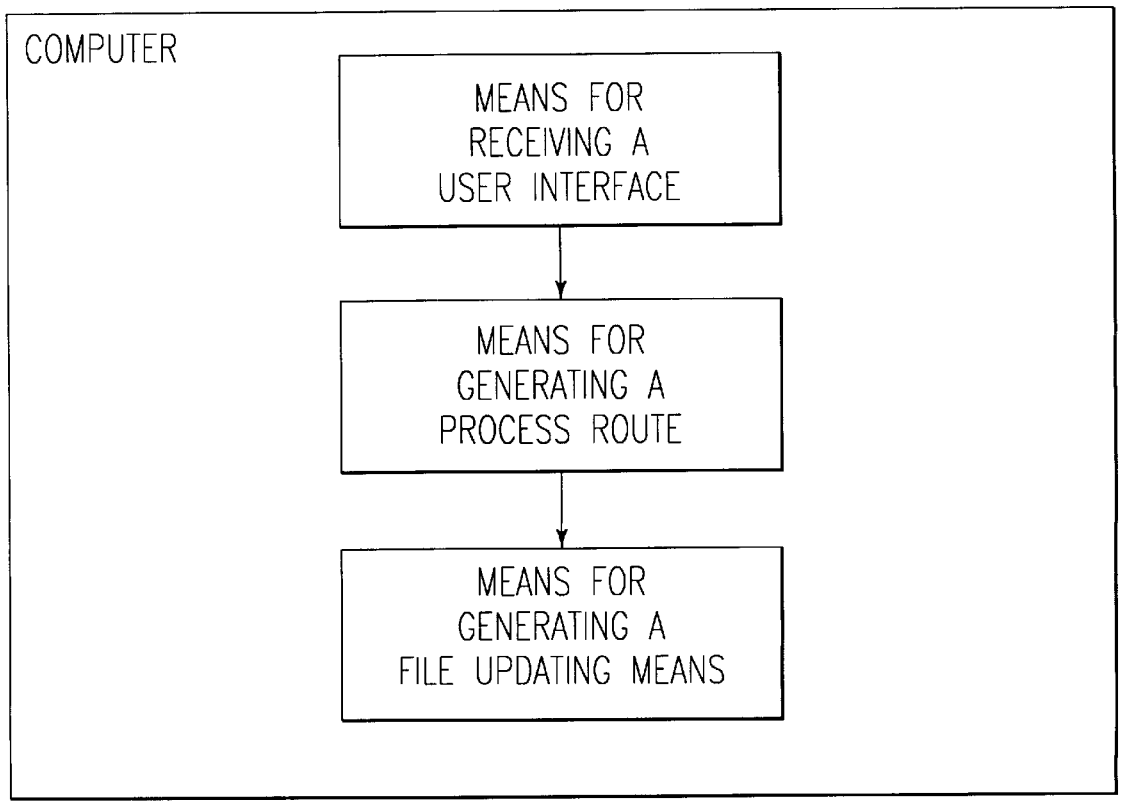
FIG. 35 is a block diagram of a computer for implementing a second portion of the present invention.

FIG. 33 is a flow chart which shows the program for equally handling the traditional program and the tense control vector, that is, the tense control function $\Phi_1$ for making the traditional program suitable to the LYEE's ruling. The program of FIG. 33 is similarly assembled into the pallet function as the tense control vector.

Industrial Applicability

The problem of the traditional software development work has been attributed to the extremely high level of the dependency on personal abilities and it was sought for to all staff members. This invention has made it a development methodology, by theoretically grasping the consciousness action existing in the depths of the thinking method in relation to the cognitive action, and it is applicable, irrespective of field, to such as OS's, middle games, controls, business, etc.

Since the software structure which is induced by this invention is determined theoretically, it is recurrent and becomes the one and only. As a result, the software developed is not a black box any more, excluding human errors from the quality viewpoint, while the structure becoming strong with the clear structure. Therefore, the estimation can be realized more accurately, and the development planning and development management will be made easier to perform.

Additionally, in comparison with the traditional method, the development term becomes ½ to ¼, the development cost becomes ⅓ to ⅕, the productivity of the development staff becomes 10 to 15 times, the volume of development documents becomes 1/15 to 1/20, etc. All figures are miraculously significant. In addition, the efficiency of the maintenance reaches 50 to 70 times.

With the traditional method, it is known that the productivity of the maintenance is approximately 1/10 of the productivity of the development work. With this invention, it is equivalent to the productivity of the development work, therefore the productivity of ten times the productivity of the development staff will become the productivity of the maintenance. To be noted, the productivity of the development staff is a production comparative value against the traditionally called work process, i.e., all work areas inclusive of requirement definition, basic designing, detail designing, programming, and verification, therefore, the aforementioned figure is a value representing the case that the work area concept of the maintenance work is applied to a half of its sphere.

What is claimed is:

1. A computer-implemented software production method, performed on a computer, comprising:

(a) determining a user interface; directly identifying software to be produced
    (b) picking out a word from the user interface;
    (c) creating a homogeneity map in which all pallets necessary to the software are arranged in accordance with a process flow based on the user interface;
    (d) determining necessary files based on said word picked out and said homogeneity map created;
    (e) creating, for said word, a WO4 duplicate vector and a WO4 homogeneity vector for executing a screen edit, a WO2 duplicate vector and a WO2 homogeneity vector for determining a process route, and a WO3 duplicate vector and a WO3 homogeneity vector for executing a file update;
    (f) creating WO4, WO2, and WO3 pallets;
    (g) creating WO4, WO2, and WO3 pallet functions for executing said WO4, WO2, and WO3 duplicate and homogeneity vectors in the WO4, WO2, and WO3 pallets and for re-executing corresponding duplicate and homogeneity vectors when a pallet restart flag in a corresponding pallet is set; and
    (h) assembling the WO4, WO2, and WO3 pallet functions into a tense control function, the tense control function controlling the sub-steps of transmitting data from the user interface based on the WO4 pallet function, receiving response screen data, executing the WO2 pallet function, determining a process route in accordance with a process route flag of the WO2 pallet, and executing the WO3 pallet function according to the determined process route.

2. The method as claimed in claim 1, wherein the word of the user interface comprises a text field to be filled in.

3. A computer-based processing apparatus, comprising:

user interface means, including a WO4 pallet including a WO4 duplicate vector and a WO4 homogeneity vector for interacting with a word of a user interface;
    process route determining means, including a WO2 pallet including a WO2 duplicate vector and a WO2 homogeneity vector;
    file updating means, including a WO3 pallet including a WO3 duplicate vector and a WO3 homogeneity vector;
    means for executing said WO4, WO2, and WO3 duplicate and homogeneity vectors in the WO4, WO2, and WO3 pallets, respectively, and for reexecuting said WO4, WO2, and WO3 duplicate and homogeneity vectors in the WO4, WO2, and WO3 pallets, respectively, when a pallet restart flag in the corresponding pallet is set; and
    means for transmitting data from the user interface based on the WO4 pallet function, receiving response screen data, executing the WO2 pallet function, determining a process route in accordance with a process route flag of the WO2 pallet, and executing the WO3 pallet function according to the determined process route.

4. The apparatus as claimed in claim 3, wherein the word of the user interface comprises a text field to be filled in.

5. A computer-based code generating apparatus, comprising:

means for receiving a user interface as specified by a user, said user interface including a word and a WO4 pallet including a WO4 duplicate vector and a WO4 homogeneity vector;
    means for generating a process route determining means, including a WO2 pallet including a WO2 duplicate vector and a WO2 homogeneity vector; and
    means for generating a file updating means, including a WO3 pallet including a WO3 duplicate vector and a WO3 homogeneity vector.

* * * * *

UNITED STATES PATENT AND TRADEMARK OFFICE
CERTIFICATE OF CORRECTION

PATENT NO. : 6,138,268  
APPLICATION NO. : 09/065101  
DATED : October 24, 2000  
INVENTOR(S) : Fumio Negoro Page 1 of 4

It is certified that error appears in the above-identified patent and that said Letters Patent is hereby corrected as shown below:

In the Specification:

1. Col. 1, at line 29, delete "introduce an" and insert --introduce a--

2. Col. 7, at line 20, after "$\Phi_{k-1}$", delete "$[\Phi_{k-2}\cdots\Phi_2]$" and insert --$[\Phi_{k-2}\cdot\cdot\Phi_2]$--

3. Col. 7, at line 61, after "choose", delete "with"

4. Col. 10, at line 17, after "computer", delete "."

5. Col. 11, at line 54, after "FIGS. 24," delete "25" and insert --25A-25B--

6. Col. 13, at line 10, after "roles of", delete "-he" and insert --the--

Figure 29A:
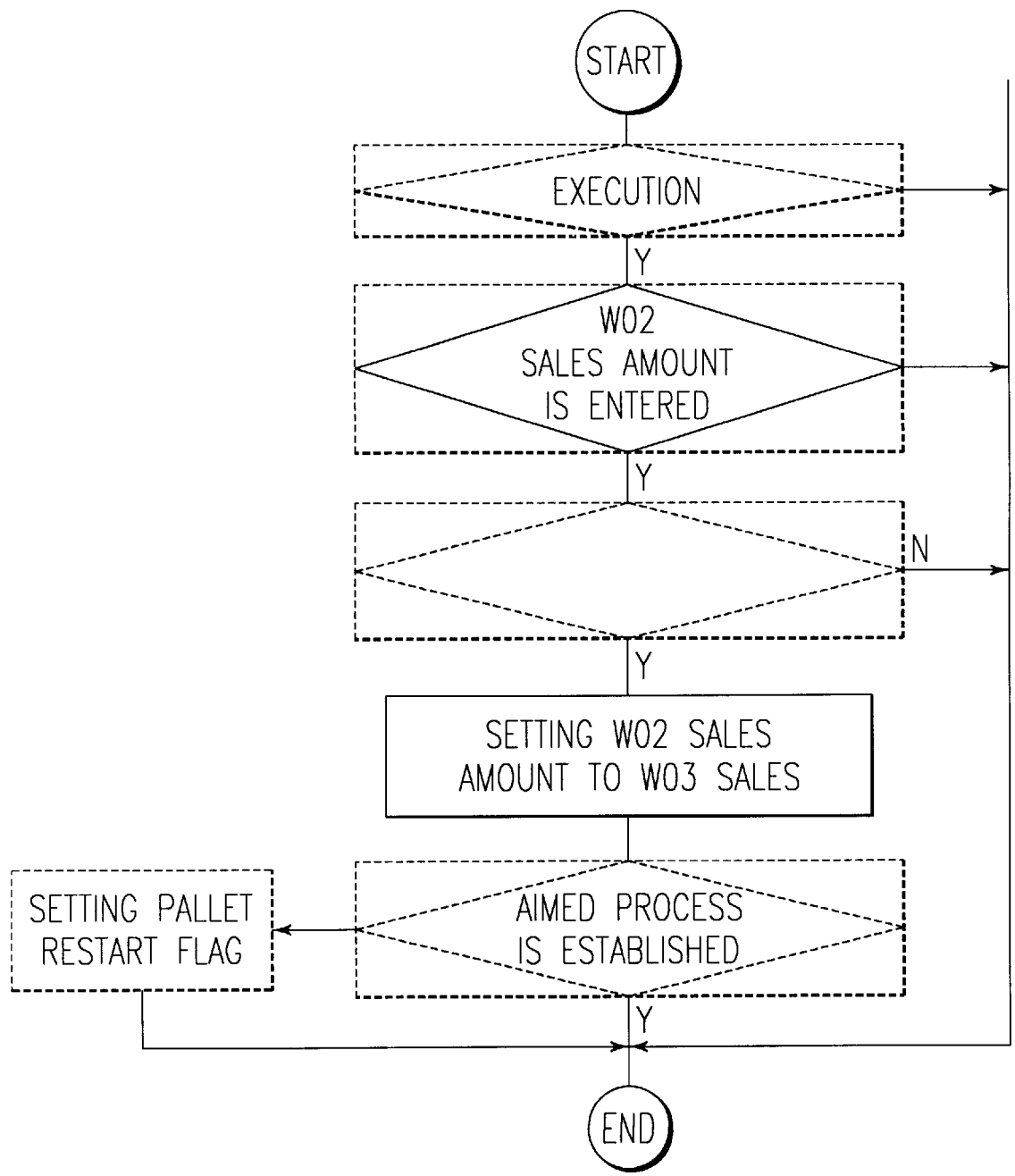
FIG. 29 shows an example (WO3) of the tense control vector concerned with this invention.
Figure 29B:
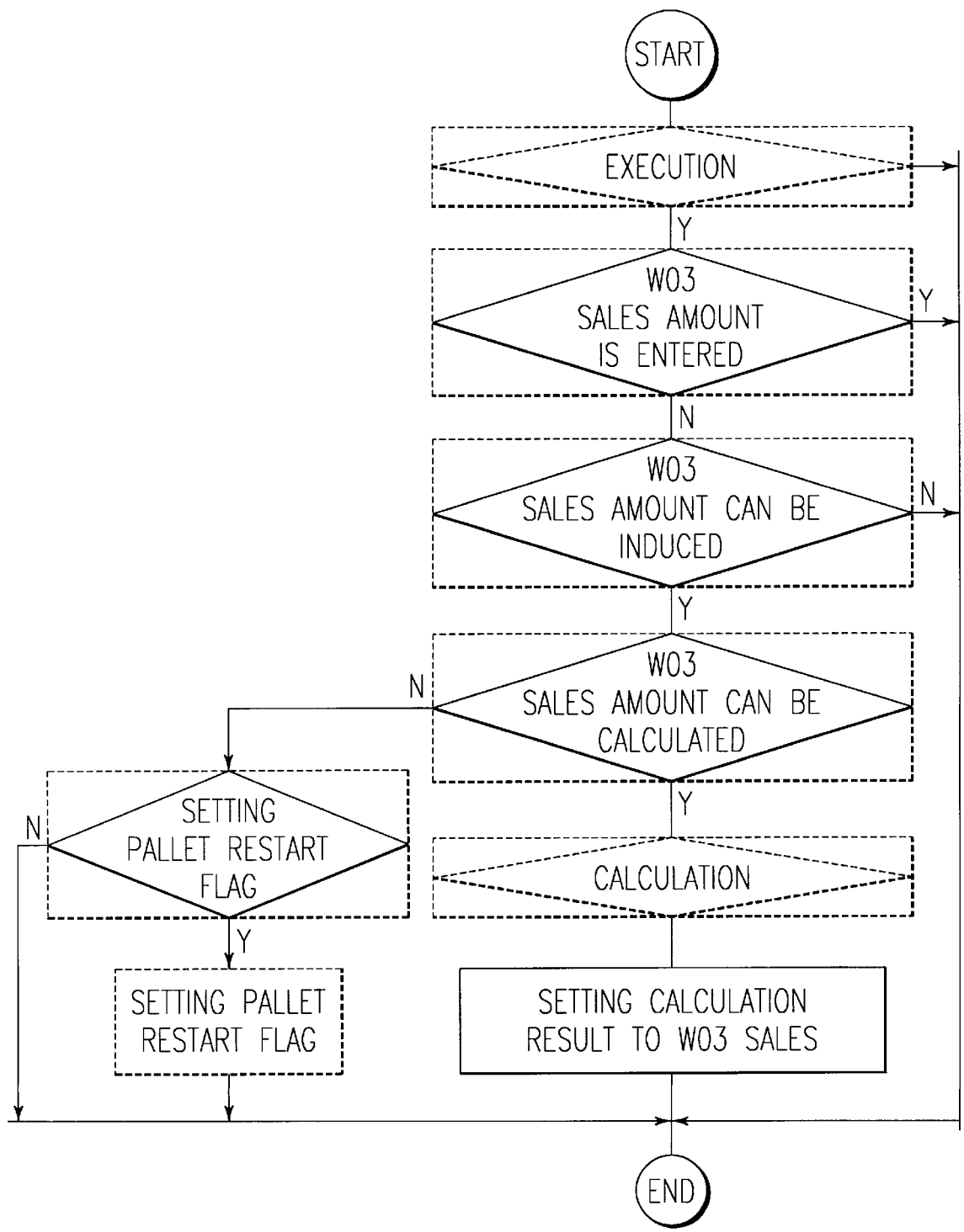

7. Col. 14, at line 27, after "(See", delete "FIG. 29" and insert --FIGS. 29A-29B--

Figure 30A:
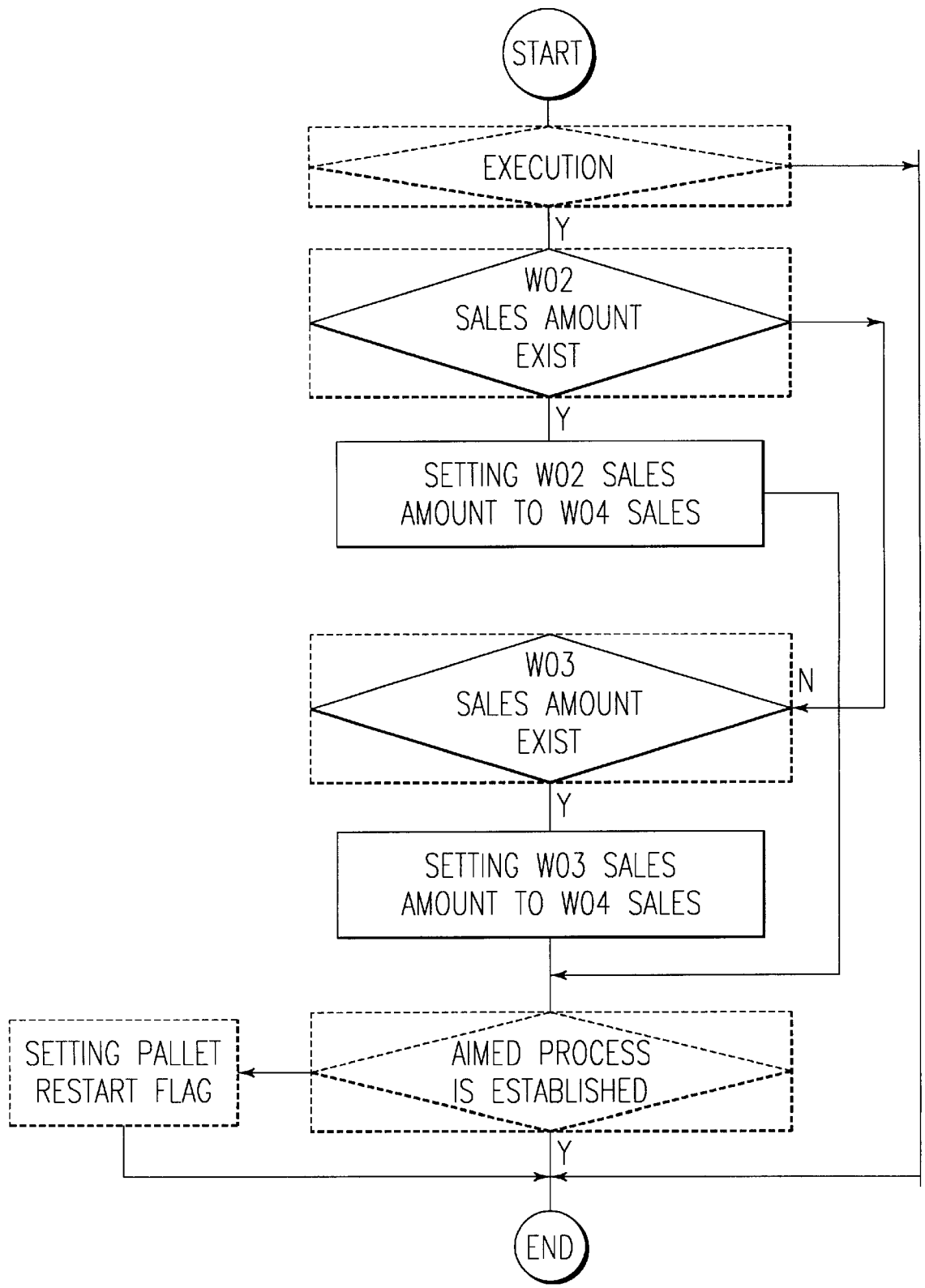
FIG. 30 shows an example (WO4) of the tense control vector concerned with this invention.
Figure 31:
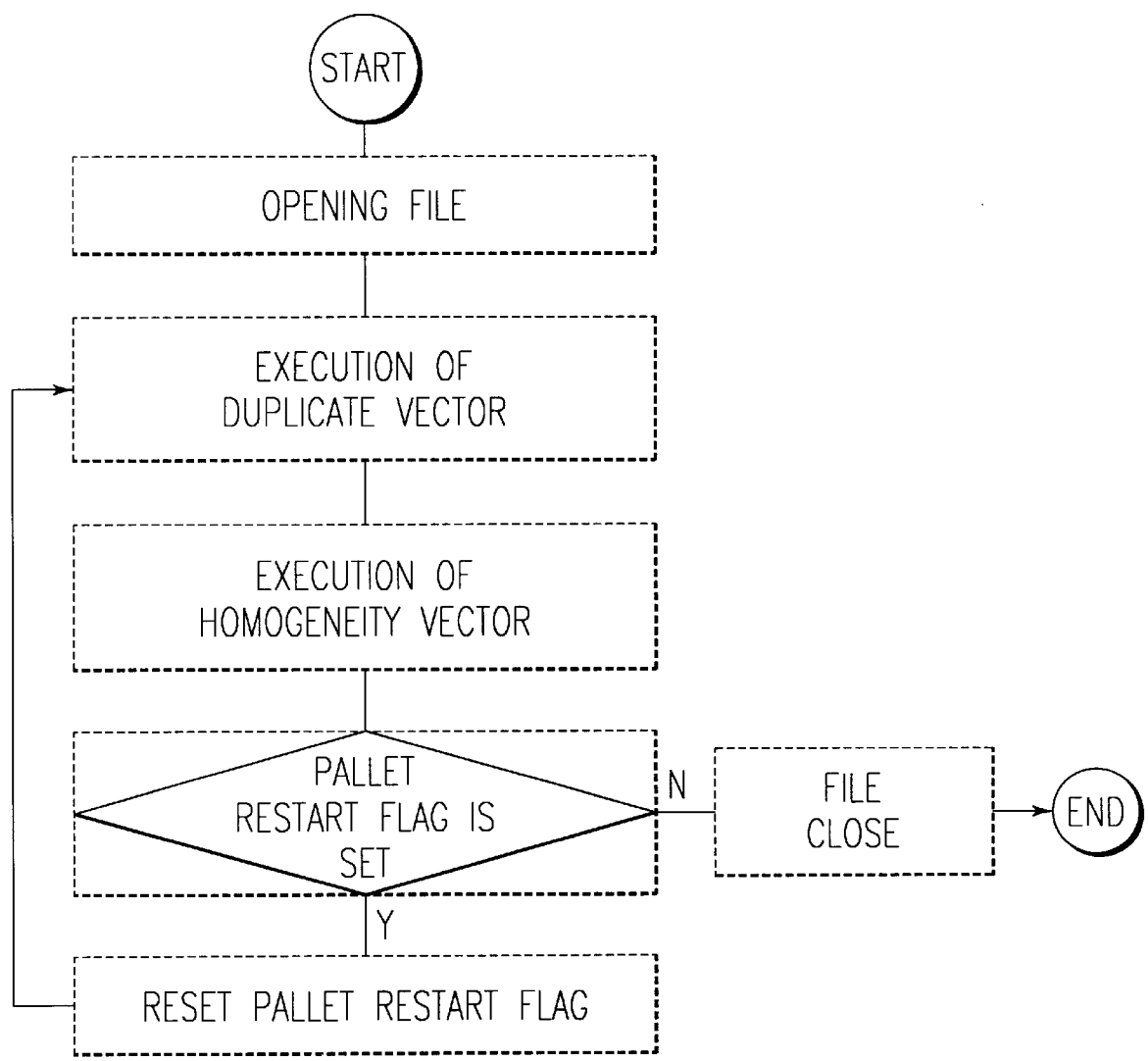
FIG. 31 explains the pallet function concerned with this invention.
Figure 32A:
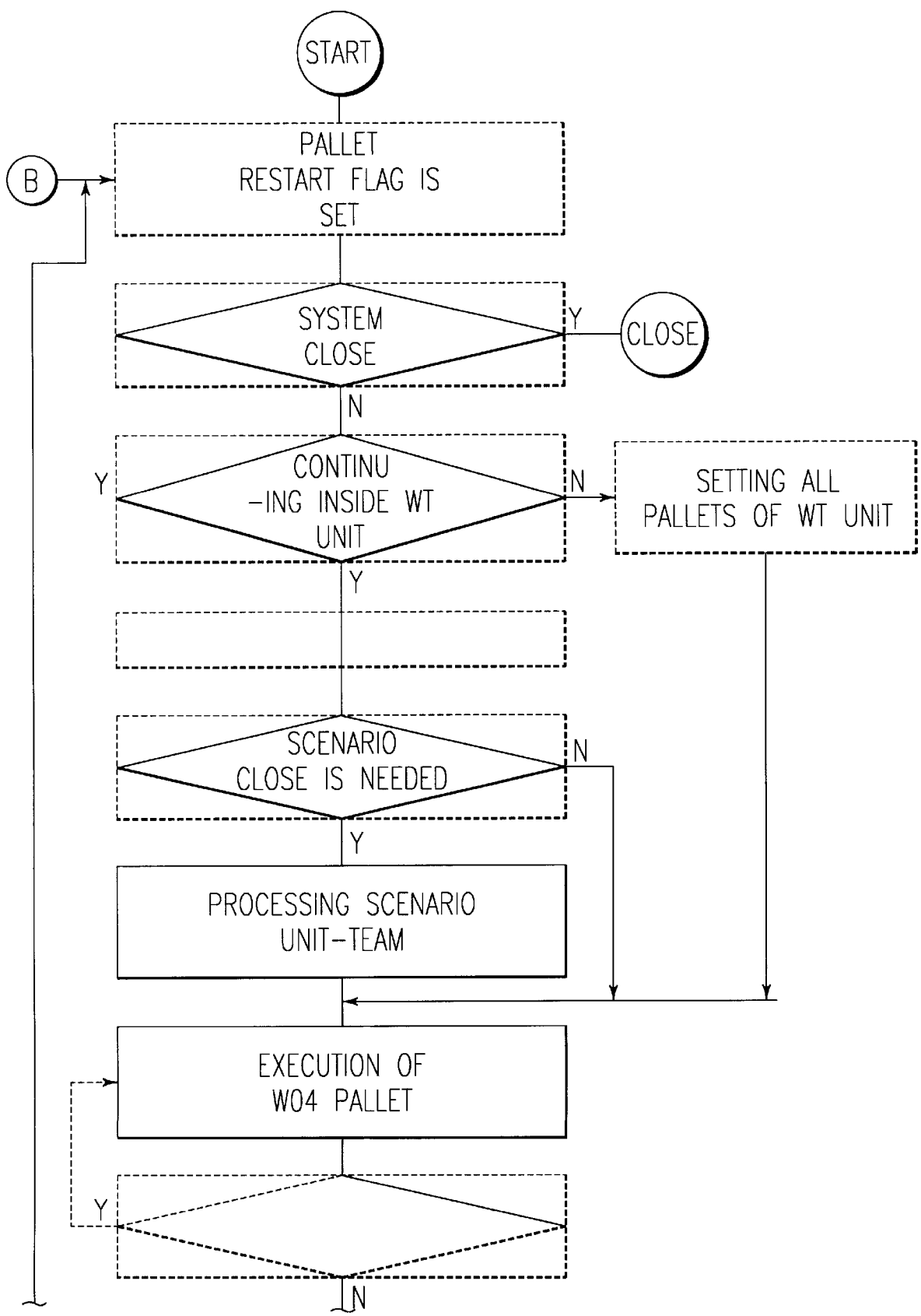
FIG. 32 explains the tense control function ($\Phi_0$) concerned with this invention.
Figure 32B:
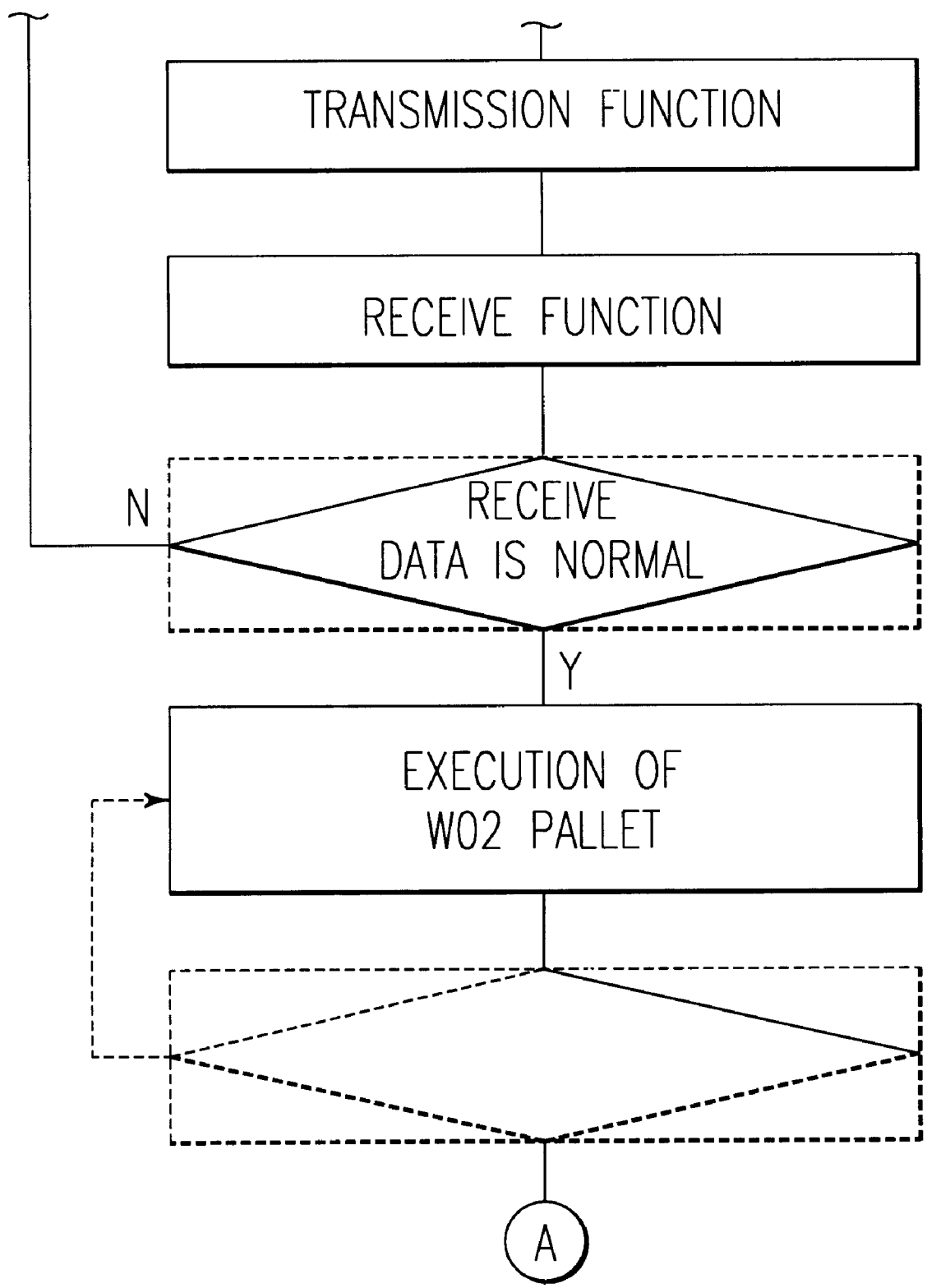
Figure 32C:
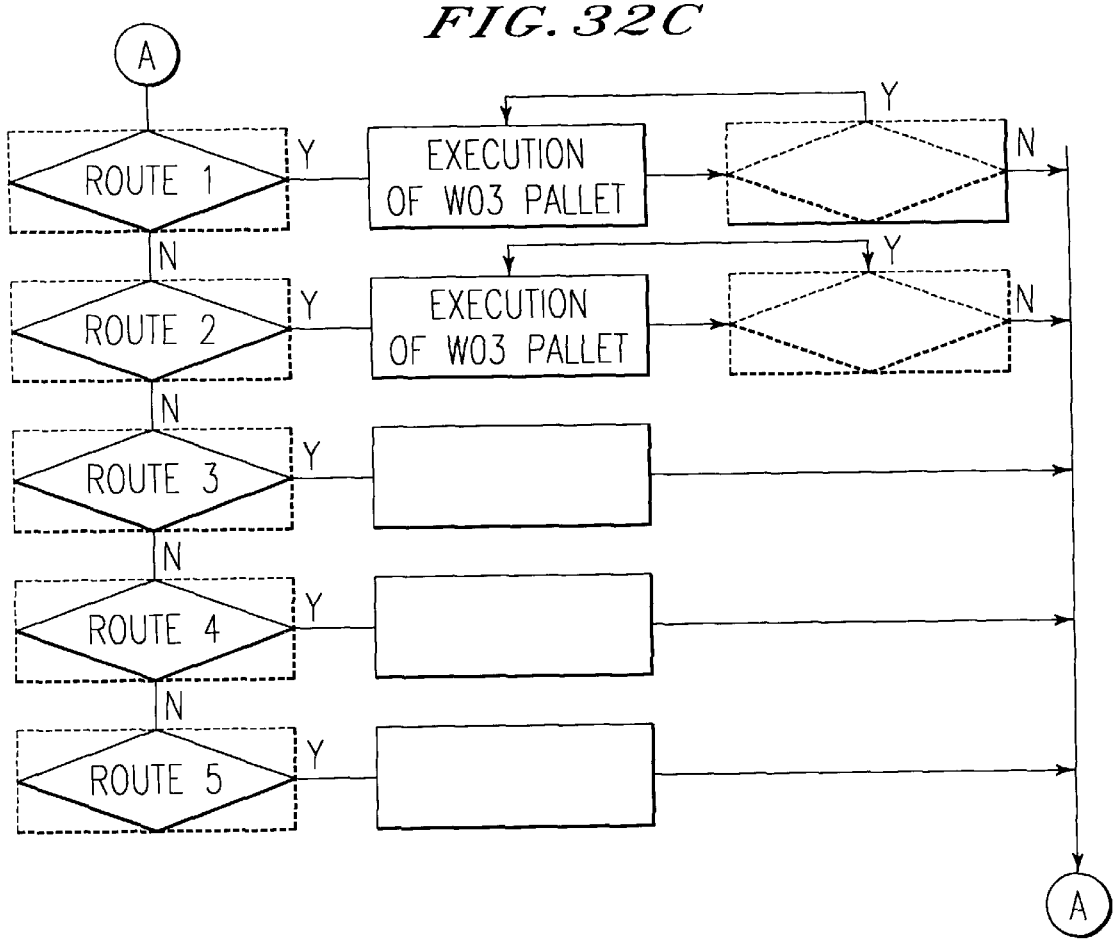
Figure 32D:
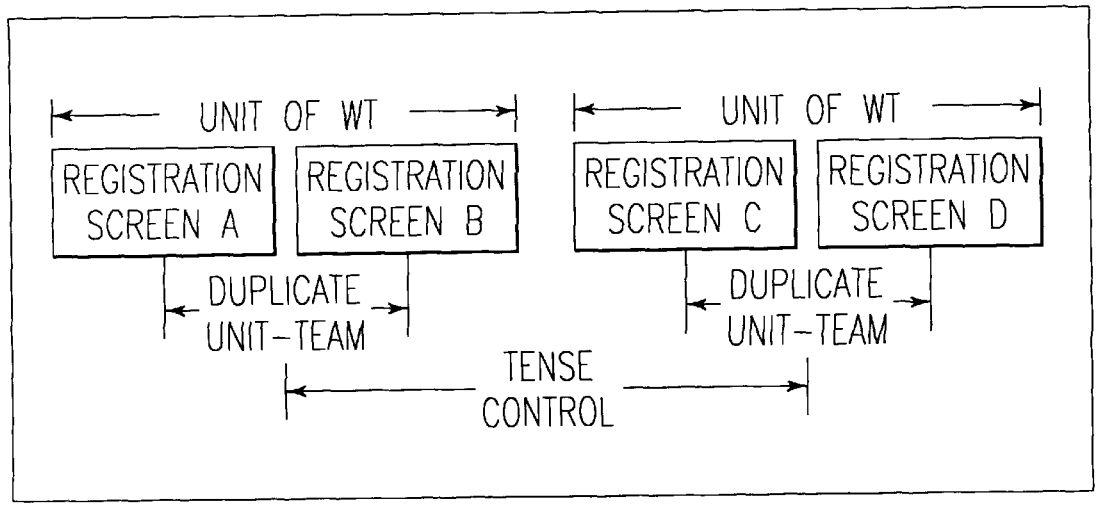

8. Col. 14, at line 44, after "(See", delete "FIG. 30" and insert --FIGS. 30A-30B--

9. Col. 14, at line 59, after "(See FIGS.", delete "32, 33" and insert --32A-32D, 33A-33D--

10. Col. 15, at line 46, delete "FIG. 25" and insert --FIGS. 25A-25B--

11. Col. 15, at line 46, delete "is a diagram" and insert --are diagrams--

12. Col. 15, at line 46, after "which", delete "explains" and insert --explain--

Figure 28A:
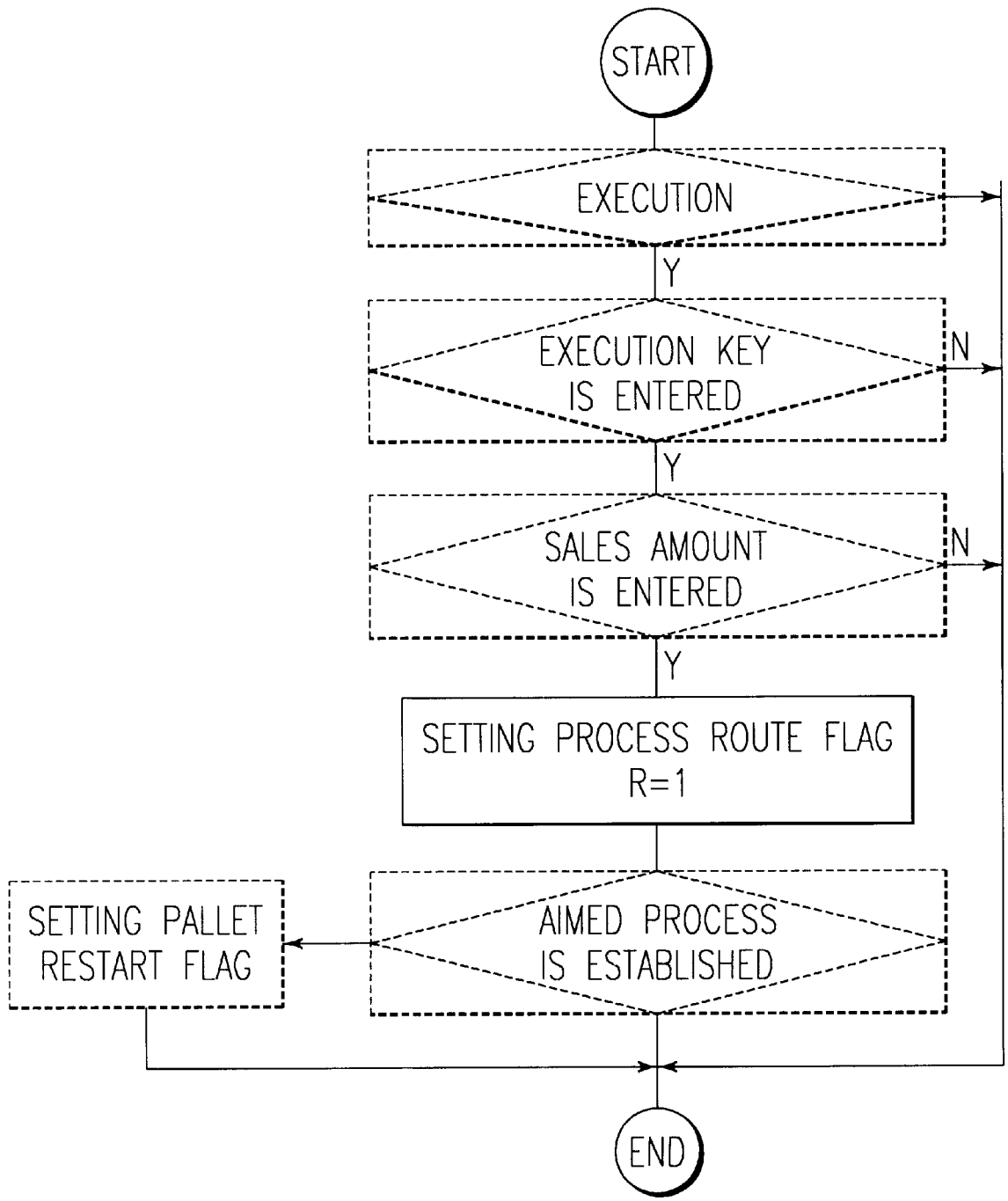
FIG. 28 shows an example (WO2) of the tense control vector concerned with this invention.
Figure 28B:
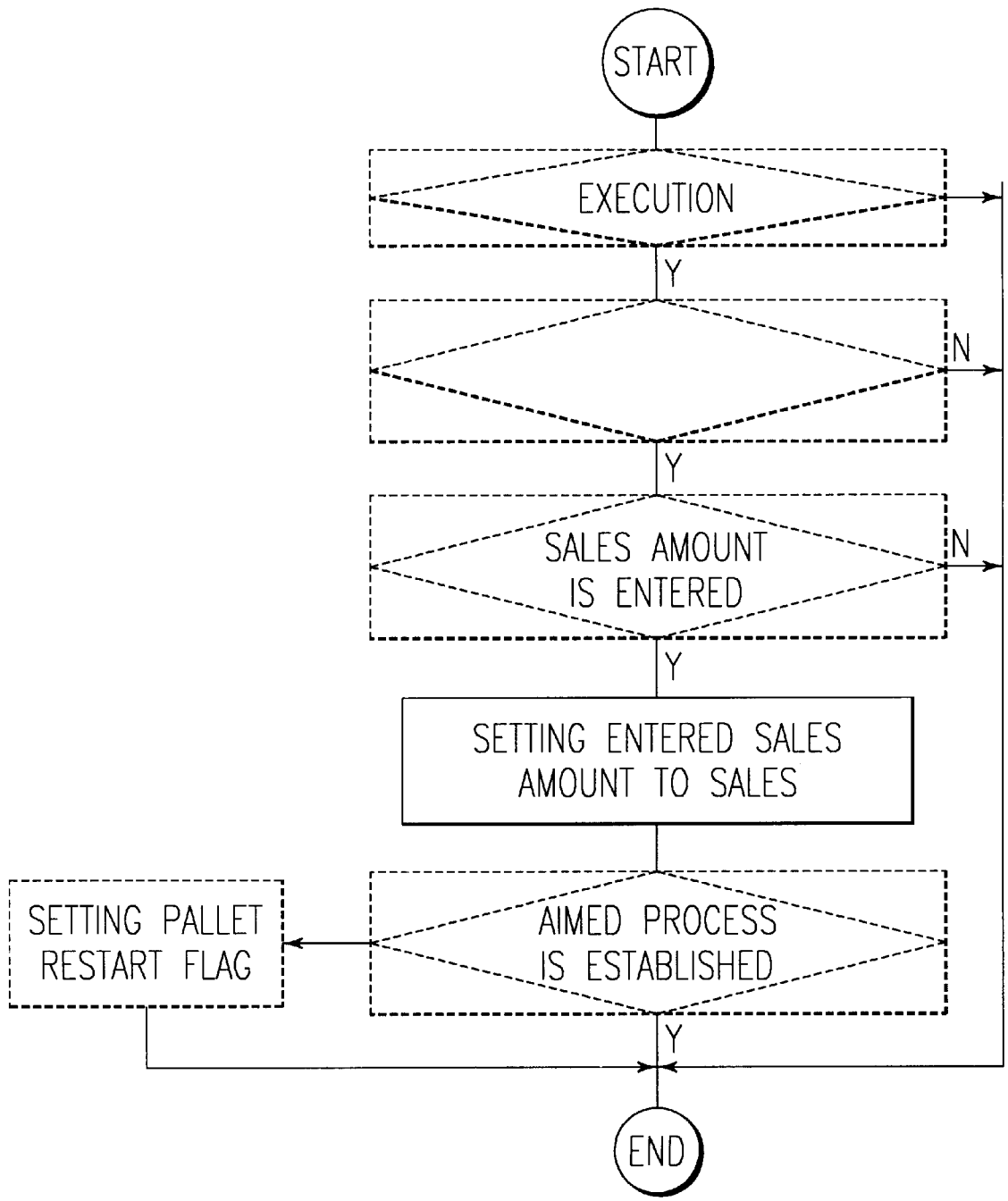

13. Col. 17, at line 23, delete "FIG. 28" and insert --FIGS. 28A-28B--

14. Col. 17, at line 23, before "which", delete "is a diagram" and insert --are diagrams--

15. Col. 17, at line 23, after "which", delete "explains" and insert --explain--

16. Col. 17, at line 26, delete "FIG. 29" and insert --FIGS. 29A-29B--

17. Col. 17, at line 26, before "which", delete "is a diagram" and insert --are diagrams--

18. Col. 17, at line 26, before "which", delete "explains" and insert --explain--

UNITED STATES PATENT AND TRADEMARK OFFICE
CERTIFICATE OF CORRECTION

PATENT NO.      : 6,138,268
APPLICATION NO. : 09/065101
DATED           : October 24, 2000
INVENTOR(S)     : Fumio Negoro It is certified that error appears in the above-identified patent and that said Letters Patent is hereby corrected as shown below:

In the Specification (cont'd):

19. Col 17, at line 54, delete "FIG. 33" and insert --FIGS. 33A-33B--

20. Col. 17, at line 54, before "which", delete "is a diagram" and insert --are diagrams--

21. Col. 17, at line 54, after "which", delete "explains" and insert --explain--

22. Col. 18, at line 4, delete "FIG. 7" and insert --FIGS. 7A-7C--

23. Col. 18, at line 4, before "the journal", delete "shows" and insert --show--

24. Col. 18, at line 5, before "the journal", delete "shows" and insert --show--

25. Col. 18, at line 5, delete "FIG. 8" and insert --FIGS. 8A-8B--

26. Col. 18, at line 38, delete "FIG. 25" and insert --FIGS. 25A-25B--

27. Col. 18, at line 38, before "the relation", delete "explains" and insert --explain--

28. Col. 18, at line 45, delete "FIG. 28" and insert --FIGS. 28A-28B--

29. Col. 18, at line 45, before "example", delete "shows" and insert --show--

30. Col. 18, at line 47, before "example", delete "shows" and insert --show--

31. Col. 18, at line 49, before "example", delete "shows" and insert --show--

32. Col. 18, at line 47, delete "FIG. 29" and insert --FIGS. 29A-29B--

33. Col. 18, at line 49, delete "FIG. 30" and insert --FIGS. 30A-30B--

34. Col. 18, at line 53, delete "FIG. 32" and insert --FIGS. 32A-32D--

35. Col. 18, at line 53, before "the tense", delete "explains" and insert --explain--

36. Col. 18, at line 56, before "the tense", delete "explains" and insert --explain--

37. Col. 18, at line 56, delete "FIG. 33" and insert --FIGS. 33A-33B--

UNITED STATES PATENT AND TRADEMARK OFFICE
CERTIFICATE OF CORRECTION

PATENT NO.      : 6,138,268
APPLICATION NO. : 09/065101
DATED           : October 24, 2000
INVENTOR(S)     : Fumio Negoro It is certified that error appears in the above-identified patent and that said Letters Patent is hereby corrected as shown below:

In the Specification (cont'd):

38. Col. 19, at line 60, delete "(FIG." and insert --(FIGS.--

39. Col. 19, at line 61, before "are decided" delete "7, FIG. 8)" and insert --7A-7C, FIGS. 8A-8B)--

40. Col. 20, at line 12, delete "Slip" and insert --Leaflet--

41. Col. 20, at line 33, before "screen", delete ""Refer to Customer Code"" and insert --"sales input"--

42. Col. 21, at line 5, after "request list", delete "FIG. 7" and insert --FIGS. 7A-7C--

43. Col. 21, at line 6, after "and", delete "FIG. 8" and insert --FIGS. 8A-8B--

44. Col. 21, at line 57, after "(Work File", delete "area)" and insert --Area)--

45. Col. 22, at line 54, after "WO2", delete "Indicated" and insert --indicated--

46. Col. 23, at line 30, after "important", delete "as" and insert --is--

47. Col. 23, at line 46, delete "step 1303)" and insert --(step 1303)--

49. Col. 24, at line 28, after "whether the", insert --sales amount for the item of the WO3 sales can be induced or not (step 1702). If not possible, the process is ended. If possible, to make judgment whether the--

50. Col. 25, at line 21, after "system", delete "is, it"

51. Col. 25, at line 24, after "in the", delete "s ales" and insert --sales--

52. Col. 26, at line 38, after "and", delete "the"

53. Col. 26, at line 42, after "and", delete "the"

54. Col. 26, at line 43, before "105 to 107", delete "step" and insert --steps--

55. Col. 26, at line 66, delete "FIG. 33" and insert --FIGS. 33A-33B--

UNITED STATES PATENT AND TRADEMARK OFFICE
CERTIFICATE OF CORRECTION

PATENT NO. : 6,138,268
APPLICATION NO. : 09/065101
DATED : October 24, 2000
INVENTOR(S) : Fumio Negoro It is certified that error appears in the above-identified patent and that said Letters Patent is hereby corrected as shown below:

In the Specification (cont'd):

56. Col. 26, at line 66, after "which", delete "shows" and insert --show--

57. Col. 27, at line 3, after "program of", delete "FIG. 33" and insert --FIGS. 33A-33B--

58. Col. 27, at line 3, before "similarly", delete "is" and insert --are--

Signed and Sealed this

Twenty-third Day of October, 2007

JON W. DUDAS
*Director of the United States Patent and Trademark Office*